(12) United States Patent
Alli et al.

(10) Patent No.: US 10,371,865 B2
(45) Date of Patent: *Aug. 6, 2019

(54) SILICONE HYDROGELS COMPRISING POLYAMIDES

(71) Applicant: Johnson & Johnson Vision Care, Inc., Jacksonville, FL (US)

(72) Inventors: Azaam Alli, Jacksonville, FL (US); Alexander Guzman, Jacksonville, FL (US)

(73) Assignee: Johnson & Johnson Vision Care, Inc., Jacksonville, FL (US)

(*) Notice: Subject to any disclaimer, the term of this patent is extended or adjusted under 35 U.S.C. 154(b) by 54 days.

This patent is subject to a terminal disclaimer.

(21) Appl. No.: 15/609,074

(22) Filed: May 31, 2017

(65) Prior Publication Data

US 2018/0011222 A1 Jan. 11, 2018

Related U.S. Application Data

(60) Provisional application No. 62/358,949, filed on Jul. 6, 2016.

(51) Int. Cl.
| | | |
|---|---|---|
| G02B 1/04 | (2006.01) | |
| C08F 271/00 | (2006.01) | |
| C08F 271/02 | (2006.01) | |
| C08F 290/06 | (2006.01) | |
| C08G 77/442 | (2006.01) | |

(52) U.S. Cl.
CPC ............ *G02B 1/043* (2013.01); *C08F 271/00* (2013.01); *C08F 271/02* (2013.01); *C08F 290/068* (2013.01); *C08G 77/442* (2013.01)

(58) Field of Classification Search
CPC .................................................. G02B 1/043
See application file for complete search history.

(56) References Cited

U.S. PATENT DOCUMENTS

| | | | |
|---|---|---|---|
| 3,408,429 A | 10/1968 | Wichterle | |
| 3,660,545 A | 5/1972 | Wichterle | |
| 3,808,178 A | 4/1974 | Gaylord | |
| 4,113,224 A | 9/1978 | Clark et al. | |
| 4,120,570 A | 10/1978 | Gaylord | |
| 4,136,250 A | 1/1979 | Mueller et al. | |
| 4,153,641 A | 5/1979 | Deichert et al. | |
| 4,197,266 A | 4/1980 | Clark et al. | |
| 4,436,887 A | 3/1984 | Chromecek et al. | |
| 4,495,313 A | 1/1985 | Larsen | |
| 4,659,763 A | 4/1987 | Spinelli | |
| 4,659,782 A | 4/1987 | Spinelli | |
| 4,740,533 A | 4/1988 | Su et al. | |
| 4,889,664 A | 12/1989 | Kindt-Larsen et al. | |
| 4,910,277 A | 3/1990 | Bambury et al. | |
| 5,006,622 A | 4/1991 | Kunzler et al. | |
| 5,034,461 A | 7/1991 | Lai et al. | |
| 5,039,459 A | 8/1991 | Kindt-Larsen et al. | |
| 5,070,215 A | 12/1991 | Bambury et al. |
| 5,236,969 A | 8/1993 | Kunzler et al. |
| 5,244,981 A | 9/1993 | Seidner et al. |
| 5,270,418 A | 12/1993 | Kunzler et al. |
| 5,298,533 A | 3/1994 | Nandu et al. |
| 5,314,960 A | 5/1994 | Spinelli et al. |
| 5,321,108 A | 6/1994 | Kunzler et al. |
| 5,331,067 A | 7/1994 | Seidner et al. |
| 5,371,147 A | 12/1994 | Spinelli |
| 5,387,662 A | 2/1995 | Kunzler et al. |
| 5,539,016 A | 7/1996 | Kunzier et al. |
| 5,760,100 A | 6/1998 | Nicolson et al. |
| 5,776,999 A | 7/1998 | Nicolson et al. |
| 5,789,461 A | 8/1998 | Nicolson et al. |
| 5,824,719 A | 10/1998 | Kunzler et al. |
| 5,849,811 A | 12/1998 | Nicolson et al. |
| 5,944,853 A | 8/1999 | Molock et al. |
| 5,962,548 A | 10/1999 | Vanderlaan et al. |
| 5,965,631 A | 10/1999 | Nicolson et al. |
| 5,998,498 A | 12/1999 | Vanderlaan et al. |
| 6,020,445 A | 2/2000 | Vanderlaan et al. |
| 6,087,415 A | 7/2000 | Vanderlaan et al. |
| 6,367,929 B1 | 4/2002 | Maiden et al. |
| 6,420,453 B1 | 7/2002 | Bowers et al. |
| 6,423,761 B1 | 7/2002 | Bowers et al. |

(Continued)

FOREIGN PATENT DOCUMENTS

| | | |
|---|---|---|
| EP | 0080539 B1 | 6/1983 |
| EP | 2258411 A1 | 12/2010 |
| EP | 2508550 A1 | 10/2012 |
| WO | 9631792 A1 | 10/1996 |
| WO | 2003022321 A2 | 3/2003 |
| WO | 2006005147 A2 | 1/2008 |
| WO | 2006061992 A2 | 5/2008 |

OTHER PUBLICATIONS

Compendium of Polymer Terminology and Nomenclature: IUPAC Recommendations 2008, edited by: Richard G. Jones, Jaroslav Kahovec, Robert Stepto, Edward S. Wilks, Michael Hess, Tatsuki Kitayama, and W. Val Metanomski.
Crivello, et al, Photoinitiators for Free Radical Cationic & Anionic Photopolymerisation, 2nd Edition, vol. III, pp. 275-298, John Wiley and Sons, New York, 1998.
ISO 18369-4:2006: Ophthalmic optics—Contact lenses—Part 4: Physicochemical properties of contact lens materials.
ISO 9913-1: 1996: Optics and optical instruments—Contact Lenses—Part 1: Determination of oxygen permeability and transmissibility by the FATT method.
PCT International Search Report, dated Sep. 1, 2017, for PCT Int'l Appln. No. PCT/US2017/037331.
PCT International Search Report, dated Sep. 15, 2017, for PCT Int'l Appln. No. PCT/US2017/037334.

*Primary Examiner* — Michael F Pepitone
(74) *Attorney, Agent, or Firm* — Raef M. Shaltout

(57) ABSTRACT

Described are silicone hydrogels that are more biocompatible than current ocular materials. The silicone hydrogels are formed from a reactive monomer mixture comprising: a mixture of hydroxyl substituted silicone containing components, at least one polyamide; and at least one hydrophilic monomer. The silicone hydrogels also display a desirable balance of properties, including clarity, oxygen permeability, wettability and desirable protein uptake.

55 Claims, No Drawings

(56) References Cited

U.S. PATENT DOCUMENTS

| | | | |
|---|---|---|---|
| 6,767,979 B1 | 7/2004 | Muir et al. | |
| 6,822,016 B2 | 11/2004 | McCabe et al. | |
| 6,849,671 B2 | 2/2005 | Steffen et al. | |
| 6,867,245 B2 | 3/2005 | Iwata et al. | |
| 6,943,203 B2 | 9/2005 | Vanderlaan et al. | |
| 7,052,131 B2 | 5/2006 | McCabe et al. | |
| 7,247,692 B2 | 7/2007 | Laredo | |
| 7,249,848 B2 | 7/2007 | Laredo et al. | |
| 7,279,507 B2 | 10/2007 | Hu et al. | |
| 7,396,890 B2 | 7/2008 | Zanini et al. | |
| 7,473,738 B2 | 1/2009 | Arnold et al. | |
| 7,553,880 B2 | 6/2009 | Nicolson et al. | |
| 7,649,058 B2 | 1/2010 | McCabe et al. | |
| 7,666,921 B2 | 2/2010 | McCabe et al. | |
| 7,691,916 B2 | 4/2010 | McCabe et al. | |
| 7,786,185 B2 | 8/2010 | Rathore et al. | |
| 7,825,170 B2 | 11/2010 | Steffen et al. | |
| 7,934,830 B2 | 5/2011 | Blackwell et al. | |
| 7,956,131 B2 | 6/2011 | Arnold et al. | |
| 8,022,158 B2 | 9/2011 | Rathore et al. | |
| 8,079,703 B2 | 12/2011 | Chang et al. | |
| 8,138,290 B2 | 3/2012 | Blackwell et al. | |
| 8,168,720 B2 | 5/2012 | McCabe et al. | |
| 8,273,802 B2 | 9/2012 | Laredo et al. | |
| 8,357,760 B2 | 1/2013 | Qiu et al. | |
| 8,389,597 B2 | 3/2013 | Blackwell et al. | |
| 8,399,538 B2 | 3/2013 | Steffen et al. | |
| 8,404,759 B2 | 3/2013 | Phelan et al. | |
| 8,415,404 B2 | 4/2013 | Nicolson et al. | |
| 8,431,669 B2 | 4/2013 | McCabe et al. | |
| 8,450,387 B2 | 5/2013 | McCabe et al. | |
| 8,470,906 B2 | 6/2013 | Rathore et al. | |
| 8,487,058 B2 | 7/2013 | Liu et al. | |
| 8,507,577 B2 | 8/2013 | Zanini et al. | |
| 8,637,621 B2 | 1/2014 | Iwata et al. | |
| 8,672,476 B2 | 3/2014 | Roffman et al. | |
| 8,703,891 B2 | 4/2014 | Broad | |
| 8,796,353 B2 | 8/2014 | McCabe et al. | |
| 8,815,972 B2 | 8/2014 | Rathore et al. | |
| 8,895,687 B2 | 11/2014 | McCabe et al. | |
| 8,937,110 B2 | 1/2015 | Alli et al. | |
| 8,937,111 B2 | 1/2015 | Alli et al. | |
| 8,940,812 B2 | 1/2015 | Reboul et al. | |
| 8,980,972 B2 | 3/2015 | Driver | |
| 9,056,878 B2 | 6/2015 | Fujisawa et al. | |
| 9,057,821 B2 | 6/2015 | Broad et al. | |
| 9,101,667 B2 | 8/2015 | Raja et al. | |
| 9,125,808 B2 | 9/2015 | Alli et al. | |
| 9,140,825 B2 | 9/2015 | Aiii et al. | |
| 9,156,934 B2 | 10/2015 | Aiii et al. | |
| 9,170,349 B2 | 10/2015 | Mahadevan et al. | |
| 9,244,196 B2 | 1/2016 | Scales et al. | |
| 9,244,197 B2 | 1/2016 | Alli et al. | |
| 9,260,544 B2 | 2/2016 | Rathore et al. | |
| 9,297,928 B2 | 3/2016 | Molock et al. | |
| 9,297,929 B2 | 3/2016 | Scales et al. | |
| 2002/0016383 A1 | 2/2002 | Iwata et al. | |
| 2003/0052424 A1* | 3/2003 | Turner | B29C 37/0032 264/1.32 |
| 2006/0110427 A1 | 5/2006 | Molock et al. | |
| 2007/0222095 A1* | 9/2007 | Zanini | B29D 11/0025 264/1.32 |
| 2010/0048847 A1 | 2/2010 | Broad | |
| 2010/0296049 A1 | 11/2010 | Justynska et al. | |
| 2012/0245248 A1 | 9/2012 | Alli | |
| 2013/0127077 A1 | 5/2013 | Qiu et al. | |
| 2013/0184372 A1 | 7/2013 | Reboul et al. | |
| 2013/0203813 A1 | 8/2013 | Mahadevan et al. | |
| 2013/0237631 A1* | 9/2013 | McCabe | A61L 27/18 523/107 |
| 2013/0341811 A1* | 12/2013 | Alli | G02B 1/04 264/1.38 |
| 2014/0024791 A1* | 1/2014 | Alli | C08F 283/124 526/212 |

\* cited by examiner

SILICONE HYDROGELS COMPRISING POLYAMIDES

RELATED APPLICATIONS

This application claims priority to U.S. Provisional Patent Application No. 62/358,949, filed Jul. 6, 2016, which is incorporated herein by reference in its entirety.

TECHNICAL FIELD

The present invention relates to ionic silicone hydrogels displaying improved biocompatibility. More specifically, the present invention relates to a polymer formed from reactive components comprising at least one hydrophilic monomer, at least two hydroxyl substituted silicone containing components having different silicone contents, and at least one acyclic polyamide. The silicone hydrogels of the present invention display excellent physical, mechanical, and biological properties, making them suitable for ophthalmic applications such as contact lens materials.

BACKGROUND

It is well known that contact lenses can be used to improve vision. Various contact lenses have been commercially produced for many years. Hydrogel contact lenses are formed from hydrophilic polymers and copolymers containing repeating units such as 2-hydroxyethyl methylacrylate (HEMA). Of these, contact lenses formed from copolymers of HEMA and methacrylic acid, are among the most comfortable, and have the lowest rate of adverse events. Contact lenses formed from copolymers of HEMA and MAA, such ACUVUE®2 brand contact lenses, display substantial amounts of lysozyme uptake (greater than 500 µg) and retain a majority of the uptaken proteins in their native state. However, hydrogel contact lenses generally have oxygen permeabilities that are less than about 30.

Contact lenses made from silicone hydrogels have been disclosed. These silicone hydrogel lenses have oxygen permeabilities greater than about 60, and many provide reduced levels of hypoxia compared to conventional hydrogel contact lenses. Silicone hydrogel lenses may be exposed to extended periods of wear such as for several days in a row, for example, up to about 30 days.

U.S. Pat. No. 8,815,972 (Rathore) is directed to ionic silicone hydrogels having improved hydrolytic stability and desirable protein uptake.

U.S. Pat. No. 7,786,185 is directed to wettable hydrogels comprising acyclic polyamides.

SUMMARY

Silicone hydrogels disclosed herein exhibit improved biocompatibility with regards to interactions and absorption of tear film components as well as interactions and absorption of preservatives used for disinfecting contact lenses made from such silicone hydrogels. The lack of protein, lipid, or other biological deposits on the surface of contact lenses may limit, reduce, or eliminate any immunological responses or microbial fouling.

For reusable wear modalities, in which contact lenses are disinfected with multipurpose cleaning solutions between uses, another important characteristic of biocompatibility is low absorption of preservatives which may be released into the ocular environment upon subsequent wear.

The silicone hydrogels of the present invention exhibit many of these biocompatible properties, while achieving an excellent balance of physical and mechanical properties.

The present invention provides a silicone hydrogel formed from a reactive monomer mixture comprising:
  a. between about 1 and about 15 wt % at least one polyamide;
  b. at least one first mono-functional, hydroxyl substituted poly(disubstituted siloxane) having 4 to 8 siloxane repeating units;
  c. at least one second hydroxyl substituted poly(disubstituted siloxane) selected from the group consisting of mono-functional hydroxyl substituted poly(disubstituted siloxane)s having 10 to 200 or 10-100 siloxane repeating units and multifunctional hydroxyl substituted poly(disubstituted siloxane)s having 10 to 200, or 10 to 100 siloxane repeating units, and mixtures thereof;
  d. about 5 to about 30 wt % at least one additional hydrophilic monomer;
  e. wherein the first hydroxyl substituted, linear poly(disubstituted siloxane) and the second mono-functional hydroxyl substituted, linear poly(disubstituted siloxane) are present in concentrations to provide a ratio of wt % of all first hydroxyl substituted, linear poly(disubstituted siloxane) to wt % of all one second hydroxyl substituted poly(disubstituted siloxane)s of 0.4-1.3, or 0.4-1.0.

The present invention provides a silicone hydrogel formed from a reactive monomer mixture comprising:
    i. between about 1 and about 15 wt % at least one polyamide;
    ii. at least one hydroxyl silicone-containing monomer;
    iii. at least one hydroxyl substituted poly(disubstituted siloxane) selected from the group consisting of poly(disubstituted siloxane) having 4 to 8 siloxane repeating units, monofunctional hydroxyl substituted poly(disubstituted siloxane)s having 10 to 200 or 10-100 siloxane repeating units and multifunctional hydroxyl substituted poly(disubstituted siloxane)s having 10 to 200, or 10 to 100 siloxane repeating units, and mixtures thereof;
    iv. about 5 to about 20 wt % at least one additional hydrophilic monomer;
    v. wherein the first hydroxyl substituted, linear poly(disubstituted siloxane) and the second monofunctional hydroxyl substituted, linear poly(disubstituted siloxane) are present in concentrations to provide a ratio of wt % of all first hydroxyl substituted, linear poly(disubstituted siloxane) to wt % of all one second hydroxyl substituted poly(disubstituted siloxane)s of 0.4-1.3, or 0.4-1.0.

The present invention also provides biomedical devices, ophthalmic devices and contact lenses comprising the silicone hydrogels described herein.

These and other embodiments of the invention will become apparent from the following description, which are illustrative of the invention. The description does not limit the scope of the invention, which is defined by the claims and equivalents thereof. Variations and modifications of the invention may be effected without departing from the spirit and scope of the novel contents of the disclosure.

DETAILED DESCRIPTION

Provided are silicone hydrogels formed from a reactive monomer mixture comprising: a first hydroxyl substituted, linear poly(disubstituted siloxane) having 4 to 8 siloxane repeating units; a second hydroxyl substituted, linear poly(disubstituted siloxane) selected from the group consisting of a monofunctional hydroxyl substituted, linear poly(disubstituted siloxane) having 10 to 20 siloxane repeating units and a multifunctional hydroxyl substituted, linear poly(disubstituted siloxane) having 10 to 200, or 10 to 100 siloxane repeating units; and at least one polyamide; wherein the ratio of the first hydroxyl substituted linear poly(disubstituted siloxane) to the second hydroxyl substituted, linear poly(disubstituted siloxane) is in a range of 0.4 to 1.2, or 0.4 to 1.0.

With respect to the terms used in this disclosure, the following definitions are provided. The polymer definitions are consistent with those disclosed in the Compendium of Polymer Terminology and Nomenclature, IUPAC Recommendations 2008, edited by: Richard G. Jones, Jaroslav Kahovec, Robert Stepto, Edward S. Wilks, Michael Hess, Tatsuki Kitayama, and W. Val Metanomski.

As used herein, the term "about" refers to a range of +/−5% of the number that is being modified. For example, the phrase "about 10" would include both 9.5 and 10.5.

The term "(meth)" designates optional methyl substitution. Thus, a term such as "(meth)acrylate" denotes both methacrylate and acrylate radicals.

Wherever chemical structures are given, it should be appreciated that alternatives disclosed for the substituents on the structure may be combined in any combination. Thus, if a structure contained substituents R* and R**, each of which contained three lists of potential groups, 9 combinations are disclosed. The same applies for combinations of properties.

When a subscript, such as "n" in the generic formula [***]$_n$, is used to depict the number of repeating units in a polymer's chemical formula, the formula should be interpreted to represent the number average molecular weight of the macromolecule.

A "macromolecule" is an organic compound having a molecular weight of greater than 1500, and may be reactive or non-reactive.

A "polymer" is a macromolecule of repeating chemical units linked together into a chain or network structure and is composed of repeating units derived from the monomers and macromers included in the reactive mixture.

A "homopolymer" is a polymer made from one monomer or macromer; a "copolymer" is a polymer made from two or more monomers, macromers or a combination thereof; a "terpolymer" is a polymer made from three monomers, macromers or a combination thereof. A "block copolymer" is composed of compositionally different blocks or segments. Diblock copolymers have two blocks. Triblock copolymers have three blocks. "Comb or graft copolymers" are made from at least one macromer.

A "repeating unit" or "repeating chemical unit" is the smallest repeating group of atoms in a polymer that result from the polymerization of monomers and macromers.

"Biomedical device" is any article that is designed to be used while either in or on mammalian tissues or fluid, and preferably in or on human tissue or fluids. Examples of these devices include but are not limited to wound dressings, sealants, tissue fillers, drug delivery systems, coatings, adhesion prevention barriers, catheters, implants, stents, sutures, and ophthalmic devices such as intraocular lenses and contact lenses. The biomedical devices may be ophthalmic devices, such as contact lenses, including contact lenses made from silicone hydrogels.

"Individual" includes humans and vertebrates.

"Ocular surface" includes the surface and glandular epithelia of the cornea, conjunctiva, lacrimal gland, accessory lacrimal glands, nasolacrimal duct and meibomian gland, and their apical and basal matrices, puncta and adjacent or related structures, including eyelids linked as a functional system by both continuity of epithelia, by innervation, and the endocrine and immune systems.

"Ophthalmic device" refers to any device which resides in or on the eye or any part of the eye, including the ocular surface. These devices can provide optical correction, cosmetic enhancement, vision enhancement, therapeutic benefit (for example as bandages) or delivery of active components such as pharmaceutical and nutraceutical components, or a combination of any of the foregoing. Examples of ophthalmic devices include, but are not limited to, lenses and optical and ocular inserts, including, but not limited to punctal plugs and the like. The "term lens" includes soft contact lenses, hard contact lenses, hybrid contact lenses, intraocular lenses, and overlay lenses. The ophthalmic device may comprise a contact lens.

"Contact lens" refers to an ophthalmic device that can be placed on the cornea of an individual's eye. The contact lens may provide corrective, cosmetic, therapeutic benefit, including wound healing, delivery of active components such as drugs or neutraceuticals, diagnostic evaluation or monitoring, or UV blocking and visible light or glare reduction, or a combination thereof. A contact lens can be of any appropriate material known in the art, and can be a soft lens, a hard lens, or a hybrid lens containing at least two distinct portions with different properties, such as modulus, water content, light absorbing characteristics or combinations thereof.

The biomedical devices, ophthalmic devices, and lenses of the present invention may be comprised of silicone hydrogels. These silicone hydrogels typically contain a silicone component and/or hydrophobic and hydrophilic monomers that are covalently bound to one another in the cured device.

"Silicone hydrogel contact lens" refers to a contact lens comprising at least one silicone hydrogel material. Silicone hydrogel contact lenses generally have increased oxygen permeability compared to conventional hydrogels. Silicone hydrogel contact lenses use both their water and polymer content to transmit oxygen to the eye.

A "polymeric network" is cross-linked macromolecule that can swell but cannot dissolve in solvents, because the polymeric network is essentially one macromolecule. "Hydrogel" or "hydrogel material" refers to a polymeric network that contains water in an equilibrium state. Hydrogels generally contain at least about 10 wt. % water, or at least about 15 wt. % water Conventional hydrogels" refer to polymeric networks made from monomers without any siloxy, siloxane or carbosiloxane groups. Conventional hydrogels are prepared from monomeric mixtures predominantly containing hydrophilic monomers, such as 2-hydroxyethyl methacrylate ("HEMA"), N-vinyl pyrrolidone ("NVP"), N, N-dimethylacrylamide ("DMA"), or vinyl acetate. U.S. Pat. Nos. 4,436,887, 4,495,313, 4,889,664, 5,006,622, 5,039459, 5,236,969, 5,270,418, 5,298,533, 5,824,719, 6,420,453, 6,423,761, 6,767,979, 7,934,830, 8,138,290, and 8,389,597 disclose the formation of conventional hydrogels. Commercially available hydrogel formulations include, but are not limited to, etafilcon, polymacon, vifilcon, genfilcon, lenefilcon, hilafilcon, nesofilcon, and omafilcon, including all of their variants.

"Silicone hydrogel" refers to a hydrogel obtained by copolymerization of at least one silicone-containing component with at least one hydrophilic component. Hydrophilic components may also include non-reactive polymers. Each of the silicone-containing components and the hydrophilic components may be a monomer, macromer or combination thereof. A silicone-containing component contains at least one siloxane or carbosiloxane group. Examples of commercially available silicone hydrogels include balafilcon, acquafilcon, lotrafilcon, comfilcon, delefilcon, enfilcon, fanfilcon, formofilcon, galyfilcon, senofilcon, narafilcon, falcon II, asmofilcon A, samfilcon, riofilcon, stenficlon, somofilcon, as well as silicone hydrogels as prepared in U.S. Pat. Nos. 4,659,782, 4,659,783, 5,244,981, 5,314,960, 5,331,067, 5,371,147, 5,998,498, 6,087,415, 5,760,100, 5,776,999, 5,789,461, 5,849,811, 5,965,631, 6,367,929, 6,822,016, 6,867,245, 6,943,203, 7,247,692, 7,249,848, 7,553,880, 7,666,921, 7,786,185, 7,956,131, 8,022,158, 8,273,802, 8,399,538, 8,470,906, 8,450,387, 8,487,058, 8,507,577, 8,637,621, 8,703,891, 8,937,110, 8,937,111, 8,940,812, 9,056,878, 9,057,821, 9,125,808, 9,140,825, 9,156,934, 9,170,349, 9,244,196, 9,244,197, 9,260,544, 9,297,928, 9,297,929 as well as WO 03/22321, WO 2008/061992, and US 2010/048847. These patents, as well as all other patents disclosed in this paragraph, are hereby incorporated by reference in their entireties.

"Silicone-containing component" refers to a monomer, macromer, prepolymer, cross-linker, initiator, additive, or polymer that contains at least one silicon-oxygen bond, in the form of siloxane [—Si—O—Si] group or carbosiloxane group. Examples of silicone-containing components include, but are not limited to, silicone macromers, prepolymers, and monomers. Examples of silicone macromers include, but are not limited to, polydimethylsiloxane methacrylated with pendant hydrophilic groups. Examples of silicone-containing components which are useful in this invention may be found in U.S. Pat. Nos. 3,808,178, 4,120,570, 4,136,250, 4,153,641, 4,740,533, 5,034,461, 5,962,548, 5,244,981, 5,314,960, 5,331,067, 5,371,147, 5,760,100, 5,849,811, 5,962,548, 5,965,631, 5,998,498, 6,367,929, 6,822,016, and 5,070,215, and European Patent No. 080539.

"Reactive mixture" and "reactive monomer mixture" refer to the mixture of components (both reactive and non-reactive) which are mixed together and when subjected to polymerization conditions, form the silicone hydrogels and lenses of the present invention. The reactive mixture comprises reactive components such as monomers, macromers, prepolymers, cross-linkers, initiators, diluents, and additional components such as wetting agents, release agents, dyes, light absorbing compounds such as UV absorbers, pigments, dyes and photochromic compounds, any of which may be reactive or non-reactive but are capable of being retained within the resulting biomedical device, as well as active components such as pharmaceutical and nutraceutical compounds, and any diluents. It will be appreciated that a wide range of additives may be added based upon the biomedical device which is made, and its intended use. Concentrations of components of the reactive mixture are given in weight % of all components in the reaction mixture, excluding diluent. When diluents are used their concentrations are given as weight % based upon the amount of all components in the reaction mixture and the diluent.

"Monomer" is a molecule having non-repeating functional groups, which can undergo chain growth polymerization, and in particular, free radical polymerization. Some monomers have di-functional impurities that can act as cross-linking agents. "Macromers" are linear or branched polymers having a repeating structure and at least one reactive group that can undergo chain growth polymerization. Monomethacryloxypropyl terminated mono-n-butyl terminated polydimethylsiloxane (molecular weight=500-1500 g/mol) (mPDMS) and mono-(2-hydroxy-3-methacryloxypropyl)-propyl ether terminated mono-n-butyl terminated polydimethylsiloxane (molecular weight=500-1500 g/mol) (OH-mPDMS) are referred to as macromers. Typically, the chemical structure of the macromer is different than the chemical structure of the target macromolecule, that is, the repeating unit of the macromer's pendent group is different than the repeating unit of the target macromolecule or its mainchain.

"Reactive components" are the components in the reactive mixture which become part of the structure of the polymeric network of the resulting silicone hydrogel, by covalent bonding, hydrogen bonding or the formation of an interpenetrating network. Diluents and processing aids which do not become part of the structure of the polymer are not reactive components.

"Polymerizable" means that the compound comprises at least one reactive group which can undergo chain growth polymerization, such as free radical polymerization. Examples of reactive groups include the monovalent reactive groups listed below. "Non-polymerizable" means that the compound does not comprises such a polymerizable group.

"Monovalent reactive groups" are groups that can undergo chain growth polymerization, such as free radical and/or cationic polymerization. Non-limiting examples of free radical reactive groups include (meth)acrylates, styrenes, vinyl ethers, (meth)acrylamides, N-vinyllactams, N-vinylamides, O-vinylcarbamates, O-vinylcarbonates, and other vinyl groups. In one embodiment, the free radical reactive groups comprise (meth)acrylate, (meth)acrylamide, N-vinyl lactam, N-vinylamide, and styryl functional groups, or (meth)acrylates, (meth)acrylamides, and mixtures of any of the foregoing.

Examples of the foregoing include substituted or unsubstituted $C_{1-6}$alkyl(meth)acrylates, $C_{1-6}$alkyl(meth)acrylamides, $C_{2-12}$alkenyls, $C_{2-12}$alkenylphenyls, $C_{2-12}$alkenylnaphthyls, $C_{2-6}$alkenylphenyl$C_{1-6}$alkyls, where suitable substituents on said $C_{1-6}$ alkyls include ethers, hydroxyls, carboxyls, halogens and combinations thereof.

Other polymerization routes such as living free radical and ionic polymerization can also be employed. The device-forming monomers may form hydrogel copolymers. For hydrogels, the reactive mixture will typically include at least one hydrophilic monomer.

Hydrophilic components are those which yield a clear single phase when mixed with deionized water at 25° C. at a concentration of 10 wt. %.

"Interpenetrating polymer networks" or "IPNs" are polymers comprising two or more polymeric networks which are at least partially interlaced on a molecular scale, but not covalently bonded to each other and cannot be separated unless chemical bonds are broken.

"Semi-interpenetrating polymer networks" or "semi-IPNs" are polymer comprising one or more polymer network(s) and one or more linear or branched polymer(s) characterized by the penetration on a molecular scale of at least one of the networks by at least some of the linear or branched chains.

A "cross-linking agent" is a di-functional or multi-functional component which can undergo free radical polymerization at two or more locations on the molecule, thereby creating branch points and a polymeric network. Common examples are ethylene glycol dimethacrylate, tetraethylene glycol dimethacrylate, trimethylolpropane trimethacrylate, methylene bisacrylamide, triallyl cyanurate, and the like.

The phrase "without a surface treatment" means that the exterior surfaces of the devices (e.g. silicone hydrogels, contact lenses) of the present invention are not separately treated to improve the wettability of the device. Treatments which may be foregone include, plasma treatments, grafting, coating, and the like. Coatings, however, which provide properties other than improved wettability, such as, but not limited to antimicrobial coatings and the application of color or other cosmetic enhancement may be applied to devices of the present invention.

A silicone hydrogel may be formed from a reactive monomer mixture comprising at least one anionic monomer, at least one first mono-functional hydroxyl-substituted poly(disubstituted siloxane), at least one second mono-functional hydroxyl-substituted poly(disubstituted siloxane), at least one hydroxyl functional monomer, and at least one acylic polyamide.

Polyamide

The reactive monomer mixture includes at least one polyamide. As used herein, the term "polyamide" refers to polymers and copolymers comprising repeating units containing amide groups. The polyamide may comprise cyclic amide groups, acyclic amide groups and combinations thereof, and may be any polyamide known to those of skill in the art.

Acyclic polyamides comprise pendant acyclic amide groups and are capable of association with hydroxyl groups. Cyclic polyamides comprise cyclic amide groups and are capable of association with hydroxyl groups.

Examples of suitable acyclic polyamides include polymers and copolymers comprising repeating units of Formula I or Formula II:

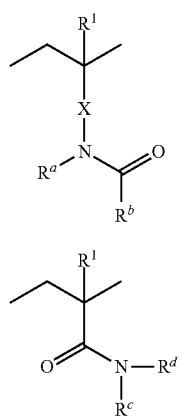

Formula I

Formula II wherein X is a direct bond, —(CO)—, or —(CO)—NHR$^e$—, wherein R$^e$ is a C$_1$ to C$_3$ alkyl group; R$^a$ is selected from H, straight or branched, substituted or unsubstituted C$_1$ to C$_4$ alkyl groups; R$^b$ is selected from H, straight or branched, substituted or unsubstituted C$_1$ to C$_4$ alkyl groups, amino groups having up to two carbon atoms, amide groups having up to four carbon atoms, and alkoxy groups having up to two carbon groups; R$^c$ is selected from H, straight or branched, substituted or unsubstituted C$_1$ to C$_4$ alkyl groups, or methyl, ethoxy, hydroxyethyl, and hydroxymethyl; R$^d$ is selected from H, straight or branched, substituted or unsubstituted C$_1$ to C$_4$ alkyl groups; or methyl, ethoxy, hydroxy-ethyl, and hydroxymethyl wherein the number of carbon atoms in R$^a$ and R$^b$ taken together is 8 or less, including 7, 6, 5, 4, 3, or less, and wherein the number of carbon atoms in R$^e$ and R$^d$ taken together is 8 or less, including 7, 6, 5, 4, 3, or less. The number of carbon atoms in R$^a$ and R$^b$ taken together may be 6 or less or 4 or less. The number of carbon atoms in R$^c$ and R$^d$ taken together may be 6 or less. As used herein substituted alkyl groups include alkyl groups substituted with an amine, amide, ether, hydroxyl, carbonyl, carboxy groups or combinations thereof.

R$^a$ and R$^b$ can be independently selected from H, substituted or unsubstituted C$_1$ to C$_2$ alkyl groups. X may be a direct bond, and R$^a$ and R$^b$ may be independently selected from H, substituted or unsubstituted C$_1$ to C$_2$ alkyl groups.

R$^c$ and R$^d$ can be independently selected from H, substituted or unsubstituted C$_1$ to C$_2$ alkyl groups, methyl, ethoxy, hydroxyethyl, and hydroxymethyl.

The acyclic polyamides of the present invention may comprise a majority of the repeating unit of Formula I or Formula II, or the acyclic polyamides can comprise at least about 50 mole % of the repeating unit of Formula I or Formula II, including at least about 70 mole %, and at least 80 mole %.

Specific examples of repeating units of Formula I and Formula II include repeating units derived from N-vinyl-N-methylacetamide, N-vinylacetamide, N-vinyl-N-methylpropionamide, N-vinyl-N-methyl-2-methylpropionamide, N-vinyl-2-methylpropionamide, N-vinyl-N,N'-dimethylurea, N, N-dimethylacrylamide, methacrylamide, and acyclic amides of Formulae Ma and Mb:

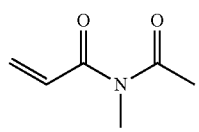

Formula IIIa

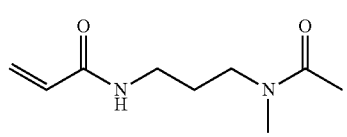

Formula IIIb

The acyclic polyamides may also be copolymers comprising both acyclic and cyclic amide repeating units. Examples of suitable cyclic amides that can be used to form the acyclic polyamides include α-lactam, β-lactam, γ-lactam, δ-lactam, and ε-lactam. Examples of suitable cyclic amides include repeating units of Formula IV:

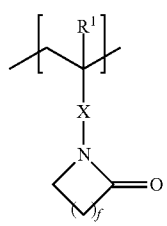

Formula IV wherein R$^1$ is independently a hydrogen atom or methyl; f is a number from 1 to 10, X is a direct bond, —(CO)—, or —(CO)—NH—R$^e$—, wherein R$^e$ is a C$_1$ to C$_3$ alkyl group. In Formula IV, f may be 8 or less, including 7, 6, 5, 4, 3, 2, or 1. In Formula IV, f may be 6 or less, including 5, 4, 3, 2, or 1. In Formula IV, f may be from 2 to 8, including 2, 3, 4, 5, 6, 7, or 8. In Formula IV, f may be 2 or 3.

When X is a direct bond, f may be 2. In such instances, the cyclic polyamide may be poly(vinyl pyrrolidone) (PVP).

Specific examples of repeating units of Formula IV include repeating units derived from N-vinylpyrrolidone (NVP).

Additional repeating units may be formed from monomers selected from N-vinyl amides, acrylamides, hydroxyalkyl(meth)acrylates, alkyl(meth)acrylates and siloxane substituted acrylates or methacrylates. Specific examples of monomers which may be used to form the additional repeating units of the acyclic polyamides include as N-vinylpyrrolidone, N,N-dimethylacrylamide (DMA), 2-hydroxyethylmethacrylate, vinyl acetate, acrylonitrile, hydroxypropyl methacrylate, 2-hydroxyethyl acrylate, methyl methacrylate and butyl methacrylate, hydroxybutyl methacrylate, GMMA, PEGS, and the like and mixtures thereof. Ionic monomers may also be included. Examples of ionic monomers include acrylic acid, methacrylic acid, 2-methacryloyloxyethyl phosphorylcholine, 3-(dimethyl(4-vinylbenzyl) ammonio)propane-1-sulfonate (DMVBAPS), 3-((3-acrylamidopropyl)dimethylammonio)propane-1-sulfonate (AMPDAPS), 3-((3-methacrylamidopropyl)dimethylammonio)propane-1-sulfonate (MAMPDAPS), 3-((3-(acryloyloxy)propyl)dimethylammonio)propane-1-sulfonate (APDAPS), methacryloyloxy)propyl)dimethylammonio) propane-1-sulfonate (MAPDAPS,), 1-propanaminium,N-(2-carboxyethyl)-N,N-dimethyl-3-[(1-oxo-2-propen-1-yl) amino]-, inner salt (CBT, carboxybetaine; CAS 79704-35-1), 1-propanaminium, N,N-dimethyl-N-[3-[(1-oxo-2-propen-1-yl)amino]propyl]-3-sulfo-, inner salt (SBT, sulfobetaine, CAS 80293-60-3), 3,5-Dioxa-8-aza-4-phosphaundec-10-en-1-aminium, 4-hydroxy-N,N,N-trimethyl-9-oxo-, inner salt, 4-oxide (9CI) (PBT, phosphobetaine, CAS 163674-35-9).

The at least one acylic polyamide may be selected from the group consisting of polyvinylmethylacrylamide (PVMA), polyvinylacetamide (PNVA), polydimethylacrylamide (PDMA), polyacrylamide and poly[N-vinyl N-alkyl acetamide] wherein the N-alkyl group is selected from the group consisting of linear and branched alkyl groups containing between one ($C_1$) and five ($C_5$) carbon atoms.

The reactive monomer mixture may comprise both an acyclic polyamide and a cyclic polyamide or copolymers thereof. The acyclic polyamide can be any of those acyclic polyamides described herein or copolymers thereof, and the cyclic polyamide can be formed from any combination of the repeating units of Formula IV, either alone or with other repeating units. Examples of cyclic polyamides include PVP and PVP copolymers. Other polymeric internal wetting agents, such as poly(hydroxyethyl(meth)acrylamide), may also be included.

Without intending to be bound by theory, the polyamide functions as an internal wetting agent in the resulting silicone hydrogel. The polyamides of the present invention may be non-polymerizable, and in this case is incorporated into the silicone hydrogels as a semi-interpenetrating network. The non-polymerizable polyamide is "entrapped", or physically retained within a hydrogel matrix. Alternatively, the polyamides of the present invention may be polymerizable, for example as polyamide macromers, which are covalently incorporated into the silicone hydrogels. Reactive polyamides may be functionalized to contain at least one monovalent reactive group.

When the polyamides are incorporated into the reactive monomer mixture they may have a weight average molecular weight of at least about 100,000 Daltons; greater than about 150,000; between about 150,000 to about 2,000,000 Daltons, between about 300,000 to about 1,800,000 Daltons.

The polyamides may also comprise at least one reactive group. For polyamides having molecular weights of 10,000 Daltons, a single reactive group may be included. For polyamides having molecular weights greater than about 10,000, greater than about 30,000, or greater than about 100,000 Daltons, more than one reactive group may be included. Mixtures of reactive and non-reactive polyamides may also be used.

The polyamides may be incorporated into the hydrogel by a variety of methods. For example, the polyamide may be added to the reaction mixture such that the hydrogel polymerizes "around" the polyamide, forming a semi-interpenetrating network.

The total amount of all polyamides in the reactive mixture may be from about 1 to about 15 wt %, between about 3 and about 15 wt %, or between about 3 and about 12 wt %, based upon the total weight of the reactive components of the reactive monomer mixture.

The reactive monomer mixture also includes a mixture of hydroxyl-containing silicone components of different molecular weights or different compositions. The first hydroxyl-containing silicone component may be selected from hydroxyl-containing silicone monomers, and hydroxyl containing polydisubstituted siloxanes having at least 4 polydisubstituted siloxane repeating units or 4-8 polydisubstituted siloxane repeating units; and at least one monovalent reactive group. When the first hydroxyl-containing silicone component is a hydroxyl-containing silicone monomer, the second hydroxyl-containing silicone component may be selected from hydroxyl substituted poly(disubstituted siloxane) having 4 to 8 siloxane repeating units, monofunctional hydroxyl substituted poly(disubstituted siloxane)s having 10 to 200, 10-100 or 10-20 siloxane repeating units and multifunctional hydroxyl substituted poly(disubstituted siloxane)s having 10 to 200, or 10 to 100 siloxane repeating units, and mixtures thereof. When the first hydroxyl-containing silicone component is a hydroxyl-substituted poly(disubstituted siloxane) having 4 to 8 siloxane repeating units, the second hydroxyl-containing silicone component may be selected from monofunctional hydroxyl substituted poly (disubstituted siloxane)s having 10 to 200, 10-100 or 10-20 siloxane repeating units and multifunctional hydroxyl substituted poly(disubstituted siloxane)s having 10 to 200, or 10 to 100 siloxane repeating units, and mixtures thereof.

Hydroxyl-containing silicone components having 4 polydisubstituted siloxane repeating units in the siloxane chain are not a distribution and have four repeating units in each monomer. For all hydroxyl-containing silicone components having more than four polydisubstituted siloxane repeating units in the siloxane chain the number of repeating units is a distribution, with the peak of the distribution centered around the listed number of repeat units.

The elemental Si content of the hydroxyl containing silicone component is greater than about 20 weight percent, to about 38 weight percent of the total molecular weight of the hydroxyl containing silicone component.

Hydroxyl-Containing Silicone Components

Examples of hydroxyl-containing silicone monomers include propenoic acid-2-methyl-2-hydroxy-3-[3-[1,3,3,3-tetramethyl-1-[(trimethylsilyl)oxy]-1-disiloxanyl]propoxy]

propyl ester ("SiGMA"), and 2-hydroxy-3-methacryloxy-propyloxypropyl-tris(trimethylsiloxy)silane, and compounds of Formula VI:

Formula VI

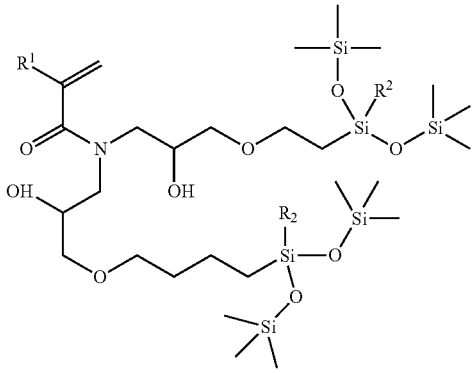

wherein $R^1$ is a hydrogen atom or methyl group and $R^2$ is a linear, branched or cyclic alkyl groups containing 1 to 8 carbon atoms or a trimethylsiloxy group.

The hydroxyl-containing silicone components may be selected from monofunctional hydroxyl substituted, poly(disubstituted siloxane)s of Formula VII-1:

Formula VII-1

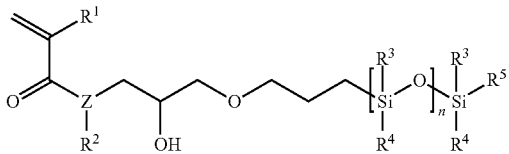

wherein Z is selected from O, N, S or $NCH_2CH_2O$, when Z is O or S $R^2$ is not present;

$R^1$ is independently H or methyl;

$R^2$ is H or is a linear, branched, or cyclic alkyl group containing one to eight carbon atoms, any of which may be further substituted with at least one hydroxy group, amide, ether, and combinations thereof;

$R^3$ and $R^4$ are independently a linear, branched, or cyclic alkyl group containing one to eight carbon atoms, any of which may be further substituted with at least one hydroxy group, and which may be optionally substituted with amide, ether, and combinations thereof; $R^3$ and $R^4$ may be independently selected from methyl, ethyl or phenyl, or may be methyl;

n is the number of siloxane units and is from 4 to 8 for the first monofunctional hydroxyl substituted poly(disubstituted siloxane) monomer (or, when the compound is present as a second hydroxyl substituted poly(disubstituted siloxane), n may be 10 to 200, or 10-100, or 10-50, or 10-20, or 12-18), and $R^5$ is selected from straight or branched $C_1$ to $C_8$ alkyl groups, which may be optionally substituted with one or more hydroxyl, amide, ether, and combinations thereof. $R^5$ may be straight or branched $C_4$ alkyl, either of which may optionally be substituted with hydroxyl, or may be methyl.

The hydroxyl-containing silicone components may be selected from monofunctional hydroxyl substituted, poly(disubstituted siloxane)s of Formula VII-2:

Formula VII-2

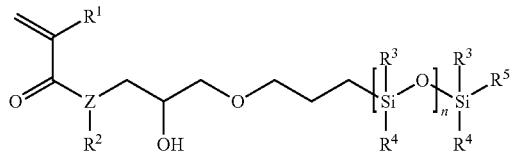

wherein Z is selected from O, N, S or $NCH_2CH_2O$, when Z is O or S $R^2$ is not present;

$R^1$ is independently H or methyl;

$R^2$ is H or is a linear, branched, or cyclic alkyl group containing one to eight carbon atoms, any of which may be further substituted with at least one hydroxy group, amide, ether, and combinations thereof.

$R^3$ and $R^4$ are independently a linear, branched, or cyclic alkyl group containing one to eight carbon atoms, any of which may be further substituted with at least one hydroxy group, and which may be optionally substituted with amide, ether, and combinations thereof; $R^3$ and $R^4$ may be independently selected from methyl, ethyl or phenyl, or may be methyl;

n is the number of siloxane units and is from 10 to 200, or 10-100, or 10-50, or 10-20, or 12-18 for the second monofunctional hydroxyl substituted poly(disubstituted siloxane); and $R^5$ is selected from straight or branched $C_1$ to $C_8$ alkyl groups, which may be optionally substituted with one or more hydroxyl, amide, ether, and combinations thereof. $R^5$ may be straight or branched $C_4$ alkyl, either of which may optionally be substituted with hydroxyl, or may be methyl.

Examples of monofunctional hydroxyl containing silicone components include mono-(2-hydroxy-3-methacryloxypropyl)-propyl ether terminated mono-n-butyl terminated polydimethylsiloxanes (OH-mPDMS) as shown in Formula VIIa wherein n is between 4 and 30, 4-8 or 10-20 or 4 to 15; and polydimethylsiloxanes having the chemical structures as shown in Formulae VIIb through VIIId, where n is between 4 and 30, 4 and 8 or 10 and 20; $n^1$ and $n^2$ are independently between 4 to 100; 4 to 50; 4 to 25; $n^3$ is 1-50, 1-20, or 1-10; $R^5$ is selected from straight or branched C1 to C8 alkyl groups, which may be optionally substituted with one or more hydroxyl, amide, ether, polyhydroxyl groups selected from straight or branched C1 to C8 groups having a formula of $C_fH_g(OH)_h$ wherein f=1-8 and g+h=2f+1 and cyclic C1 to C8 groups having a formula of $C_fH_g(OH)_h$ wherein f=1-8 and g+h=2f−1, and combinations thereof; or $R^5$ may be selected from methyl, butyl or hydroxyl substituted C2-C5 alkyl, including hydroxyl ethyl, hydroxyl propyl, hydroxyl butyl, hydroxyl pentyl and 2,3-dihydroxypropyl; and polycarbosiloxanes of Formula IXa and IXb wherein "a"=4-8 for the first hydroxyl-containing silicone component and "a" is between 4-100 for the second hydroxyl-containing silicone component, $R^1$ and $R^5$ are as defined above; wherein Z is selected from O, N, S or $NCH_2CH_2O$, when Z is O or S $R^2$ is not present; $R^2$ is independently selected from the group consisting of a linear, branched, or cyclic alkyl group containing one to eight carbon atoms, any of which may be further substituted with at least one hydroxy group, and which may be optionally substituted with amide, ether, and combinations thereof; and $R^3$ and $R^4$ are independently a linear, branched, or cyclic alkyl group containing one to eight carbon atoms, any of which may be further substituted with at least one hydroxy group, and which may be optionally substituted with amide, ether, and combinations thereof; $R^3$ and $R^4$ may be independently selected from methyl, ethyl or phenyl, or may be methyl.

Formula VIIa

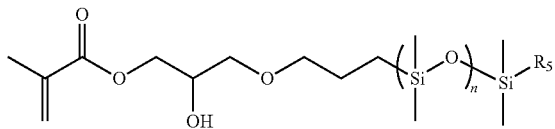

Formula VIIb

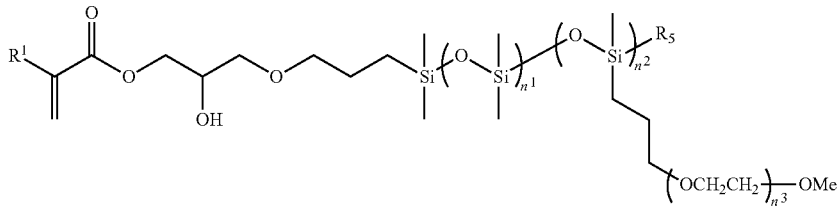

Formula VIIIa

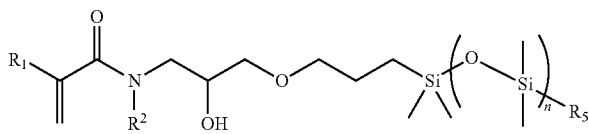

Formula VIIIb

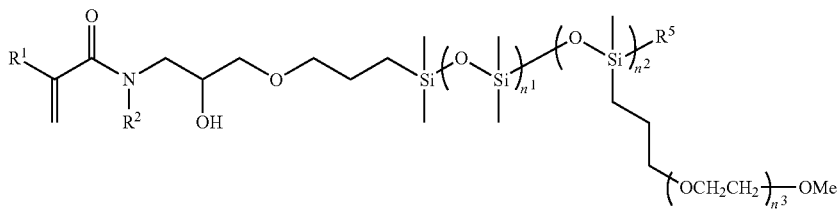

Formula VIIIc          Formula VIIId

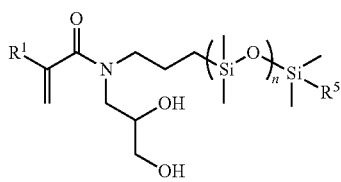     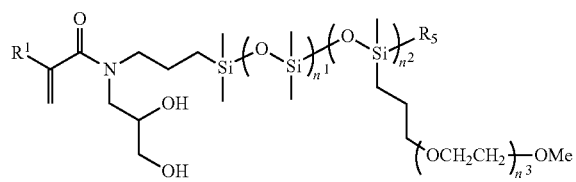

Formula IXa

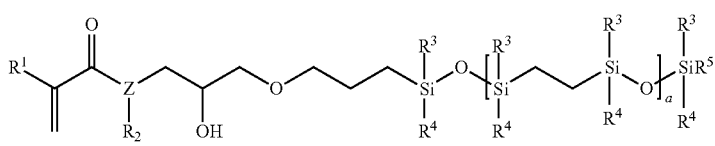

Formula IXb

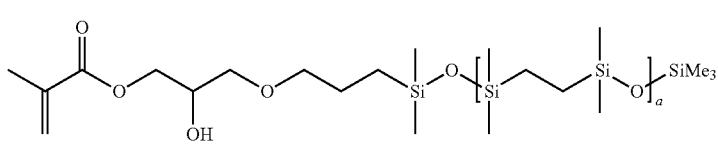

The second hydroxyl-containing silicone component may be selected from the group consisting of a second monofunctional hydroxyl substituted, poly(disubstituted siloxane) of general Formula VI, or compounds of Formulae VIIa-IX having 10 to 200 siloxane repeating units and a multifunctional hydroxyl substituted, poly(disubstituted siloxane) of Formula X having 10 to 500, or 10 to 200, or 10 to 100 siloxane repeating units, and mixtures thereof:

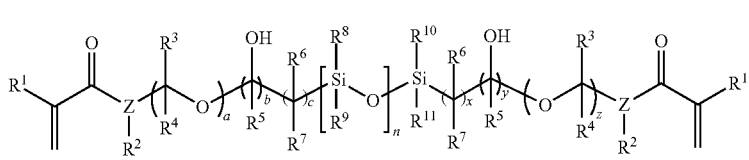

Formula X wherein in Formula X, Z is selected from O, N, S or $NCH_2CH_2O$; wherein $R^1$ is independently a hydrogen atom or methyl group; for Z=O and S, $R^2$ is not required;

$R^2, R^3, R^4, R^5, R^6, R^7$ are independently selected from the group consisting of a hydrogen atom or any of the substituents defined for $R^8$ through $R^{11}$;

$R^8, R^9, R^{10}, R^{11}$ are independently selected from the group consisting of a linear, branched, or cyclic alkyl group containing one to eight carbon atoms, any of which may be further substituted with at least one hydroxy group, amido, ether, amino, carboxyl, carbonyl groups and combinations; a linear or branched alkyleneoxy group, specifically ethyleneoxy groups, $[CH_2CH_2O]_p$ wherein p is between 1 and 200, or 1 and 100, or 1 and 50, or 1 and 25, or 1 and 20, optionally substituted with one or more hydroxyl, amino, amido, ether, carbonyl, carboxyl, and combinations thereof; a $C_1$-$C_6$ linear or branched fluoroalkyl groups optionally substituted with one or more hydroxyl, amino, amido, ether, carbonyl, carboxyl, and combinations thereof; a substituted or un-substituted aryl groups, specifically phenyl groups, wherein the substituents are selected from halogen, hydroxyl, alkoxy, alkylcarbonyl, carboxy, and linear or branched or cyclic alkyl groups which may be further substituted with halogen, hydroxyl, alkoxy, alkylcarbonyl, and carboxyl groups, and combinations thereof;

a, b, c, x, y and z are independently between 0 and 100, between 0 and 50, between 0 and 20, between 0 and 10, or between 0 and 5, and may be ordered in any molecular sequence to make a wide range of substituted hydroxy-oxaalkylene chains, and n is the number of siloxane repeating units and is from 10 to 500; 10 to 200; 10 to 100; 10 to 50; 10 to 20.

The weight ratio of the first mono-functional hydroxyl-substituted poly(disubstituted siloxane) to the second hydroxyl-substituted poly(disubstituted siloxane) is in a range of 0.1 to 2, or 0.1 to 1.

The hydroxyl-containing silicone components may comprise a mixture of a first mono-functional hydroxyl-substituted poly(disubstituted siloxane) of Formula VI, or VIIa-IX where n is from 4 to 8 and a second hydroxyl-substituted poly(disubstituted siloxane) selected from the group consisting of a mono-functional hydroxyl-substituted poly(disubstituted siloxane) of Formula VI or VIIa to IX, wherein n is from 10-200, 10-100 or 10-20 and a di-functional hydroxyl-substituted poly(disubstituted siloxane) of Formula XI

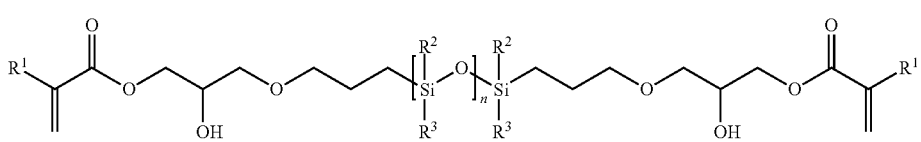

Formula XI wherein $R^1$ is independently a hydrogen atom or methyl group; $R^2$ and $R^3$ are independently a linear, branched, or cyclic alkyl group containing one to eight carbon atoms, any of which may be further substituted with at least one hydroxy group, amido, ether, amino, carboxyl, carbonyl groups and combinations thereof; or are independently selected from unsubstituted $C_{1-4}$ alkyl groups and $C_{1-4}$ alkyl groups substituted with hydroxyl or ether; or are selected from methyl, ethyl or —$(CH_2CH_2O)_xOCH_3$ where x=1-5-, 1-20, and 1-20; and n=1-200, 1-100, and 1-50.

The hydroxyl-containing silicone components may comprise a mixture of a first mono-functional hydroxyl-substituted poly(disubstituted siloxane) of Formula VI, or VIIa-IX where n is from 4 to 8, a second hydroxyl-substituted poly(disubstituted siloxane) selected from the group consisting of a mono-functional hydroxyl-substituted poly(disubstituted siloxane) of Formula VI or VIIa to IX, wherein n is from 10-200, 10-100 or 10-20, and a di-functional hydroxyl-substituted poly(disubstituted siloxane) of Formula XI.

Examples of multifunctional hydroxyl containing silicones include α-(2-hydroxy-1-methacryloxypropyloxypropyl)-ω-butyl-decamethylpentasiloxane and those of Formula XII:

Formula XII

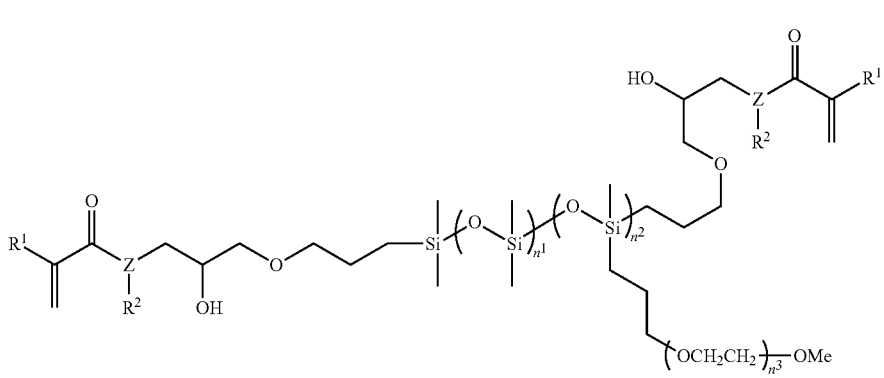

wherein in Formula XII, Z is selected from O, N, S or NCH$_2$CH$_2$O; wherein R$^1$ is independently a hydrogen atom or methyl group; for Z=O and S, R$^2$ is not required; R$^2$ is selected from the group consisting of H or a linear, branched, or cyclic alkyl group containing one to eight carbon atoms, any of which may be further substituted with at least one hydroxy group, amido, ether, amino, carboxyl, carbonyl groups and combinations; a linear or branched alkyleneoxy group, specifically ethyleneoxy groups, [CH$_2$CH$_2$O]$_p$ wherein p is between 1 and 200, or 1 and 100, or 1 and 50, or 1 and 25, or 1 and 20, optionally substituted with one or more hydroxyl, amino, amido, ether, carbonyl, carboxyl, and combinations thereof; a C$_1$-C$_6$ linear or branched fluoroalkyl groups optionally substituted with one or more hydroxyl, amino, amido, ether, carbonyl, carboxyl, and combinations thereof; a substituted or un-substituted aryl groups, specifically phenyl groups, wherein the substituents are selected from halogen, hydroxyl, alkoxy, alkylcarbonyl, carboxy, and linear or branched or cyclic alkyl groups which may be further substituted with halogen, hydroxyl, alkoxy, alkylcarbonyl, and carboxyl groups, and combinations thereof; and n$^1$ and n$^2$ are independently selected from is 4 to 100; 4 to 50; or 4 to 25, and n$^3$ is 1-50, 1-20, and 1-10.

The ratio of the first hydroxyl-containing silicone component to any of the above described second hydroxyl substituted, poly(disubstituted siloxane) can be in a range of 0.2-1.3, 0.4-1.3, 0.4-1 and 0.6-1.

The hydroxyl-containing silicone components may be present in amounts between about 40-about 70 wt %, or about 45-about 70 wt %.

Silicone-Containing Compounds without Hydroxyl Functionality

Additional silicone-containing compounds without hydroxyl functionality may also be included. Suitable examples include those of Formula XIII:

Formula XIII

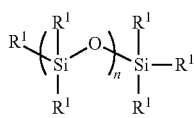

wherein in Formula XIII at least one R$^1$ is a monovalent reactive group, and the remaining R$^1$ are independently selected from monovalent reactive groups, monovalent alkyl groups, or monovalent aryl groups, any of the foregoing which may further comprise functionality selected from hydroxy, amino, oxa, carboxy, alkyl carboxy, alkoxy, amido, carbamate, carbonate, halogen or combinations thereof; fluoroalkyl alkyl or aryl groups; partially fluorinated alkyl or aryl groups; halogens; linear, branched or cyclic alkoxy or aryloxy groups; linear or branched polyethyleneoxyalkyl groups, polypropyleneoxyalkyl groups, or poly(ethyleneoxy-co-propyleneoxyalkyl groups; and monovalent siloxane chains comprising between 1-100 siloxane repeat units which may further comprise functionality selected from alkyl, alkoxy, hydroxy, amino, oxa, carboxy, alkyl carboxy, alkoxy, amido, carbamate, halogen or combinations thereof; and wherein n is 0 to 500 or 0 to 200, or 0 to 100, or 0 to 20, where it is understood that when n is other than 0, n is a distribution having a mode equal to a stated value.

In Formula XIII, from one to three R$^1$ may comprise monovalent reactive groups. Suitable monovalent alkyl and aryl groups include unsubstituted and substituted monovalent linear, branched or cyclic C$_1$ to C$_{16}$ alkyl groups, or unsubstituted monovalent C$_1$ to C$_6$ alkyl groups, such as substituted and unsubstituted methyl, ethyl, propyl, butyl, substituted or unsubstituted C$_6$-C$_{14}$ aryl groups, or a substituted or un-substituted C$_6$ aryl group, wherein the substituents include amido, ether, amino, halo, hydroxyl, carboxyl, carbonyl groups; or a phenyl or benzyl group, combinations thereof and the like.

When one R$^1$ is a monovalent reactive group, the additional silicone containing compounds may be selected from the polydisubstituted siloxane macromer of Formula XIVa or XIVb; the styryl polydisubstituted siloxane macromer of Formula XVa or XVb; or the carbosilane of Formula XVc:

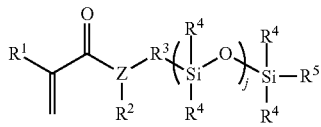

Formula XIVa

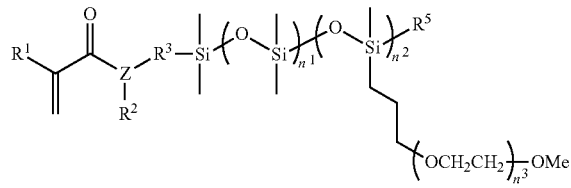

Formula XIVb

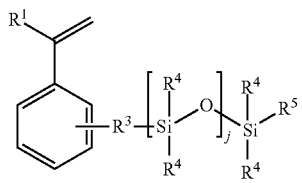

Formula XVa

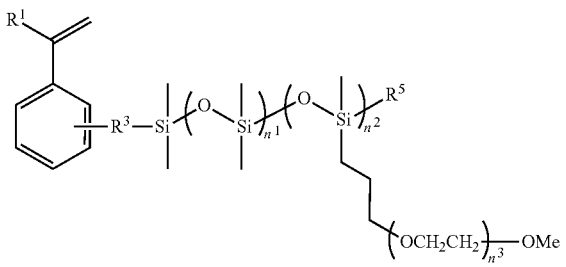

Formula XVb

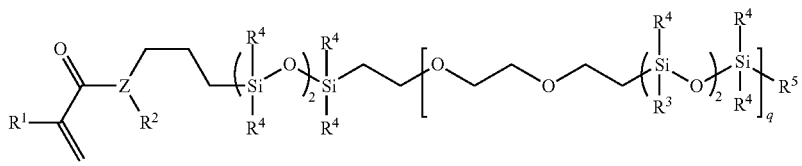

Formula XVc wherein $R^1$ is a hydrogen atom or methyl; Z is selected from O, N, S or $NCH_2CH_2O$; when Z=O or S, $R^2$ is not required; wherein $R^2$ is selected from the group consisting of H or a linear, branched, or cyclic alkyl group containing one to eight carbon atoms, any of which may be further substituted with at least one hydroxy group, amido, ether, amino, carboxyl, carbonyl groups and combinations; a linear or branched alkyleneoxy group, specifically ethyleneoxy groups, $[CH_2CH_2O]_p$ wherein p is between 1 and 200, or 1 and 100, or 1 and 50, or 1 and 25, or 1 and 20, optionally substituted with one or more hydroxyl, amino, amido, ether, carbonyl, carboxyl, and combinations thereof; a $C_1$-$C_6$ linear or branched fluoroalkyl groups optionally substituted with one or more hydroxyl, amino, amido, ether, carbonyl, carboxyl, and combinations thereof; a substituted or un-substituted aryl groups, specifically phenyl groups, wherein the substituents are selected from halogen, hydroxyl, alkoxy, alkylcarbonyl, carboxy, and linear or branched or cyclic alkyl groups which may be further substituted with halogen, hydroxyl, alkoxy, alkylcarbonyl, and carboxyl groups, and combinations thereof; wherein $R^3$ is a substituted or unsubstituted $C_{1-6}$, $C_{1-4}$ or $C_{2-4}$ alkylene segment $(CH_2)_r$ each methylene group may optionally be independently substituted with ethers, amines, carbonyls, carboxylates, carbamates and combinations thereof; or an oxyalkylene segment $(OCH_2)_k$ and k is a whole number from one to three, or wherein $R^3$ may be a mixture of alkylene and oxyalkylene segments and the sum of r and k is between 1 and 9; wherein each $R^4$ is independently a linear, branched, or cyclic alkyl group containing between one and six carbon atoms, a linear, branched, or cyclic alkoxy group containing between one and six carbon atoms, a linear or branched polyethyleneoxyalkyl group, a phenyl group, a benzyl group, a substituted or un-substituted aryl group, a fluoroalkyl group, a partially fluorinated alkyl group, a perfluoroalkyl group, a fluorine atom, or combinations thereof; wherein $R^5$ is a substituted or un-substituted linear or branched alkyl group having 1 to eight carbon atoms, or 1 to 4 carbon atoms, or methyl or butyl; or an aryl group, any of which may be substituted with one or more fluorine atoms; wherein j is a whole number between 1 and 20; wherein q is up to 50, 5 to 30 or 10-25; and wherein $n^1$ and $n^2$ are independently selected from is 4 to 100; 4 to 50; or 4 to 25, and $n^3$ is 1-50, 1-20, and 1-10.

When Z is O, non-limiting examples of polysiloxane macromers include mono-methacryloxypropyl terminated mono-n-butyl terminated polydimethylsiloxanes (mPDMS) as shown in Formula XVI wherein n is between 3 and 15; mono-methacryloxypropyl terminated mono-n-alkyl terminated polydimethylsiloxanes, mono-n-alkyl terminated, polydimethyl, polyethylene glycol siloxanes as shown in Formula XVIIa and XVIIb wherein $R^1$ is a proton or methyl group; wherein $R^5$ may be $C_1$-$C_4$ alkyl or methyl or butyl; wherein n is 3-15; wherein $n^1$ and $n^2$ are between 4 to 100, 4 to 50, or 4 to 25, and $n^3$ is 1-50, 1-20, or 1-10; and macromers having the chemical structures as shown in formulae XVIIIa through XXIb wherein $R^1$ is a proton or methyl group; wherein n is between 4-100, 4 and 20, or between 3 and 15; wherein $n^1$ and $n^2$ are between 4 to 100, 4 to 50, or 4 to 25, and $n^3$ is 1-50, 1-20, or 1-10; and $R^5$ may be $C_1$-$C_4$ alkyl or methyl or butyl.

Formula XVI

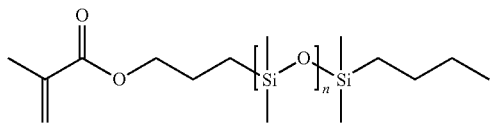

Formula XVIIa

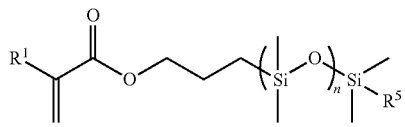

Formula XVIIb

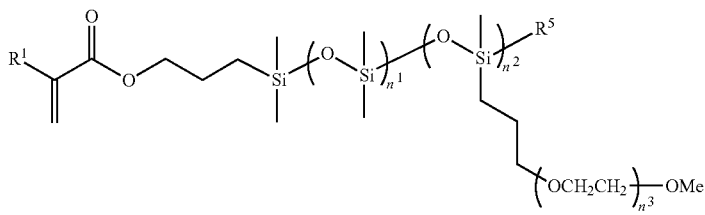

Formula XVIIIa

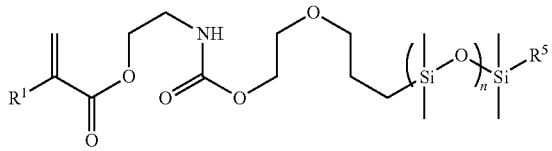

Formula XVIIIb

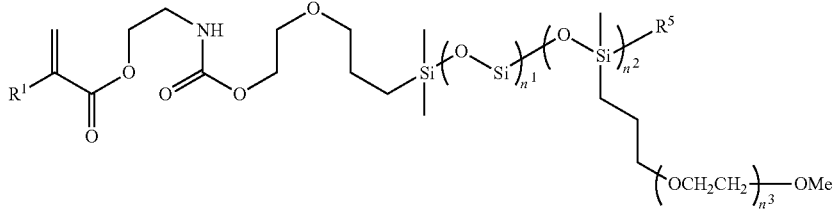

Formula XIX

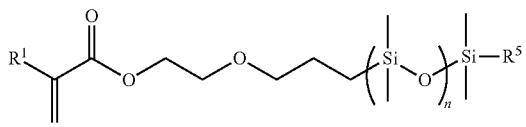

Formula XX

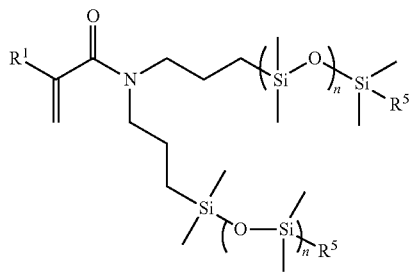

Formula XXIa

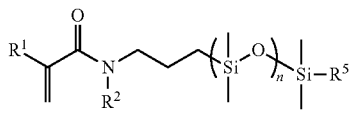

Formula XXIb

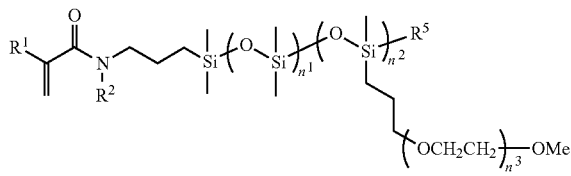

Examples of suitable mono(meth)acryloxyalkylpolydisubstituted siloxanes include mono(meth)acryloxypropyl terminated mono-n-butyl terminated polydimethylsiloxane, mono(meth)acryloxypropyl terminated mono-n-methyl terminated polydimethylsiloxane, mono(meth)acryloxypropyl terminated mono-n-butyl terminated polydiethylsiloxane, mono(meth)acryloxypropyl terminated mono-n-methyl terminated polydiethylsiloxane, mono(meth)acrylamidoalkyl-polydialkylsiloxanes mono(meth)acryloxyalkyl terminated mono-alkyl polydiarylsiloxanes, and mixtures thereof.

In Formula XIII, when n is zero, one $R^1$ may be a monovalent reactive group, and at least 3 $R^1$ are selected from monovalent alkyl groups having 1 to 16, 1 to 6 or 1-4 carbon atoms. Non-limiting examples of silicone components include, 3-methacryloxypropyltris(trimethylsiloxy)silane (TRIS), 3-methacryloxypropyl-bis(trimethylsiloxy)methylsilane, and 3-methacryloxypropylpentamethyldisiloxane.

The number of siloxane repeating units, n, may also be 2 to 50, 3 to 25, or 3 to 15; wherein at least one terminal $R^1$ comprises a monovalent reactive group and the remaining $R^1$ are selected from monovalent alkyl groups having 1 to 16 carbon atoms, or from monovalent alkyl groups having 1 to 6 carbon atoms. Non-hydroxyl containing silicone compounds may also include those where n is 3 to 15, one terminal $R^1$ comprises a monovalent reactive group, the other terminal $R^1$ comprises a monovalent alkyl group having 1 to 6 carbon atoms and the remaining $R^1$ comprise monovalent alkyl group having 1 to 3 carbon atoms. Non-limiting examples of silicone components include monomethacryloxypropyl n-butyl terminated polydimethylsiloxanes ($M_n$=800-1000), (mPDMS, as shown in XXII).

Formula XXII

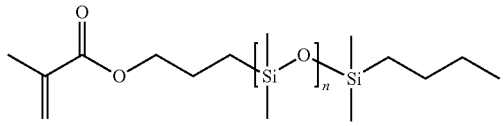

Formula XIII may also include compounds where n is 5 to 400 or from 10 to 300, both terminal $R^1$ comprise monovalent reactive groups and the remaining $R^1$ are independently of one another selected from monovalent alkyl groups having 1 to 18 carbon atoms which may have ether linkages between carbon atoms and may further comprise halogen.

One to four $R^1$ in Formula XIII may comprise a vinyl carbonate or vinyl carbamate of Formula XXIIIa:

Formula XXIIIa

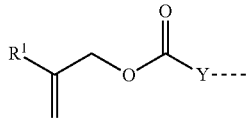

wherein Y denotes O—, S— or NH—; $R^1$ denotes a hydrogen atom or methyl.

The silicone-containing vinyl carbonate or vinyl carbamate monomers specifically include: 1,3-bis[4-(vinyloxycarbonyloxy)but-1-yl]tetramethyl-di siloxane; 3-(vinyloxycarbonylthio) propyl-[tris (trimethylsiloxy)silane]; 3-[tris(trimethyl siloxy)silyl] propyl allyl carbamate; 3-[tris(trimethylsiloxy)silyl] propyl vinyl carbamate; trimethylsilylethyl vinyl carbonate; trimethylsilylmethyl vinyl carbonate, and the crosslinking agent of Formula XXIIIb.

Formula XXIIIb

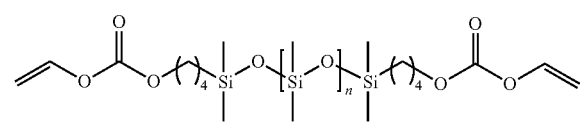

Where biomedical devices with moduli below about 200 psi are desired, only one $R^1$ comprises a monovalent reactive group and no more than two of the remaining $R^1$ groups comprise monovalent siloxane groups.

Another suitable silicone-containing macromer is compound of Formula XXIV in which the sum of x and y is a number in the range of 10 to 30. The silicone containing macromer of Formula XXIV is formed by the reaction of fluoroether, hydroxy-terminated polydimethylsiloxane, isophorone diisocyanate and isocyanatoethylmethacrylate.

Formula XXIV

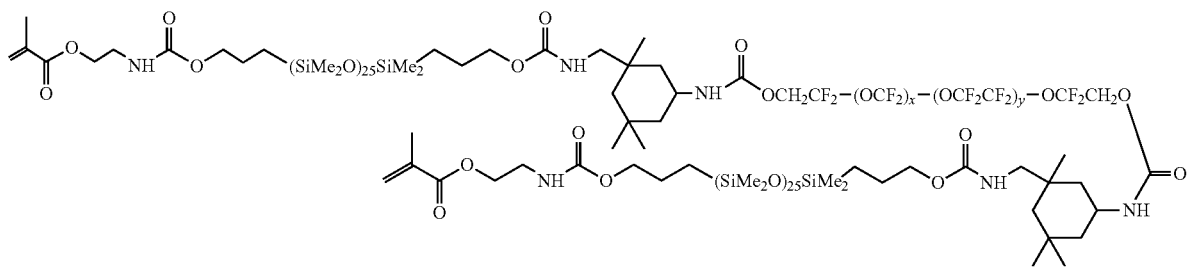

The non-hydroxyl containing silicone-containing component may be selected from non-hydroxyl containing acrylamide silicones of U.S. Pat. No. 8,415,405. Other silicone components suitable for use in this invention include those described is WO 96/31792 such as macromers containing polysiloxane, polyalkylene ether, diisocyanate, polyfluorinated hydrocarbon, polyfluorinated ether and polysaccharide groups. Another class of suitable silicone-containing components includes silicone-containing macromers made via GTP, such as those disclosed in U.S. Pat. Nos. 5,314,960, 5,331,067, 5,244,981, 5,371,147, and 6,367,929. U.S. Pat. Nos. 5,321,108, 5,387,662, and 5,539,016 describe polysiloxanes with a polar fluorinated graft or side group having a hydrogen atom attached to a terminal difluoro-substituted carbon atom. US 2002/0016383 describes hydrophilic siloxanyl methacrylates containing ether and siloxanyl linkages and crosslinkable monomers containing polyether and polysiloxanyl groups. Any of the foregoing polysiloxanes can also be used as the silicone-containing component in this invention.

In one embodiment where a modulus of less than about 120 psi is desired, the majority of the mass fraction of the silicone-containing components used in the lens formulation should contain only one polymerizable functional group.

The non-hydroxyl containing silicone component may be selected from the group consisting of monomethacryloxypropyl terminated, mono-n-alkyl terminated linear poly di substituted siloxane; methacryloxypropyl-terminated linear poly di substituted siloxane; and mixtures thereof.

The non-hydroxyl containing silicone component may also be selected from monomethacrylate terminated, $C_1$-$C_4$ alkyl terminated, linear polydimethylsiloxanes; and mixtures thereof.

In some instances, the non-hydroxyl functionalized silicone-containing component may be used in amounts up to about 10 wt %. Examples include those selected from mPDMS of Formula XXII where $R^5$ is methyl or butyl, compounds of Formulae XXVIa, XVIIb through XVIIIb, XX, XXIa, XXIb and the macromers shown in Formula XXV or XXVI where n is n is 1-50 and m is 1-50, 1-20 or 1-10:

Formula XXV

Formula XXVI

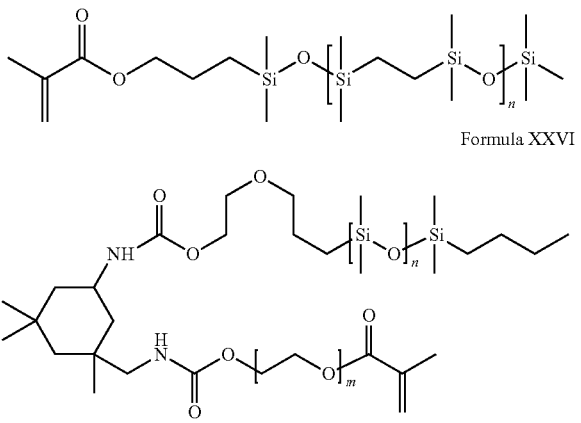

Specific examples of non-hydroxyl functionalized silicone-containing components include mPDMS of Formula XVIIa, compounds of Formulae XVIII or XIX where $R^1$ is methyl and $R^5$ is selected from methyl or butyl and the macromers shown in Formula XXV where n is 1-50 or 4-40, 4-20.

Specific examples of silicone containing crosslinkers include bismethacryloxypropyl polydimethyl siloxane, where n may be 4-200, or 4-150, and the following compounds of Formula XXVIIa-XXVIIIc, where $n^1$ and $n^2$ are independently selected from 4 to 100; 4 to 50; or 4 to 25; $n^3$ is 1-50, 1-20 or 1-10; n is 1-100, 1-50, 1-20 or 1-10; m is 1-100, 1-50, 1-20 or 1-10; s is up to 50, 5-30 or 10-25; and q is up to 50, 5-30 or 10-25.

Formula XXVIIa

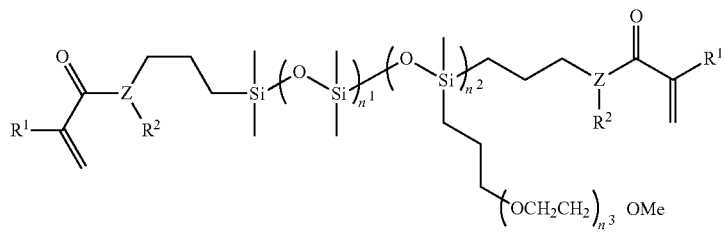

Formula XXVIIb

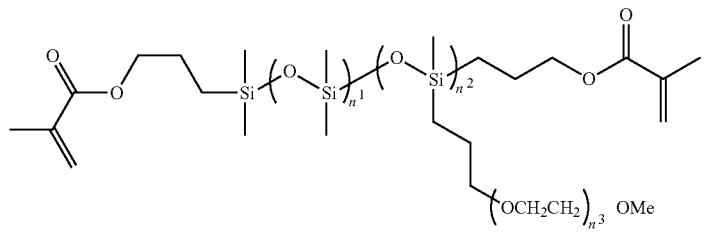

Formula XXVIIc

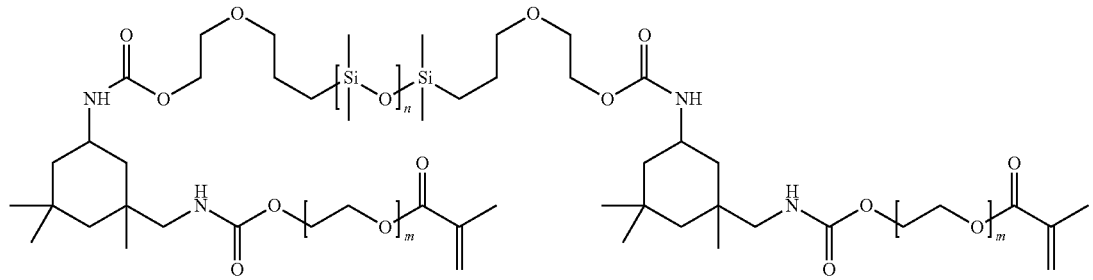

Formula XXVIIIa

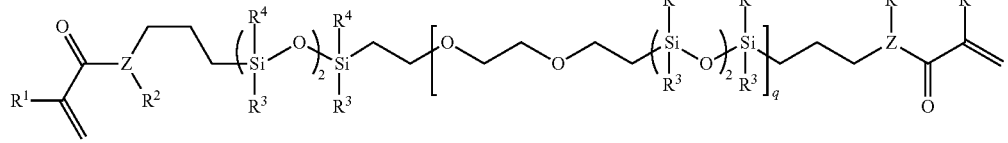

Formula XXVIIIb

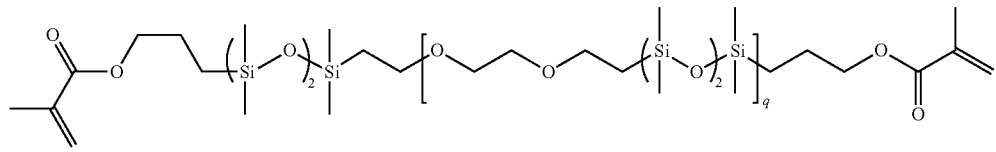

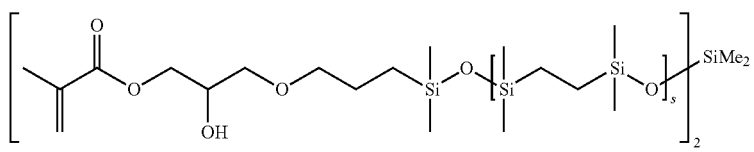

Formula XXVIIIc

The non-hydroxyl containing silicone component may have an average molecular weight of from about 400 to about 4000 Daltons.

The silicone-containing component(s) (both hydroxyl and non-hydroxyl containing) may be present in amounts up to about 85 weight %, or from about 10 and about 80, or from about 20 and about 75 weight %, based upon all reactive components of the reactive mixture (e.g., excluding diluents).

Charged Reactive Component

The reactive monomer mixture may further comprise at least one reactive component which is charged under physiological conditions. The charged monomer may be selected from anions, cations, zwitterions, betaines, and mixtures thereof.

The charged monomers, when incorporated into the silicone hydrogels of the present invention, provide a net negative charge distribution. Anionic monomers comprise at least one anionic group and at least one reactive group. Specifically, the anionic group can include, but is not limited to, carboxylate groups, phosphates, sulfates, sulfonates, phosphonates, borates, and mixtures thereof. The anionic groups may comprise from three to ten carbon atoms, or from three to eight carbon atoms. The anionic groups may comprise carboxylic acid groups. Specifically, the charged monomer may be a carboxylic acid monomer selected from the group consisting of acrylic acid, methacrylic acid, fumaric acid, maelic acid, itaconic acid, crotonic acid, cinnamic acid, vinylbenzoic acid, monoesters of furmaric acid, maelic acid, and itaconic acid, and mixtures thereof.

The charged monomer may also comprise a mixture of anionic and cationic monomer.

The charged monomer can be a zwitterionic monomer. Zwitterionic monomers comprise at least one zwitterionic group and at least one reactive group. As used herein, the term "zwitterion" refers to a neutral chemical compound with both a positive and negative electrical charge. Zwitterionic monomers include betaine monomers.

The charged monomer can be a betaine monomer. Betaine monomers comprise at least one betaine group and at least one reactive group. As used herein, the term "betaine" refers to a neutral chemical compound with a positively charged cationic functional group such as a quaternary ammonium or phosphonium cation which bears no hydrogen atom and with negatively charged functional group such as a carboxylate group which may not be adjacent to the cationic site.

The charged monomer contains at least one polymerizable group, or reactive group. Reactive groups include groups that can undergo free radical polymerization. Non-limiting examples of free radical reactive groups include (meth)acrylates, styryls, vinyls, vinyl ethers, $C_{1-6}$ alkyl(meth)acrylates, (meth)acrylamides, $C_{1-6}$ alkyl (meth)acrylamides, N-vinyllactams, N-vinylamides, $C_{2-12}$ alkenyls, $C_{2-12}$ alkenylphenyls, $C_{2-12}$ alkenylnaphthyls, $C_{2-6}$ alkenylphenyl, $C_{1-6}$ alkyls, 0-vinylcarbamates, and 0-vinylcarbonates.

Examples of "charged monomers" include (meth)acrylic acid, N-[(ethenyloxy)carbonyl]-β-alanine (VINAL, CAS #148969-96-4), 3-acrylamidopropanoic acid (ACA1), 5-acrylamidopropanoic acid (ACA2), 3-acrylamido-3-methylbutanoic acid (AMBA), 2-(methacryloyloxy)ethyl trimethylammonium chloride (Q Salt or METAC), 2-acrylamido-2-methylpropane sulfonic acid (AMPS), 1-propanaminium, N-(2-carboxyethyl)-N,N-dimethyl-3-[(1-oxo-2-propen-1-yl)amino]-, inner salt (CBT, carboxybetaine; CAS 79704-35-1), 1-propanaminium, N,N-dimethyl-N-[3-[(1-oxo-2-propen-1-yl)amino]propyl]-3-sulfo-, inner salt (SBT, sulfobetaine, CAS 80293-60-3), 3,5-Dioxa-8-aza-4-phosphaundec-10-en-1-aminium, 4-hydroxy-N,N,N-trimethyl-9-oxo-, inner salt, 4-oxide (9CI) (PBT, phosphobetaine, CAS 163674-35-9, 2-methacryloyloxyethyl phosphorylcholine, 3-(dimethyl(4-vinylbenzyl)ammonio) propane-1-sulfonate (DMVBAPS), 3-((3-acrylamidopropyl) dimethylammonio)propane-1-sulfonate (AMPDAPS), 3-((3-methacrylamidopropyl)dimethylammonio)propane-1-sulfonate (MAMPDAPS), 3-((3-(acryloyloxy)propyl)dimethylammonio)propane-1-sulfonate (APDAPS), methacryloyloxy)propyl)dimethylammonio)propane-1-sulfonate (MAPDAPS).

The charged monomer may be selected from (meth) acrylic acid, 3-acrylamidopropanoic acid (ACA1), 5-acrylamidopropanoic acid (ACA2), and mixtures thereof.

The charged monomer can be present in an amount up to about 10 weight percent (wt. %), based on the total weight of the reaction monomer mixture, including a range of about 0.5 to about 5 wt. %, about 0.5 to about 3 wt. %, about 0.5 to about 2 wt. %, about 1 to about 10 wt. %, about 1 to about 5 wt. %, about 1 to about 3 wt. %, and about 1 to about 2 wt. %.

Hydrophilic Components

The reactive monomer mixture also includes at least one hydrophilic component selected from hydrophilic monomers and macromers. Hydrophilic monomers can be any of the hydrophilic monomers known to be useful to make hydrogels. Examples of suitable families of hydrophilic monomers include N-vinyl amides, N-vinylimides, N-vinyl lactams, (meth)acrylates, (meth)acrylamides, styrenes, vinyl ethers, 0-vinyl carbonates, 0-vinyl carbamates, N-vinyl ureas, other hydrophilic vinyl compounds and mixtures thereof.

The hydrophilic monomers that may be used to make the polymers of this invention have at least one polymerizable double bond and at least one hydrophilic functional group. Such hydrophilic monomers may themselves be used as crosslinking agents, however, where hydrophilic monomers having more than one polymerizable functional group are used, their concentration should be limited as discussed above to provide a contact lens having the desired modulus. The term "vinyl-type" or "vinyl-containing" monomers refer to monomers containing the vinyl grouping (—CH═$CH_2$) and are generally highly reactive. Such hydrophilic vinyl-containing monomers are known to polymerize relatively easily.

"Acrylic-type" or "acrylic-containing" monomers are those monomers containing an acrylic group (CH$_2$=CRCOX) wherein R is H or CH$_3$, and X is O or N, which are also known to polymerize readily, such as N,N-dimethyl acrylamide (DMA), 2-hydroxyethyl methacrylamide, polyethyleneglycol monomethacrylate, methacrylic acid, acrylic acid, mixtures thereof and the like.

Non-limiting examples of hydrophilic (meth)acrylate and (meth)acrylamide monomers include: acrylamide, N-isopropyl acrylamide, N,N-dimethylaminopropyl (meth)acrylamide, N,N-dimethyl acrylamide (DMA), N-2-hydroxyethyl (meth)acrylamide, 2,3-dihydroxypropyl (meth)acrylamide, N,N-bis(2-hydroxyethyl) (meth)acrylamide, N-(2-hydroxypropyl) (meth)acrylamide, N,N-bis(2-hydroxypropyl) (meth)acrylamide, N-(3-hydroxypropyl) (meth)acrylamide, vinyl acetate, acrylonitrile, and mixtures thereof.

Non-limiting examples of hydrophilic N-vinyl lactam and N-vinyl amide monomers include: N-vinyl pyrrolidone (NVP), N-vinyl-2-piperidone, N-vinyl-2-caprolactam, N-vinyl-3-methyl-2-caprolactam, N-vinyl-3-methyl-2-piperidone, N-vinyl-4-methyl-2-piperidone, N-vinyl-4-methyl-2-caprolactam, N-vinyl-3-ethyl-2-pyrrolidone, N-vinyl-4,5-dimethyl-2-pyrrolidone, N-vinyl acetamide (NVA), N-vinyl-N-methylacetamide (VMA), N-vinyl-N-ethyl acetamide, N-vinyl-N-ethyl formamide, N-vinyl formamide, N-vinyl-N-methylpropionamide, N-vinyl-N-methyl-2-methylpropionamide, N-vinyl-2-methylpropionamide, N-vinyl-N,N'-dimethylurea, 1-methyl-3-methylene-2-pyrrolidone, 1-methyl-5-methylene-2-pyrrolidone, 5-methyl-3-methylene-2-pyrrolidone; 1-ethyl-5-methylene-2-pyrrolidone, N-methyl-3-methylene-2-pyrrolidone, 5-ethyl-3-methylene-2-pyrrolidone, 1-N-propyl-3-methylene-2-pyrrolidone, 1-N-propyl-5-methylene-2-pyrrolidone, 1-isopropyl-3-methylene-2-pyrrolidone, 1-isopropyl-5-methylene-2-pyrrolidone, N-vinyl-N-ethyl acetamide, N-vinyl-N-ethyl formamide, N-vinyl formamide, N-vinyl isopropylamide, N-vinyl caprolactam, N-carboxyvinyl-β-alanine (VINAL), N-carboxyvinyl-α-alanine, N-vinylimidazole, and mixtures thereof.

Non-limiting examples of hydrophilic O-vinyl carbamates and O-vinyl carbonates monomers include: N-2-hydroxyethyl vinyl carbamate and N-carboxy-β-alanine N-vinyl ester. Further examples of the hydrophilic vinyl carbonate or vinyl carbamate monomers are disclosed in U.S. Pat. No. 5,070,215, and the hydrophilic oxazolone monomers are disclosed in U.S. Pat. No. 4,910,277.

Other hydrophilic vinyl compounds include ethylene glycol vinyl ether (EGVE), di(ethylene glycol) vinyl ether (DEGVE), allyl alcohol, 2-ethyl oxazoline, vinyl acetate, acrylonitrile, and mixtures thereof.

Other suitable hydrophilic monomers will be apparent to one skilled in the art.

The hydrophilic components of the present invention may also be macromers of linear or branched poly(ethylene glycol), poly(propylene glycol), or statistically random or block copolymers of ethylene oxide and propylene oxide. The macromers of these polyethers have one or more reactive group. Non-limiting examples of such reactive groups are acrylates, methacrylates, styrenes, vinyl ethers, acrylamides, methacrylamides, and other vinyl compounds. In one embodiment, the macromers of these polyethers comprise (meth)acrylates, (meth)acrylamides, and mixtures thereof.

The hydrophilic monomers which may be incorporated into the polymers disclosed herein may be selected from N,N-dimethyl acrylamide (DMA), 2-hydroxyethyl acrylamide, 2-hydroxyethyl methacrylamide, N-hydroxypropyl methacrylamide, bishydroxyethyl acrylamide, 2,3-dihydroxypropyl (meth)acrylamide, N-vinylpyrrolidone (NVP), N-vinyl-N-methyl acetamide, N-vinyl methacetamide (VMA), and polyethyleneglycol monomethacrylate.

The hydrophilic monomers may be selected from DMA, NVP, VMA, NVA, and mixtures thereof.

It is a surprising effect of the present invention that silicone hydrogels with a desirable balance of wettability, water content and biocompatibility may be formed from reaction mixtures with 35 wt %, or less or less than about 30 wt %, or less than about 25 wt %, or less than about 20 wt % hydrophilic amide monomers. The hydrophilic amide monomers may be included in the reactive mixtures of the present invention in amounts between about 5 and 28 wt %, or 5 and about 25 wt %, or between about 8 and about 20 wt %.

The hydrophilic components (including the charged components and the hydrophilic hydroxyl components (discussed below), but excluding the polyamide) may be present in amounts up to about 50 wt %, or in an amount in the range of about 10 to about 50 wt. %, or in the range of about 10 to about 40 wt. %, based on the total weight of the reactive components in the reactive monomer mixture.

Hydroxyl Alkyl Methacrylate Monomer

The reactive mixtures of the present invention may further comprise, in addition to the hydrophilic monomer described above, at least one hydroxyalkyl (meth)acrylate where the hydroxyl alkyl group may be selected from $C_2$-$C_4$ mono or dihydroxy substituted alkyl, and poly(ethylene glycol) having 1-10 repeating units; or is selected from 2-hydroxyethyl, 2,3-dihydroxypropyl, or 2-hydroxypropyl.

Examples of suitable hydroxyalkyl (meth)acrylate monomer include 2-hydroxyethyl (meth)acrylate, 3-hydroxypropyl (meth)acrylate, 2-hydroxypropyl (meth)acrylate, 2,3-dihydroxypropyl (meth)acrylate, 2-hydroxybutyl (meth)acrylate, 3-hydroxybutyl (meth)acrylate, 1-hydroxypropyl-2-(meth)acrylate, 2-hydroxy-2-methyl-propyl (meth)acrylate, 3-hydroxy-2,2-dimethyl-propyl (meth)acrylate, 4-hydroxybutyl (meth)acrylate, glycerol (meth)acrylate, polyethyleneglycol monomethacrylate, and mixtures thereof.

The hydroxyalkyl monomer may also be selected from the group consisting of 2-hydroxyethyl methacrylate, glycerol methacrylate, 2-hydroxypropyl methacrylate, hydroxybutyl methacrylate, 3-hydroxy-2,2-dimethyl-propyl methacrylate, and mixtures thereof.

The hydroxyalkyl monomer may comprise 2-hydroxyethyl methacrylate, 3-hydroxy-2,2-dimethyl-propyl methacrylate, hydroxybutyl methacrylate or glycerol methacrylate.

Hydroxyl containing (meth)acrylamides are generally too hydrophilic to be included as compatibilizing hydroxyalkyl monomers, and when included are hydrophilic monomers.

When at least one hydroxyalkyl methacrylate is included, the lower amount of hydroxyalkyl monomers may be selected to provide a haze value to the final lens of less than about 50% or less than about 30%.

It will be appreciated that the amount of hydroxyl component will vary depending upon a number of factors, including, the number of hydroxyl groups on the hydroxyalkyl monomer, the amount, molecular weight and presence of hydrophilic functionality on the silicone containing components. The hydrophilic hydroxyl component may be present in the reactive mixture in amounts up to about 15%, up to about 10 wt %, between about 3 and about 15 wt % or about 5 and about 15 wt %.

Cross-linking Agent

It is generally desirable to add one or more cross-linking agents to the reaction mixture. The cross-linking agents may be selected from bifunctional cross-linkers, trifunctional cross-linkers, tetrafunctional cross-linkers, including silicone-containing and non-silicone containing cross-linking agents, and mixtures thereof. Non-silicone containing cross-linking agents include ethylene glycol dimethacrylate ("EGDMA"), diethyleneglycol dimethacrylate; tetraethylene glycol dimethacrylate (TEGDMA), trimethylolpropane trimethacrylate ("TMPTMA"), glycerol trimethacrylate, 1,3-propanediol dimethacrylate; 2,3-propanediol dimethacrylate; 1,6-hexanediol dimethacrylate; 1,4-butanediol dimethacrylate; triallyl cyanurate (TAC), methacryloxyethyl vinyl carbonate (HEMAVc), allylmethacrylate, methylene bisacrylamide (MBA), polyethylene glycol dimethacrylate (wherein the polyethylene glycol has a molecular weight up to about 5000 Daltons). The cross-linking agents are used in amounts from about 0.000415 to about 0.0156 moles per 100 grams of reactive components in the reaction mixture. Alternatively, if the hydrophilic monomers and/or the silicone-containing components are multifunctional or contain multifunctional impurities, the addition of a crosslinking agent to the reaction mixture is optional. Examples of hydrophilic monomers which can act as the crosslinking agent and when present do not require the addition of an additional crosslinking agent to the reaction mixture include (meth)acrylate and (meth)acrylamide endcapped polyethers.

Further Constituents

The reactive monomer mixture may contain additional components such as, but not limited to, diluents, wetting agents, light absorbing compounds, including UV absorbers and photochromic compounds, tints, pigment and dyes, any of which may be reactive or non-reactive, but capable of being retained in the biomedical device, medicinal agents, antimicrobial compounds, pharmaceutical compounds, nutriceutical compounds, release agents, releasable wetting agents, and combinations thereof.

The reactive components may be mixed in a diluent to form a reaction mixture. Suitable diluents are known in the art. For silicone hydrogels suitable diluents are disclosed in WO 03/022321 and U.S. Pat. No. 6,020,445 the disclosure of which is incorporated herein by reference.

Classes of suitable diluents for silicone hydrogel reaction mixtures include alcohols having 2 to 20 carbons, amides having 10 to 20 carbon atoms derived from primary amines, and carboxylic acids having 8 to 20 carbon atoms. Primary and tertiary alcohols may be used. Preferred classes include alcohols having 5 to 20 carbons and carboxylic acids having 10 to 20 carbon atoms.

Specific diluents which can be used include 1-ethoxy-2-propanol, diisopropylaminoethanol, isopropanol, 3,7-dimethyl-3-octanol, 1-decanol, 1-dodecanol, 1-octanol, 1-pentanol, 2-pentanol, 1-hexanol, 2-hexanol, 2-octanol, 3-methyl-3-pentanol, tert-amyl alcohol, tert-butanol, 2-butanol, 1-butanol, 2-methyl-2-pentanol, 2-propanol, 1-propanol, ethanol, 2-ethyl-1-butanol, (3-acetoxy-2-hydroxypropyloxy) propylbis(trimethylsiloxy)methylsilane, 1-tert-butoxy-2-propanol, 3,3-dimethyl-2-butanol, tert-butoxyethanol, 2-octyl-1-dodecanol, decanoic acid, octanoic acid, dodecanoic acid, 2-(diisopropylamino)ethanol mixtures thereof and the like.

The diluents may include 3,7-dimethyl-3-octanol, 1-dodecanol, 1-decanol, 1-octanol, 1-pentanol, 1-hexanol, 2-hexanol, 2-octanol, 3-methyl-3-pentanol, 2-pentanol, t-amyl alcohol, tert-butanol, 2-butanol, 1-butanol, 2-methyl-2-pentanol, 2-ethyl-1-butanol, ethanol, 3,3-dimethyl-2-butanol, 2-octyl-1-dodecanol, decanoic acid, octanoic acid, dodecanoic acid, mixtures thereof and the like.

The diluents may include 3,7-dimethyl-3-octanol, 1-dodecanol, 1-decanol, 1-octanol, 1-pentanol, 1-hexanol, 2-hexanol, 2-octanol, 1-dodecanol, 3-methyl-3-pentanol, 1-pentanol, 2-pentanol, t-amyl alcohol, tert-butanol, 2-butanol, 1-butanol, 2-methyl-2-pentanol, 2-ethyl-1-butanol, 3,3-dimethyl-2-butanol, 2-octyl-1-dodecanol, mixtures thereof and the like.

Mixtures of diluents may be used. If a diluent is present, generally there are no particular restrictions with respect to the amount of diluent present. When diluent is used, the diluent may be present in an amount in the range of about 2 to about 70 wt %, including in the range of about 5 to about 50 wt %, about 5 to about 45 wt %, about 15 to about 40 wt %, based on the total weight of the reactive mixtures (including reactive and nonreactive components).

A polymerization catalyst may be used in the reaction mixture. The polymerization catalyst or initiator can include at least one of lauryl peroxide, benzoyl peroxide, iso-propyl percarbonate, azobisisobutyronitrile, and the like, that generate free radicals at moderately elevated temperatures, and photoinitiator systems such as aromatic alpha-hydroxy ketones, alkoxyoxybenzoins, acetophenones, acylphosphine oxides, bisacylphosphine oxides, and a tertiary amine plus a diketone, mixtures thereof and the like. Illustrative examples of photoinitiators are 1-hydroxycyclohexyl phenyl ketone, 2-hydroxy-2-methyl-1-phenyl-propan-1-one, bis(2,6-dimethoxybenzoyl)-2,4-4-trimethylpentyl phosphine oxide (DMBAPO), bis(2,4,6-trimethylbenzoyl)-phenyl phosphinthere of eoxide (Irgacure 819), 2,4,6-trimethylbenzyldiphenyl phosphine oxide and 2,4,6-trimethylbenzoyl diphenylphosphine oxide, benzoin methyl ester and a combination of cam-phorquinone and ethyl 4-(N,N-dimethylamino)benzoate.

Commercially available visible light initiator systems include Irgacure® 819, Irgacure® 1700, Irgacure® 1800, Irgacure® 819, Irgacure® 1850 (all from Ciba Specialty Chemicals) and Lucrin® TPO initiator (available from BASF). Commercially available UV photoinitiators include Darocur® 1173 and Darocur® 2959 (Ciba Specialty Chemicals). These and other photoinitiators which may be used are disclosed in Volume III, *Photoinitiators for Free Radical Cationic & Anionic Photopolymerization,* 2nd Edition by J. V. Crivello & K. Dietliker; edited by G. Bradley; John Wiley and Sons; New York; 1998. The initiator is used in the reaction mixture in effective amounts to initiate photopolymerization of the reaction mixture, e.g., from about 0.1 to about 2 parts by weight per 100 parts of reactive monomer. Polymerization of the reaction mixture can be initiated using the appropriate choice of heat or visible or ultraviolet light or other means depending on the polymerization initiator used. Alternatively, initiation can be conducted without a photoinitiator using, for example, e-beam. However, when a photoinitiator is used, the preferred initiators are bisacylphosphine oxides, such as bis(2,4,6-tri-methylbenzoyl)-phenyl phosphine oxide (Irgacure® 819) or a combination of 1-hydroxycyclohexyl phenyl ketone and bis(2,6-dimethoxybenzoyl)-2,4-4-trimethylpentyl phosphine oxide (DMBAPO), and in another embodiment the method of polymerization initiation is via visible light activation.

Polymerization of the reaction mixture can be initiated using the appropriate choice of heat or visible or ultraviolet light or other means depending on the polymerization initiator used. Alternatively, initiation can be conducted without a photoinitiator using, for example, e-beam.

Curing of Silicone Polymer/Hydrogel and Manufacture of Lens

The reactive mixtures of the present invention can be formed by any of the methods known in the art, such as shaking or stirring, and used to form polymeric articles or devices by known methods. The reactive components (hydrophilic monomer, hydroxyl-containing silicone component, cross-linking agent, polyamide, etc.) are mixed together either with or without a diluent to form the reactive mixture.

For examples, the silicone hydrogels may be prepared by mixing reactive components, and, optionally, diluent(s), with a polymerization initiator and curing by appropriate conditions to form a produce that can be subsequently formed into the appropriate shape by lathing, cutting, and the like. Alternatively, the reaction mixture may be placed in a mold and subsequently cure into the appropriate article.

The reactive mixture of the present invention may be cured via any known process for molding the reaction mixture in the production of contact lenses, including spincasting and static casting. Spincasting methods are disclosed in U.S. Pat. No. 3,408,429 and U.S. Pat. No. 3,660,545, and static casting methods are disclosed in U.S. Pat. No. 4,113,224 and U.S. Pat. No. 4,197,266. The contact lenses of this invention may be formed by the direct molding of the silicone hydrogels, which is economical, and enables precise control over the final shape of the hydrated lens. For this method, the reaction mixture is placed in a mold having the shape of the final desired silicone hydrogel and the reaction mixture is subjected to conditions whereby the monomers polymerize, to thereby produce a polymer in the approximate shape of the final desired product.

After curing, the lens may be subjected to extraction to remove unreacted components and release the lens from the lens mold. The extraction may be done using conventional extraction fluids, such organic solvents, such as alcohols or may be extracted using aqueous solutions.

Aqueous solutions are solutions which comprise water. The aqueous solutions of the present invention may comprise at least about 30 weight % water, or at least about 50 weight % water, or at least about 70% water, or at least about 90 weight % water. Aqueous solutions may also include additional water soluble components such as release agents, wetting agents, slip agents, pharmaceutical and nutraceutical components, combinations thereof and the like. Release agents are compounds or mixtures of compounds which, when combined with water, decrease the time required to release a contact lens from a mold, as compared to the time required to release such a lens using an aqueous solution that does not comprise the release agent. The aqueous solutions may comprise less than about 10 weight %, or less than about 5 weight % organic solvents such as isopropyl alcohol, or may be free from organic solvents. The aqueous solutions may not require special handling, such as purification, recycling or special disposal procedures.

In various embodiments, extraction can be accomplished, for example, via immersion of the lens in an aqueous solution or exposing the lens to a flow of an aqueous solution. In various embodiments, extraction can also include, for example, one or more of: heating the aqueous solution; stirring the aqueous solution; increasing the level of release aid in the aqueous solution to a level sufficient to cause release of the lens; mechanical or ultrasonic agitation of the lens; and incorporating at least one leach aid in the aqueous solution to a level sufficient to facilitate adequate removal of unreacted components from the lens. The foregoing may be conducted in batch or continuous processes, with or without the addition of heat, agitation or both.

Some embodiments can also include the application of physical agitation to facilitate leach and release. For example, the lens mold part to which a lens is adhered can be vibrated or caused to move back and forth within an aqueous solution. Other embodiments may include ultrasonic waves through the aqueous solution.

The lenses may be sterilized by known means such as, but not limited to autoclaving.

The contact lenses of the present invention display desirable combination of both mechanical and biological properties including water content, haze, contact angle, modulus, oxygen permeability, lipid uptake, lysozyme uptake and PQ1 uptake, as shown in the following table. All values are prefaced by "about", and the ophthalmic devices of the present invention may have any combination of the listed properties.

TABLE 1

| | | | | | |
|---|---|---|---|---|---|
| [$H_2O$] % | >20 | >30 | >40 | 20-60 | 30-60 |
| % haze | >50 | >30 | | | |
| DCA (°) | >90 | >70 | ≥50 | ≥40 | ≥20 |
| Modulus (psi) | >120 | >110 | 50-120 | 50-110 | |
| Dk (barrers) | >80 | 80-200 | 90-180 | 100-160 | |
| Lipid uptake (µg/lens) | <20 | <10 | <5 | | |
| Lysozyme uptake (µg/lens) | >50 | >100 | >200 | >500 | >700 |
| PQ1 uptake (%) | <10 | <5 | | | |

Lysozyme uptake may also be at least about 800 or between 50 and 1500, 100-1500 or 200-1500 µg/lens.

In addition to displaying desirable stability, the lenses of the present invention also display compatibility with the components of human tears.

Test Methods

It will be appreciated that all of the tests specified herein have a certain amount of inherent error. Standard deviations are shown in parentheses. Accordingly, the results reported herein are not to be taken as absolute numbers, but numerical ranges based upon the precision of the particular test.

Haze was measured by placing a hydrated test lens in borate buffered saline in a clear glass cell at ambient temperature above a flat black background, illuminating from below with a fiber optic lamp (Dolan-Jenner PL-900 fiber optic light with 0.5 inch diameter light guide) at an angle of 66° normal to the lens cell, and capturing an image of the test lens from above, normal to the glass cell with a video camera (DVC 1310C RGB camera or equivalent equipped with a suitable zoom camera lens) placed 14 cm above the lens holder. The background scatter is subtracted from the scatter of the test lens by subtracting an image of a blank cell with borate buffered saline (baseline) using EPIX XCAP V 3.8 software. The subtracted scattered light image is quantitatively analyzed by integrating over the central 10 mm of the test lens and then compared to a frosted glass standard.

The light intensity/power setting was adjusted to achieve a mean grayscale value in the range of 900-910 for the frosted glass standard; at this setting, the baseline mean grayscale value was in the range of 50-70. The mean grayscale values of the baseline and frosted glass standard are recorded and used to create a scale from zero to 100, respectively. In the grayscale analysis, the mean and standard deviations of the baseline, frosted glass, and every test lens was recorded. For each lens, a scaled value was calculated according to the equation: scaled value equals the mean grayscale value (lens minus baseline) divided by the mean grayscale value (frosted glass minus baseline) times by 100. Three to five test lenses are analyzed, and the results are averaged.

Water content was measured gravimetrically. Lenses were equilibrated in packing solution for 24 hours. Each of three test lens are removed from packing solution using a sponge tipped swab and placed on blotting wipes which have been dampened with packing solution. Both sides of the lens are contacted with the wipe. Using tweezers, the test lens are placed in a tared weighing pan and weighed. The two more sets of samples are prepared and weighed. All weight measurements were done in triplicate, and the average of those values used in the calculations. The wet weight is defined as the combined weight of the pan and wet lenses minus the weight of the weighing pan alone.

The dry weight was measured by placing the sample pans in a vacuum oven which has been preheated to 60° C. for 30 minutes. Vacuum was applied until the pressure reaches at least 1 inch of Hg is attained; lower pressures are allowed. The vacuum valve and pump are turned off and the lenses are dried for at least 12 hours; typically overnight. The purge valve is opened allowing dry air or dry nitrogen gas to enter. The oven is allowed reach atmospheric pressure. The pans are removed and weighed. The dry weight is defined as the combined weight of the pan and dry lenses minus the weight of the weighing pan alone. The water content of the test lens was calculated as follows:

$$\% \text{ water content} = \frac{(\text{wet weight} - \text{dry weight})}{i. \text{ wet weight}} \times 100$$

The average and standard deviation of the water content were calculated and the average value reported as the percent water content of the test lens.

The refractive index (RI) of a contact lens was measured by a Leica ARIAS 500 Abbe refractometer in manual mode or by a Reichert ARIAS 500 Abbe refractometer in automatic mode with a prism gap distance of 100 microns. The instrument was calibrated using deionized water at 20° C. (+/−0.2° C.). The prism assembly was opened and the test lens placed on the lower prism between the magnetic dots closest to the light source. If the prism is dry, a few drops of saline were applied to the bottom prism. The front curve of the lens was against the bottom prism. The prism assembly was then closed. After adjusting the controls so that the shadow line appeared in the reticle field, the refractive index was measured. The RI measurement was made on five test lenses. The average RI calculated from the five measurements was recorded as the refractive index as well as its standard deviation.

Oxygen permeability (Dk) was determined by the polarographic method generally described in ISO 9913-1:1996 and ISO 18369-4:2006, but with the following modifications. The measurement was conducted at an environment containing 2.1% oxygen created by equipping the test chamber with nitrogen and air inputs set at the appropriate ratio, for example, 1800 mL/min of nitrogen and 200 mL/min of air. The t/Dk is calculated using the adjusted oxygen concentration. Borate buffered saline was used. The dark current was measured by using a pure humidified nitrogen environment instead of applying MMA lenses. The lenses were not blotted before measuring. Four lenses were stacked instead of using lenses of various thickness (t) measured in centimeters. A curved sensor was used in place of a flat sensor; radius was 7.8 mm. The calculations for a 7.8 mm radius sensor and 10% (v/v) air flow are as follows:

$$Dk/t = (\text{measured current} - \text{dark current}) \times (2.97 \times 10^- \text{smL O}_2/(\mu\text{A-sec-cm}^2\text{-mm Hg})$$

The edge correction was related to the Dk of the material. For all Dk values less than 90 barrers:

$$t/Dk \text{ (edge corrected)} = [1 + (5.88 \times t)] \times (t/Dk)$$

For Dk values between 90 and 300 barrers:

$$t/Dk \text{ (edge corrected)} = [1 + (3.56 \times t)] \times (t/Dk)$$

For Dk values greater than 300 barrers:

$$t/Dk \text{ (edge corrected)} = [1 + (3.16 \times t)] \times (t/Dk)$$

Non-edge corrected Dk was calculated from the reciprocal of the slope obtained from the linear regression analysis of the data wherein the x variable was the center thickness in centimeters and the y variable was the t/Dk value. On the other hand, edge corrected Dk was calculated from the reciprocal of the slope obtained from the linear regression analysis of the data wherein the x variable was the center thickness in centimeters and the y variable was the edge corrected t/Dk value. The resulting Dk value was reported in barrers.

Wettability of lenses was determined using the methods below.

Dynamic contact angle (DCA) was determined by a Wilhelmy plate method using a Cahn DCA-315 instrument at room temperature and using deionized water as the probe solution. The experiment was performed by dipping the lens specimen of known parameter into the packing solution of known surface tension while measuring the force exerted on the sample due to wetting by a sensitive balance. The advancing contact angle of the packing solution on the lens is determined from the force data collected during sample dipping. The receding contact angle is likewise determined from force data while withdrawing the sample from the liquid. The Wilhelmy plate method is based on the following formula: $Fg = \gamma \rho \cos \theta - B$, wherein F=the wetting force between the liquid and the lens (mg), g=gravitational acceleration (980.665 cm/sec$^2$), $\gamma$=surface tension of probe liquid (dyne/cm), $\rho$=the perimeter of the contact lens at the liquid/lens meniscus (cm), $\theta$=the dynamic contact angle (degree), and B=buoyancy (mg). B is zero at the zero depth of immersion. Four test strips were cut from the central area of the contact lens. Each strip was approximately 5 mm in width and equilibrated in packing solution. Then, each sample was cycled four times, and the results were averaged to obtain the advancing and receding contact angles of the lens.

Wettability of lenses was also determined using a sessile drop technique measured using KRUSS DSA-100™ instrument at room temperature and using DI water as probe solution. The lenses to be tested (3-5/sample) were rinsed in DI water to remove carry over from packing solution. Each test lens was placed on blotting lint free wipes which were dampened with packing solution. Both sides of the lens were contacted with the wipe to remove surface water without drying the lens. To ensure proper flattening, lenses were placed "bowl side down" on the convex surface of contact lens plastic molds. The plastic mold and the lens were placed in the sessile drop instrument holder, ensuring proper central syringe alignment. A 3 to 4 microliter drop of deionized water was formed on the syringe tip using DSA 100-Drop Shape Analysis software ensuring the liquid drop was hanging away from the lens. The drop was released smoothly on the lens surface by moving the needle down. The needle was withdrawn away immediately after dispensing the drop. The liquid drop was allowed to equilibrate on the lens for 5 to 10 seconds, and the contact angle was measured between the drop image and the lens surface.

The mechanical properties of the contact lenses were measured by using a tensile testing machine such as an Instron model 1122 or 5542 equipped with a load cell and pneumatic grip controls. Minus one diopter lens is the preferred lens geometry because of its central uniform thickness profile. A dog-bone shaped sample cut from a −1.00 power lens having a 0.522 inch length, 0.276 inch "ear" width and 0.213 inch "neck" width was loaded into the grips and elongated at a constant rate of strain of 2 inches per minute until it breaks. The center thickness of the dog-bone sample was measured using an electronic thickness gauge prior to testing. The initial gauge length of the sample (Lo) and sample length at break (Lf) were measured. At least five specimens of each composition were measured, and the average values were used to calculate the percent elongation to break: percent elongation=[(Lf−Lo)/Lo]×100. The tensile modulus was calculated as the slope of the initial linear portion of the stress-strain curve; the units of modulus are pounds per square inch or psi. The tensile strength was calculated from the peak load and the original cross-sectional area: tensile strength=peak load divided by the original cross-sectional area; the units of tensile strength are psi. Toughness was calculated from the energy to break and the original volume of the sample: toughness=energy to break divided by the original sample volume; the units of toughness are in-lbs/in$^3$.

PQ1 uptake was measured chromatographically. The HPLC was calibrated using a series of standard PQ1 solutions having concentrations 2, 4, 6, 8, 12 and 15 μg/mL. Lenses were placed into polypropylene contact lens cases with 3 mL of Optifree Replenish or similar lens solution (PQ1 concentration=10 micrograms/mL) which is commercially available from Alcon. A control lens case, containing 3 mL of solution, but no contact lens was also prepared. The lenses and control solutions were stored at room temperature for 72 hours. 1 mL of solution was removed from each of the samples and controls and mixed with trifluoroacetic acid (10 μL). The analysis was conducted using HPLC/ELSD and a Phenomenex Luna C5 (4.6 mm×5 mm; 5 μm particle size) column with the following equipment and conditions: Agilent 1200 HPLC or equivalent with an ELSD operating at T=100° C., Gain=12, Pressure=4.4 bar, Filter=3s; ELSD parameters may vary from instrument to instrument; using mobile phase A of water (0.1% TFA) and mobile phase B of acetonitrile (0.1% TFA), a column temperature of 40° C. and an injection volume of 100 μL. An elution profile was used and listed in Table A. A calibration curve was created by plotting the peak area value as a function of the concentration of the PQ1 standard solutions. The concentration of PQ1 in a sample was then calculated by solving the quadratic equation representing the calibration curve. Three lenses were run for each analysis, and the results were averaged. PQ1 uptake was reported as the percentage loss of PQ1 after soak with lens compared to the PQ1 present in the control without lens.

TABLE A

HPLC Elution Profile

| Time (minutes) | % A | % B | Flow Rate (mL/min) |
|---|---|---|---|
| 0.00 | 100 | 0 | 1.2 |
| 1.00 | 100 | 0 | 1.2 |
| 5.00 | 0 | 100 | 1.2 |
| 8.50 | 0 | 100 | 1.2 |
| 8.60 | 100 | 0 | 1.2 |
| 11.00 | 100 | 0 | 1.2 |

The amount of cholesterol absorbed by a contact lens was determined by a LC-MS method (lipid uptake in the data tables). Lenses were soaked in a cholesterol solution and then extracted with dichloromethane. The dichloromethane extract was evaporated and reconstituted with a heptane/isopropanol mixture with subsequent analysis by LC-MS. The results were reported as micrograms of cholesterol per lens. A deuterated cholesterol internal standard was used to improve accuracy and precision of the method.

A cholesterol stock solution was prepared by placing 15.0±0.5 milligrams of cholesterol into a wide-mouth 10 mL glass volumetric flask followed by dilution with isopropanol.

A cholesterol soak solution was prepared by placing 0.430±0.010 grams of lysozyme (purity=93%), 0.200±0.010 grams of albumin, and 0.100±0.010 grams of β-lactoglobulin into a 200 mL glass volumetric flask, adding approximately 190 milliliters of PBS to the flask, and swirling to dissolve the contents. 2 Milliliters of the cholesterol stock solution was then added and diluted to volume with PBS. The volumetric flask was capped and shaken well. The concentration of the cholesterol soak solution was approximately 15 μg/mL. Note: The mass of these components may be adjusted to account for lot-to-lot purity variability so that the target concentrations can be achieved.

Six contact lenses were removed from their packages and blotted with lint-free paper towels to remove excess packing solution. The lenses were placed into six separate 8 mL glass vials (one lens per vial), and 3.0 mL of the cholesterol soak solution was added to each vial. The vials were capped and placed into a New Brunswick Scientific incubator-shaker for 72 hours at 37° C. and 100 rpm. After incubation, each lens was rinsed three times with PBS in 100 mL beakers and placed into a 20-mL scintillation vial.

To each lens-containing scintillation vial, 5 mL of dichloromethane and 100 μL of the internal standard solution were added. After a minimum of 16 hours of extraction time, the supernatant liquid was transferred into a 5 mL disposable glass culture tube. The tube was placed into the Turbovap and the solvent completely evaporated. Place 1 mL of the diluent into the culture tube and re-dissolve the contents. The aforementioned diluent was a 70:30 (v/v) mixture of heptane and isopropanol. The diluent was also the mobile phase. The resulting solution was carefully transferred into an autosampler vial and ready for LC-MS analysis.

An internal standard stock solution was prepared by weighing approximately 12.5+2 mg of deuterated cholesterol (2,2,3,4,4,6-d6-cholesterol) in a 25 mL volumetric flask followed by dilution with the diluent. The concentration of the internal standard stock solution was approximately 500 μg/mL.

An internal standard solution was prepared by placing 1.0 mL of the internal standard stock solution in a 50 mL volumetric flask followed by dilution to volume with diluent. The concentration of this intermediate internal standard solution is approximately 10 μg/mL.

A reference standard stock solution was prepared by weighing approximately 50+5 mg of cholesterol in a 100 mL volumetric flask followed by dilution with diluent. The concentration of the cholesterol in this reference stock solution is approximately 500 μg/mL.

Working standard solutions were then made according to Table 2 by placing the appropriate amount of standard solutions into the listed 25-mL, 50-mL or 100-mL volumetric flasks. After the standard solutions were added to the volumetric flasks, the mixture was diluted to volume with diluent and swirled well.

TABLE B

Working Standard Solution Formulations

| Working Standard Name | Volume of Internal Standard Solution (mL) | Volume of Reference Standard Stock Solution (μL) | Final Volume (mL) | Approximate Cholesterol Concentration (μg/mL) |
| --- | --- | --- | --- | --- |
| Std 1 | 10 | 20 | 100 | 0.10 |
| Std 2 | 5 | 25 | 50 | 0.25 |
| Std 3 | 5 | 50 | 50 | 0.50 |
| Std 4 | 5 | 100 | 50 | 1.00 |
| Std 5 | 2.5 | 125 | 25 | 2.50 |
| Std 6 | 2.5 | 250 | 25 | 5.00 |

The following LC-MS analysis was performed:

(1) Make 6 injections of the "Std4" to evaluate system suitability. The RSD % of the peak areas for the working standards and the internal standards must be <5% and RSD (%) of their peak area ratios must be <7% to pass system suitability.

(2) Inject working standards 1-6 to create a calibration curve. The square of the correlation coefficient ($r^2$) must be >0.99.

(3) Inject test samples followed by a bracketing standard (Std4). The peak area ratio of the bracketing standard must be within ±10% of the averaged peak area ratio from the system suitability injections.

A calibration curve was constructed by plotting the peak area ratio (reference std/internal std) value that corresponds to the concentration of each working standard solution. The concentration of cholesterol in sample is calculated by solving a quadratic equation. Typical equipment and their settings for the LC-MS analysis are listed below and shown in Tables C and D. The values for the instrument tune parameters may change each time the mass spectrometer is tuned.

Turbovap Conditions:
Temperature: 45° C.
Time: 30 minutes or more to dryness
Gas: nitrogen @ 5 psi
HPLC Conditions:
HPLC: Thermo Accela HPLC Instrument or equivalent
HPLC Column: Agilent Zorbax $NH_2$ (4.6 mm×150 mm; 5 μm particle size)
Mobile Phase: 70% heptane and 30% isopropanol
Column Temperature: 30° C.
Injection Volume: 25 μL
Flow Rate: 1000 μL/min

TABLE C

Mass Spectrometry Conditions
Thermo Finnigan TSQ Quantum Ultra

| MS Settings | Value |
| --- | --- |
| Ionization | APCI |
| Polarity | Positive |
| Scan type | SIM |
| APCI probe position | D |
| Mass (m/z) of Reference Standards | 369.2 |
| Mass (m/z) of Internal Standards | 375.3 |
| Mass width (m/z) | 1.0 |
| Scan time (s) | 0.10 |
| Data type | Centroid |
| Peak Width Q3 (FWHM) | 0.40 |
| Skimmer Offset (V) | 10 |

TABLE D

Tune Parameters

| Instrument Tune Parameters | Value |
| --- | --- |
| Discharge Current (arbitrary units): | 20 |
| Capillary temperature (° C.): | 240 |
| Vaporizer Temperature (° C.): | 500 |
| Tube lens offset (V): | 68 |
| Sheath gas pressure (arbitrary units): | 20 |
| Auxiliary gas flow (arbitrary units): | 15 |

The amount of lysozyme uptake by a contact lens was measured by a HPLC-UV method. Lysozyme uptake was determined as the difference of lysozyme content in phosphate-buffered saline solution (PBS) before contact lenses are immersed and the concentration in the test solution after 72 hours of lens immersion at 37° C.

A lysozyme soak solution was prepared by placing 0.215±0.005 grams of lysozyme (purity=93%) into a 100 mL volumetric flask followed by adding 50 mL of PBS to dissolve the lysozyme by swirling followed by dilution to volume with PBS. The resulting lysozyme soak solution was filtered/sterilized using a Millipore Stericup filtration device. The concentration of the lysozyme soak solution is approximately 2000 μg/mL. The mass of lysozyme may be adjusted to account for lot-to-lot purity variability so that a 2000 μg/mL concentration can be achieved.

Three contact lenses were removed from their packages and blotted with lint-free paper towel to remove excess packing solution. The lenses were placed into three separate 8 mL glass vials (one lens per vial). 1.5 mL of the lysozyme soak solution was added to each vial. The vials were capped and inspected to ensure each lens was completely immersed in the soak solution. As control samples, 1.5 mL of lysozyme soak solution were added into three separate 8 mL glass vials. The samples were then incubated on a New Brunswick Scientific incubator-shaker for 72 hours at 37° C. and 100 rpm.

A diluent was prepared by mixing 900 mL water, 100 mL acetonitrile and 1 mL trifluoroacetic acid into a 1 L glass bottle.

A lysozyme stock solution was prepared by placing 0.240±0.010 grams of lysozyme (purity=93%) into a 100 mL volumetric flask followed by dilution to volume with diluent. The concentration of the lysozyme stock solution is approximately 2200 μg/mL.

Shown in Table E, a series of working standard solutions was prepared by mixing the appropriate amounts of lysozyme stock solution with diluent using 5 mL volumetric flasks.

TABLE E

Working Standards

| Working Standard Name | Volume of Stock Solution (mL) | Final Volume (mL) | Approximate Lysozyme Concentration (µg/mL) |
|---|---|---|---|
| Std 1 | 1.135 | 5 | 500 |
| Std 2 | 1.815 | 5 | 800 |
| Std 3 | 2.725 | 5 | 1200 |
| Std 4 | 3.635 | 5 | 1600 |
| Std 5 | 4.540 | 5 | 2000 |
| Std 6 (stock) | — | — | 2200 |

A 10% (v/v) solution was prepared by adding 1 mL of trifluoroacetic acid into a 10 mL glass volumetric flask followed by dilution with HPLC water. Samples for HPLC-UV analysis were prepared as follows: (1) by placing 1000 µL of test sample and 10 of the 10% TFA solution into an autosampler vial or (2) by placing 1000 µL of reference standard and 10 µL of reference standard diluent into an autosampler vial.

The analysis involved the following steps:
(1) Perform 6 injections of the "Std4" to evaluate system suitability. The RSD % of the peak areas and retention times must be <0.5% to pass system suitability.
(2) Inject working standards 1-6 to create a calibration curve. The square of the correlation coefficient ($r^2$) must be >0.99.
(3) Inject test samples followed by a bracketing standard (Std4). The peak area of the bracketing standard must be ±1% of the averaged peak areas from the system suitability injections.

A calibration curve was constructed by plotting the peak area value that corresponds to the concentration of each lysozyme working standard solution. The concentration of lysozyme in the test samples was calculated by solving a linear equation. Typical equipment and their settings are listed below or shown in Table F.

Instrument: Agilent 1200 HPLC with UV detection (or equivalent HPLC-UV)
Detection: UV @ 280 nm (5 nm bandwidth)
Column: Phenomenex Luna C5 (50×4.6 mm) or Agilent PLRP-S (50×4.6 mm)
Mobile Phase A: $H_2O$ (0.1% TFA)
Mobile Phase B: Acetonitrile (0.1% TFA)
Column Temperature: 40° C.
Injection Volume: 10 µL

TABLE F

HPLC Run Conditions

| Time (minutes) | % A | % B | Flow Rate (mL/min) |
|---|---|---|---|
| 0.0 | 5 | 5 | 1.2 |
| 4.0 | 5 | 95 | 1.2 |
| 4.1 | 5 | 5 | 1.2 |
| 6.5 | 5 | 5 | 1.2 |

Alternatively, lysozyme uptake was measured as follows. A lysozyme solution was prepared from chicken egg white (Sigma, L7651) at a concentration of 2 mg/mL in phosphate saline buffer supplemented by sodium bicarbonate at 1.37 g/L and D-glucose at 0.1 g/L.

Three lenses for each test sample were tested using each protein solution, and three were tested using PBS as a control solution. The test lenses were blotted on sterile gauze to remove packing solution and aseptically transferred, using sterile forceps, into sterile 24 well cell culture plates (one lens per well) each well containing 2 mL of the lysozyme solution. Each lens was fully immersed in the solution. As controls, 2 mL of the lysozyme solution was placed in wells without a contact lens.

The plates were sealed using parafilm to prevent evaporation and dehydration and placed onto an orbital shaker and incubated at 35° C. with agitation at 100 rpm for 72 hours. After the 72 hour incubation period, the lenses were rinsed 3 to 5 times by dipping lenses into 200 mL of PBS. The lenses were blotted on a paper towel to remove excess PBS and transferred into sterile conical tubes (1 lens per tube), each tube containing a volume of PBS determined based upon an estimate of lysozyme uptake expected based upon on each lens composition. The lysozyme concentration in each tube to be tested must be within the albumin standards range as described by the manufacturer (0.05 micrograms to 30 micrograms). Samples known to uptake a level of lysozyme lower than 100 µg per lens were diluted 5 times. Samples known to uptake levels of lysozyme higher than 500 µg per lens were diluted 20 times.

Lysozyme uptake was determined using on-lens bicinchoninic acid method using QP-BCA kit (Sigma, QP-BCA) following the procedure described by the manufacturer and was calculated by subtracting the optical density measured on PBS soaked lenses from the optical density determined on lenses soaked in lysozyme solution. The optical density was measured using a Synergy II Micro-plate reader capable of reading optical density at 562 nm.

The invention is now described with reference to the following examples. Before describing several exemplary embodiments of the invention, it is to be understood that the invention is not limited to the details of construction or process steps set forth in the following description. The invention is capable of other embodiments and of being practiced or being carried out in various ways.

The following abbreviations will be used throughout the Examples and have the following meanings:
BC: back curve plastic mold
FC: front curve plastic mold
RMM: reactive monomer mixture
NVP: N-vinylpyrrolidone (Acros or Aldrich)
DMA: N, N-dimethylacrylamide (Jarchem)
HEMA: 2-hydroxyethyl methacrylate (Bimax)
HPMA: 2-hydroxypropyl methacrylate
HEAA: 2-hydroxyethyl acrylate
Bis-HEAA: N,N-bis(2-hydroxyethyl) acrylamide
GMMA: 2,3-dihydroxypropyl methacrylate
HBMA: 2-hydroxybutyl methacrylate
VMA: N-vinyl N-methyl acetamide (Aldrich)
AA: acrylic acid
MAA: methacrylic acid (Acros)
VINAL: N-[(ethenyloxy)carbonyl]-β-alanine; CAS #148969-96-4
ACA1: 3-acrylamidopropanoic acid
ACA2: 5-acrylamidopropanoic acid
Q Salt or METAC: 2-(methacryloyloxy)ethyl trimethyl-ammonium chloride
AMPS: 2-acrylamido-2-methylpropane sulfonic acid CBT: 1-Propanaminium, N-(2-carboxyethyl)-N,N-dimethyl-3-[(1-oxo-2-propen-1-yl)amino]-, inner salt; carboxybetaine; CAS 79704-35-1

SBT: 1-Propanaminium, N,N-dimethyl-N-[3-[(1-oxo-2-propen-1-yl)amino]propyl]-3-sulfo-, inner salt; sulfobetaine; CAS 80293-60-3

PBT: 3,5-Dioxa-8-aza-4-phosphaundec-10-en-1-aminium, 4-hydroxy-N,N,N-trimethyl-9-oxo-, inner salt, 4-oxide (9CI); phosphobetaine; CAS 163674-35-9

Blue HEMA: 1-amino-4-[3-(4-(2-methacryloyloxyethoxy)-6-chlorotriazin-2-ylamino)-4-sulfophenylamino] anthraquinone-2-sulfonic acid, as described in U.S. Pat. No. 5,944,853

Styryl-TRIS: tris(trimethylsiloxy)silyl styrene (Melrob)

PVMA: poly(N-vinyl N-methyl acetamide)

PVP: poly(N-vinylpyrrolidone) (ISP Ashland)

Poly[DMA-NVP]: random or block copolymer of DMA and NVP

Poly[DMA-CBT]: random or block copolymer of DMA and CBT

EGDMA: ethylene glycol dimethacrylate (Esstech)

TEGDMA: tetraethylene glycol dimethacrylate (Esstech)

TMPTMA: trimethylolpropane trimethacrylate (Esstech)

MBA: methylene bisacrylamide (Aldrich)

TAC: Triallyl Cyanurate (Polysciences)

BMPP: 2,2-bis(4-methacryloxyphenyl)-propane (Polysciences)

BAPP: 2,2-bis[4-(2-acryloxyethoxy)phenyl]propane (Polysciences)

BHMPP: 2,2-bis[4-(2-hydroxy-3-methacryloxypropoxy)phenyl]propane (Polysciences)

Tegomer V-Si 2250: diacryloxypolydimethylsiloxane (Evonik)

Irgacure 819: bis(2,4,6-trimethylbenzoyl)-phenylphosphineoxide (BASF or Ciba Specialty Chemicals)

Irgacure 1870: blend of bis(2,6-dimethoxybenzoyl)-2,4,4-trimethyl-pentylphosphineoxide and 1-hydroxy-cyclohexyl-phenyl-ketone (BASF or Ciba Specialty Chemicals)

AIBN: azobisisobutyronitrile

Te-Bu: ethyl 2-methyl-2-(butyltellanyl)propanoate

TEMPO: 2,6-tetramethylpiperidine N-oxide

TERP: organotellurium mediated living radical polymerization mPDMS: monomethacryloxypropyl terminated mono-n-butyl terminated polydimethylsiloxane (800-1000 MW) (Gelest)

ac-PDMS: bis-3-acryloxy-2-hydroxypropyloxypropyl polydimethylsiloxane

HO-mPDMS: mono-(2-hydroxy-3-methacryloxypropyl)-propyl ether terminated mono-n-butyl terminated polydimethylsiloxane (400-1000 MW) (Ortec or DSM-Polymer Technology Group)

TRIS: 3-methacryloxypropyl tris(trimethylsiloxy)silane ac-TRIS: 3-acryloxypropyl tris(trimethylsiloxy)silane 2-propenoic acid, 2-methyl-2-hydroxy-3-[3-[1,3,3,3-tetramethyl-1-[(trimethylsilyl)oxy]disiloxanyl]propoxy]propyl ester (Toray)

SA2: N-(2,3-dihydroxypropyl)-N-(3-tetra(dimethylsiloxy)-dimethylbutylsilane)propyl) acrylamide mPEG 950: polyethylene glycol mono-methacrylate (Aldrich)

D3O: 3,7-dimethyl-3-octanol (Vigon)

TAM: t-amyl alcohol (BASF)

3E3P: 3-ethyl 3-pentanol

TPME: tripropylene glycol mono-methyl ether

DA: decanoic acid

DI water: deionized water

MeOH: methanol

IPA: isopropyl alcohol

Norbloc: 2-(2'-hydroxy-5-methacrylyloxyethylphenyl)-2H-benzotriazole (Janssen)

P2 Poly[DMA-NVP]: Copolymer of DMA-NVP, $M_W$=195 kDa by SEC-MALS, made according to Preparation 2

P3 Poly[DMA-NVP]: Copolymer of DMA-NVP, $M_w$ (MALS)=304 kDa, made according to Preparation 3

PP: polypropylene which is the homopolymer of propylene

TT: Tuftec which is a hydrogenated styrene butadiene block copolymer (Asahi Kasei Chemicals)

Z: Zeonor which is a polycycloolefin thermoplastic polymer (Nippon Zeon Co Ltd)

EXAMPLES

Preparation 1

Synthesis of poly(N-vinyl N-methyl acetamide) (PVMA)

380 mL (3.48 mol) of distilled N-vinyl-N-methyl acetamide and 187 mg (1.14 mmol) of azobisisobutyronitrile were added to a 3-neck round bottom flask fitted with reflux condenser, magnetic stirring bar and thermocouple and purged of oxygen gas for 2 hours by bubbling nitrogen gas through the reaction mixture. Then, the reaction mixture was heated at 75° C. for 24 hours during which time the reaction mixture solidified. The reaction product was quenched in air and isolated by work-up procedure 1 or work-up procedure 2. Work-up Procedure 1: The reaction product was dissolved in 800 mL of methylene chloride at 40° C. and cooled to room temperature. The solution was poured into 2 L of cold diethyl ether with manual stirring to afford a white solid after decanting off the solvents. The solid product was air dried followed by vacuum drying overnight at 50° C. The precipitated product was ground into a fine white powder and vacuum dried overnight at 50° C. (85% yield). Work-up Procedure 2: The reaction product was dissolved in water and dialyzed extensively in dialysis membrane tubing (Spectra Pore MWCO 3500) and freeze dried (LABCONCO, Freezone® Triad™ freeze dry system, Model #7400030) or spray dried (BUCHI mini spray dryer, Model # B-290). The molecular weight was determined by Size Exclusion Chromatography with Multi-Angle Light Scattering (SEC-MALS). The SEC-MALS setup employed methanol (with 10 mM LiBr) as the mobile phase at a flow rate of 0.6 mL/min at 50° C. Three Tosoh Biosciences TSK-gel columns in series were used [SuperAW3000 4 um, 6.0 mm ID×15 cm (PEO/DMF Exclusion Limit=60,000 g/mole), SuperAW4000 6 um, 6.0 mm ID×15 cm (PEO/DMF Exclusion Limit=400,000 g/mole) and a SuperAW5000 7 um, 6.0 mm ID×15 cm (PEO/DMF Exclusion Limit=4,000,000 g/mole)] with an online Agilent 1200 UV/VIS diode array detector, a Wyatt Optilab rEX interferometric refractometer, and a Wyatt mini-DAWN Treos multiangle laser scattering (MALS) detector ($\lambda$=658 nm). A dη/dc value of 0.1829 mL/g at 30° C. (λ=658 nm) was used for absolute molecular weight determination. Absolute molecular weights and polydispersity data were calculated using the Wyatt ASTRA 6.1.1.17 SEC/LS software package. The weight average molecular weight typically varied from about 500 kDa to about 700 kDa, but can be controlled by the reaction conditions and isolation procedures. The polydispersity varied from about 1.8 to about 2.8 among the samples.

Preparation 2

TERP Synthesis of Poly[DMA-NVP], $M_w$=195 kDa 12 milligrams (0.073 mmol) AIBN were dissolved in 200 mL MeOH in a 500 mL three necked round bottom flask equipped with a reflux condenser and pressure balanced addition funnel and containing a magnetic stirring bar. 42 grams (424 mmol) DMA and 47.09 grams (424 mmol) NVP were dissolved in 100 mL MeOH and added into the addition funnel. The solutions in both the round bottom flask and the addition funnel were purged with nitrogen gas for 30 minutes. Then, 26 milligrams (0.1 mmol) of Te-Bu were added into the round bottom flask, and heating of the round bottom flask to reflux (about 65° C.) commenced. Slow dropwise addition of the monomer solution also started when heating commenced. The monomer addition occurred over 7.5 hours. The reaction mixture was then allowed to cool down to room temperature. The MeOH was removed by rotary evaporation. The crude product was re-dissolved in MeOH and precipitated into hexanes three times. The copolymer was vacuum dried at 50° C.

Preparation 3

Poly[DMA-NVP], $M_w$ (MALS)=304 kDa 12 milligrams (0.073 mmol) AIBN were dissolved in 200 mL MeOH in a 500 mL three necked round bottom flask equipped with a reflux condenser and pressure balanced addition funnel and containing a magnetic stirring bar. 42 grams (424 mmol) DMA and 47.09 grams (424 mmol) NVP were dissolved in 100 mL MeOH and added into the addition funnel. The solutions in both the round bottom flask and the addition funnel were purged with nitrogen gas for 60 minutes. Then, 26 milligrams (0.1 mmol) of Te-Bu were added into the round bottom flask, and heating of the round bottom flask to reflux (about 65° C.) commenced. Slow dropwise addition of the monomer solution also started when heating commenced. The monomer addition occurred over 4 hours. The reaction mixture was then refluxed for 20 hours thereafter 45 milligrams (0.29 mmol) TEMPO were added and the reaction mixture refluxed for another 5 hours. The reaction mixture was then allowed to cool down to room temperature. The reaction mixture was concentrated by rotary evaporation, and the crude product isolated by precipitation into diethyl ether. After decanting off the supernatant liquid, the crude product was re-dissolved in methylene chloride and precipitated into diethyl ether three times. The copolymer was vacuum dried at 70° C.

Preparation 4

TERP Synthesis of Poly[DMA-CBT]

26 milligrams (0.16 mmol) AIBN, 20 grams (202 mmol) DMA and 5 grams (22 mmol) CBT were dissolved in 200 mL 50% (v/v) aqueous MeOH in a 500 mL round bottom flask equipped with a reflux condenser and containing a magnetic stirring bar. 41 milligrams (0.16 mmol) of Te-Bu were dissolved in 50 mL 50% (v/v) aqueous MeOH. Both solutions were purged with nitrogen gas for 30 minutes. Then, the Te-Bu solution was added to the round bottom flask and heated to reflux (about 62° C.) for 12 hours. The reaction mixture was allowed to cool down to room temperature. The aqueous MeOH was removed by rotary evaporation. The crude product was dissolved in 500 mL acetone and precipitated by slowing adding 250 mL of hexane with stirring. After decanting off the supernatant liquid, the copolymer was vacuum dried at 62-68° C. Copolymer designated as Poly[DMA-CBT].

Comparative Examples 1-5

Each reactive mixture was formed by mixing the reactive components listed in Table 2, filtering through a 3 μm filter using a heated or unheated stainless steel or glass syringe, and then degassed by applying vacuum at ambient temperature for about 10 minutes. In a glove box with a nitrogen gas atmosphere and less than 0.1 percent oxygen gas, about 75-100 μL of the reactive mixture were dosed using an Eppendorf pipet at room temperature into the FC made of Zeonor. The BC made of PP was then placed onto the FC. The molds were equilibrated for a minimum of twelve hours in the glove box prior to dosing. The plate was transferred into an adjacent glove box maintained at 55-60° C., and the lenses were cured from the top for 20 minutes using TL03 lights having intensity of 4-5 mW/cm². The light source was about six inches above the trays. The weight ratio of OH-mPDMS, n=4 to mPDMS 1000, n=10 was 1.7. The molar ratio of OH-mPDMS, n=4 to mPDMS 1000, n=10 was 2.8.

The lenses were manually de-molded with most lenses adhering to the FC and released by suspending the 64 lenses in about one liter of 50% IPA for about one or two hours, followed by washing with 25% IPA, two times with DI, and finally two times with borate buffered packaging solution. Each washing step lasted about 30 minutes. A person of ordinary skill recognizes that the exact lens release process can be varied depending on the lens formulation and mold materials, regarding the concentrations of the aqueous isopropanol solutions, the number of washings with each solvent, and the duration of each step. The purpose of the lens release process is to release all of the lenses without defects and transition from diluent swollen networks to the packaging solution swollen hydrogels. The lenses were transferred into vials and subsequently sterilized by autoclaving at 122° C. for 30 minutes. The physical and mechanical properties of the sterile lenses were measured and listed in Table 3.

TABLE 2

| Component | CEx 1 | CEx 2 | CEx 3 | CEx 4 | CEx 5 | CEx 6 | CEx 7 | CEx 8 |
|---|---|---|---|---|---|---|---|---|
| mPDMS 1000, n = 10 | 16.5 | 16.5 | 16.5 | 16.5 | 16.5 | 16.5 | 16.5 | 16.5 |
| OH-mPDMS, n = 4 | 27.5 | 27.5 | 27.5 | 27.5 | 27.5 | 27.5 | 27.5 | 27.5 |
| NVP | 46.65 | 44.15 | 41.65 | 39.15 | 35.15 | 23.35 | 11.5 | 0 |
| HEMA | 6.75 | 6.75 | 6.75 | 6.75 | 6.75 | 6.75 | 6.75 | 6.75 |
| DMA | 0 | 2.5 | 5 | 7.5 | 11.5 | 23.3 | 35.15 | 46.65 |
| EGDMA | 0.35 | 0.35 | 0.35 | 0.35 | 0.35 | 0.35 | 0.35 | 0.35 |
| Norbloc | 1.75 | 1.75 | 1.75 | 1.75 | 1.75 | 1.75 | 1.75 | 1.75 |
| CGI 819 | 0.5 | 0.5 | 0.5 | 0.5 | 0.5 | 0.5 | 0.5 | 0.5 |
| Diluent | 10 | 10 | 10 | 10 | 10 | 10 | 10 | 10 |
| TAM | 100 | 100 | 100 | 100 | 100 | 100 | 100 | 100 |

TABLE 3

| Lens | Weight % Water | % Haze | DCA (advancing) | Mechanicals M (psi) | % ETB | Dk |
|---|---|---|---|---|---|---|
| CEx 1 | 61 (0) | 6 (1) | 48 (6) | 75 (10) | 145 (57) | 92 |
| CEx 2 | 63 (0) | 7 (1) | 79 (9) | 57 (6) | 171 (36) | 89 |
| CEx 3 | 63 (0) | 9 (1) | 107 (3) | 52 (4) | 164 (53) | 89 |
| CEx 4 | 63 (0) | 9 (1) | 110 (4) | 46 (6) | 162 (45) | 89 |
| CEx 5 | 60 (0) | 6 (1) | 119 (15) | 53 (6) | 184 (56) | 85 |
| CEx 6 | 56 (0) | 4 (0) | 114 (13) | 66 (6) | 195 (44) | 72 |
| CEx 7 | 54 (0) | 4 (1) | 107 (5) | 87 (10) | 211 (56) | 56 |
| CEx 8 | 56 (0) | 4 (1) | 114 (19) | 85 (10) | 258 (58) | 54 |

The wettability of NVP based silicone hydrogels without a polymeric wetting agent was reduced by small amounts of DMA in the reactive mixture. At 2.5 wt % DMA and above, the advancing contact angle increased to 107° (59° increase) compared to formulations without DMA (Comparative Example 6, with a DCA of 48°).

Comparative Examples 9-12

Each reactive mixture was formed by mixing the reactive components listed in Table 4, filtering through a 3 μm filter using a heated or unheated stainless steel or glass syringe, and then degassed by applying vacuum at ambient temperature for about 10 minutes. In a glove box with a nitrogen gas atmosphere and less than 0.1 percent oxygen gas, about 75-100 μL of the reactive mixture were dosed using an Eppendorf pipet at room temperature into the FC made of Zeonor. The BC made of PP was then placed onto the FC. The molds were equilibrated for a minimum of twelve hours in the glove box prior to dosing. The plate was transferred into an adjacent glove box maintained at 55-60° C., and the lenses were cured from the top for 20 minutes using TLO3 lights having intensity of 4-5 mW/cm$^2$. The light source was about six inches above the trays.

The lenses were manually de-molded with most lenses adhering to the FC and released by suspending the 64 lenses in about one liter of 50% IPA for about one or two hours, followed by washing with 25% IPA, two times with DI, and finally two times with borate buffered packaging solution. Each washing step lasted about 30 minutes. A person of ordinary skill recognizes that the exact lens release process can be varied depending on the lens formulation and mold materials, regarding the concentrations of the aqueous isopropanol solutions, the number of washings with each solvent, and the duration of each step. The purpose of the lens release process is to release all of the lenses without defects and transition from diluent swollen networks to the packaging solution swollen hydrogels. The lenses were transferred into vials and subsequently sterilized by autoclaving at 122° C. for 30 minutes. The physical and mechanical properties of the sterile lenses were measured and listed in Table 5.

TABLE 4

| Component | CEx 9 | CEx 10 | CEx 11 | CEx 12 |
|---|---|---|---|---|
| mPDMS 1000 | 16.5 | 16.5 | 16.5 | 16.5 |
| OH-mPDMS, n = 4 | 27.5 | 27.5 | 27.5 | 27.5 |
| NVP | 46.55 | 46.05 | 45.55 | 44.05 |
| HEMA | 6.75 | 6.75 | 6.75 | 6.75 |
| DMA | 0 | 0.5 | 1 | 2.5 |
| EGDMA | 0.45 | 0.45 | 0.35 | 0.35 |
| Norbloc | 1.75 | 1.75 | 1.75 | 1.75 |
| CGI 819 | 0.5 | 0.5 | 0.5 | 0.5 |
| Diluent | 0 | 0 | 0 | 0 |

TABLE 5

| Lens | Weight % Water | % Haze | DCA (Advancing) | Mechanicals M (psi) | % ETB | Dk |
|---|---|---|---|---|---|---|
| CEx 9 | 54 (0) | 9 (0) | 50 (4) | 111 (12) | 148 (39) | 98 |
| CEx 10 | 54 (0) | 11 (1) | 58 (9) | 117 (8) | 167 (36) | 97 |
| CEx 11 | 55 (0) | 10 (1) | 64 (4) | 122 (9) | 170 (27) | 97 |
| CEx 12 | 54 (0) | 10 (0) | 93 (11) | 100 (7) | 146 (31) | 100 |

These comparative Examples confirm that as little as about 2 wt % DMA in silicone hydrogel formulations containing greater than about 40 wt % NVP degrade wettability.

Examples 1-3

Each reactive mixture was formed by mixing the reactive components listed in Table 6, filtering through a 3 μm filter using a heated or unheated stainless steel or glass syringe, and then degassed by applying vacuum at ambient temperature for about 10 minutes. In a glove box with a nitrogen gas atmosphere and less than 0.1 percent oxygen gas, about 75-100 μL of the reactive mixture were dosed using an Eppendorf pipet at room temperature into the FC made of Zeonor. The BC made of PP was then placed onto the FC. The molds were equilibrated for a minimum of twelve hours in the glove box prior to dosing. The plate was transferred into an adjacent glove box maintained at 62-65° C., and the lenses were cured from the top for 20 minutes using TLO3 lights having intensity of 4-5 mW/cm². The light source was about six inches above the trays.

The lenses were manually de-molded with most lenses adhering to the FC and released by suspending the 64 lenses in about one liter of 70% IPA for about one or two hours, followed by washing two times with 70% IPA, two times with 25% IPA, two times with DI, and finally two times with borate buffered packaging solution. Each washing step lasted about 30 minutes. A person of ordinary skill recognizes that the exact lens release process can be varied depending on the lens formulation and mold materials, regarding the concentrations of the aqueous isopropanol solutions, the number of washings with each solvent, and the duration of each step. The purpose of the lens release process is to release all of the lenses without defects and transition from diluent swollen networks to the packaging solution swollen hydrogels. The lenses were transferred into vials and subsequently sterilized by autoclaving at 122° C. for 30 minutes. The physical and mechanical properties of the sterile lenses were measured and listed in Table 7. The homogeneity of the reactive mixtures improved as the amount of OH-mPDMS n=4 increased. Only lenses from Example 3 were suitable for testing, and their wettability was limited (91°) despite the presence poly[DMA-NVP] in the formulation at 2 wt %.

minimum of twelve hours in the glove box prior to dosing. The plate was transferred into an adjacent glove box maintained at 62-65° C., and the lenses were cured from the top for 20 minutes using TLO3 lights having intensity of 4-5 mW/cm². The light source was about six inches above the trays.

The lenses were manually de-molded with most lenses adhering to the FC and released by suspending the 64 lenses in about one liter of 70% IPA for about one or two hours, followed by washing two times with 70% IPA, two times with 25% IPA, two times with DI, and finally two times with borate buffered packaging solution. Each washing step lasted about 30 minutes. A person of ordinary skill recognizes that the exact lens release process can be varied depending on the lens formulation and mold materials, regarding the concentrations of the aqueous isopropanol solutions, the number of washings with each solvent, and the duration of each step. The purpose of the lens release process is to release all of the lenses without defects and transition from diluent swollen networks to the packaging solution swollen hydrogels. The lenses were transferred into vials and subsequently sterilized by autoclaving at 122° C. for 30 minutes. The lenses of Examples 4 and 5 were hazy (subjectively observed), and were not further analyzed. The physical and mechanical properties of the sterile lenses were measured and listed in Table 9.

TABLE 6

| Component | Ex 1 | Ex 2 | Ex 3 |
|---|---|---|---|
| OH-mPDMS (n = 15) | 44.25 | 40.66 | 35 |
| OH-mPDMS (n = 4) | 0 | 8.11 | 12.85 |
| Weight ratio of OH-mPDMS (n = 4) to OH-mPDMS (n = 15) | 0 | 0.20 | 0.37 |
| Molar ratio of OH-mPDMS (n = 4) to OH-mPDMS (n = 15) | 0 | 0.47 | 0.86 |
| NVP | 40.6 | 37.31 | 37 |
| HEMA | 10 | 9.19 | 10 |
| P2:P[DMA-NVP] | 2 | 1.84 | 2 |
| MAA | 0.75 | 0.69 | 0.75 |
| TEGDMA | 0.2 | 0.18 | 0.2 |
| TAC | 0.2 | 0.18 | 0.2 |
| Norbloc | 1.75 | 1.61 | 1.75 |
| CGI 819 | 0.25 | 0.23 | 0.25 |
| Diluent | 15 | 13.95 | 15 |
| TAM | 100 | 100 | 100 |

TABLE 7

| Lens | Weight % Water | % Haze | DCA (°) (adv, rec) | Mechanicals M (psi) | % ETB | Dk |
|---|---|---|---|---|---|---|
| Ex 3 | 53 (0) | 5 (1) | 91 (5), 27 (11) | 101 (7) | 159 (44) | 89 |

Examples 4-8

Each reactive mixture was formed by mixing the reactive components listed in Table 8, filtering through a 3 μm filter using a heated or unheated stainless steel or glass syringe, and then degassed by applying vacuum at ambient temperature for about 10 minutes. In a glove box with a nitrogen gas atmosphere and less than 0.1 percent oxygen gas, about 75-100 μL of the reactive mixture were dosed using an Eppendorf pipet at room temperature into the FC made of Zeonor. The BC made of a 90:10 (w/w) Z:PP was then placed onto the FC. The molds were equilibrated for a

TABLE 8

| Component | Ex 4 | Ex 5 | Ex 6 | Ex 7 | Ex 8 |
|---|---|---|---|---|---|
| OH-mPDMS (n = 15) | 25 | 0 | 25 | 25 | 30 |
| OH-mPDMS (n = 4) | 30 | 55 | 30 | 30 | 25 |
| Weight ratio of OH-mPDMS (n = 4) to OH-mPDMS (n = 15) | 1.2 | — | 1.2 | 1.2 | 0.83 |
| Molar ratio of OH-mPDMS (n = 4) to OH-mPDMS (n = 15) | 2.8 | — | 2.8 | 2.8 | 1.94 |
| NVP | 10.35 | 10.35 | 13.35 | 16.35 | 16.35 |
| HEMA | 9.5 | 9.5 | 10.5 | 10.5 | 10.5 |
| P2:[DMA-NVP] | 17 | 17 | 15 | 12 | 12 |
| mPEG 950 | 5 | 5 | 3 | 3 | 3 |
| MAA | 0.75 | 0.75 | 0.75 | 0.75 | 0.75 |
| TEGDMA | 0.2 | 0.2 | 0.2 | 0.2 | 0.2 |
| TAC | 0.2 | 0.2 | 0.2 | 0.2 | 0.2 |
| Norbloc | 1.75 | 1.75 | 1.75 | 1.75 | 1.75 |
| CGI 819 | 0.25 | 0.25 | 0.25 | 0.25 | 0.25 |
| Diluent | 23 | 23 | 20 | 20 | 20 |
| TAM | 100 | 100 | 100 | 100 | 100 |

TABLE 9

| Lens | Weight % Water | % Haze | DCA (°) (adv, rec) | Mechanicals M (psi) | % ETB | Dk |
|---|---|---|---|---|---|---|
| Ex 6 | 51 (0) | 38 (2) | 99 (7), 15 (8) | 84 (5) | 158 (34) | 148 |
| Ex 7 | 50 (1) | 19 (1) | 83 (13), 2 (5) | 116 (7) | 178 (37) | 135 |
| Ex 8 | 48 (0) | 12 (2) | 53 (6), 47 (2) | 118 (9) | 163 (43) | 140 |

Example 8 had 12 wt % DMA/NVP copolymer and displayed a very desirable contact angle (53° advancing DCA) and haze (12%). Examples 6-8 had good haze values. Comparing Example 6 to Example 7 shows that decreasing the concentration of acyclic polyamide improves both haze and contact angle, suggesting that a desirable balance of properties could be achieved by maintaining a ratio of first to second silicone-containing component of 1.2, and decreasing the concentration of acyclic polyamide. Example 8 had a ratio of first to second silicone-containing component of 0.87, and showed improved haze and contact angle compared to Example 7. Thus, properties may also be balanced by maintaining the concentration of the acyclic polyamide, and decreasing the ratio first to second silicone-containing component to within the recited ranges.

Examples 9-11

Each reactive mixture was formed by mixing the reactive components listed in Table 10, filtering through a 3 µm filter using a heated or unheated stainless steel or glass syringe, and then degassed by applying vacuum at ambient temperature for about 10 minutes. In a glove box with a nitrogen gas atmosphere and less than 0.1 percent oxygen gas, about 75-100 µL of the reactive mixture were dosed using an Eppendorf pipet at room temperature into the FC made of Zeonor. The BC made of PP or a blend of 90:10 (w/w) Z:PP was then placed onto the FC. The molds were equilibrated for a minimum of twelve hours in the glove box prior to dosing. The plate was transferred into an adjacent glove box maintained at 62-65° C., and the lenses were cured from the top for 20 minutes using TLO3 lights having intensity of 4-5 mW/cm². The light source was about six inches above the trays.

The lenses were manually de-molded with most lenses adhering to the FC and released by suspending the 64 lenses in about one liter of 70% IPA for about one or two hours, followed by washing two times with 70% IPA, two times with 25% IPA, two times with DI, and finally two times with borate buffered packaging solution. Each washing step lasted about 30 minutes. A person of ordinary skill recognizes that the exact lens release process can be varied depending on the lens formulation and mold materials, regarding the concentrations of the aqueous isopropanol solutions, the number of washings with each solvent, and the duration of each step. The purpose of the lens release process is to release all of the lenses without defects and transition from diluent swollen networks to the packaging solution swollen hydrogels. The lenses were transferred into vials and subsequently sterilized by autoclaving at 122° C. for 30 minutes. The physical and mechanical properties of the sterile lenses were measured and listed in Table 11.

TABLE 10

| Component | Ex 9 | Ex 10 | Ex 11 |
| --- | --- | --- | --- |
| OH-mPDMS (n = 15) | 30 | 30 | 30 |
| OH-mPDMS (n = 4) | 25 | 25 | 25 |
| Weight ratio of OH-mPDMS (n = 4) to OH-mPDMS (n = 15) | 0.83 | 0.83 | 0.83 |
| Molar ratio of OH-mPDMS (n = 4) to OH-mPDMS (n = 15) | 1.94 | 1.94 | 1.94 |
| NVP | 16.35 | 16.35 | 16.35 |
| HEMA | 10.5 | 10.5 | 10.5 |
| P2:P[DMA-NVP] | 12 | 0 | 0 |
| P3:P[DMA-NVP] | 0 | 12 | 12 |
| mPEG 950 | 3 | 3 | 3 |
| MAA | 0.75 | 0.75 | 0.75 |
| TEGDMA | 0.2 | 0.2 | 0.2 |
| TAC | 0.2 | 0.2 | 0.2 |
| Norbloc | 1.75 | 1.75 | 1.75 |
| CGI 819 | 0.25 | 0.25 | 0.25 |
| Diluent | 20 | 20 | 20 |
| TAM | 100 | 100 | 100 |

TABLE 11

| Lens | Weight % Water | % Haze | DCA (°) (adv, rec) | Mechanicals M (psi) | % ETB | Dk |
| --- | --- | --- | --- | --- | --- | --- |
| Ex 9 | 48 (0) | 12 (2) | 53 (6), 47 (2) | 118 (9) | 163 (43) | 140 |
| Ex 10 | 52 (0) | 16 (1) | 67 (8), 28 (4) | 97 (8) | 194 (23) | 122 |
| Ex 11 | 51 (1) | 24 (2) | 64 (6), 27 (10) | 121 (9) | 186 (35) | 135 |

Copolymer P2 had a molecular weight (Mw) of 195 kD and copolymer P3 had a Mw of 305 KDa. Examples 9-11 all displayed good haze and contact angle, confirming that copolymeric wetting agents having molecular weights above about 190 kDa can provide desirable wettability and haze.

Examples 12-15

Each reactive mixture was formed by mixing the reactive components listed in Table 12, filtering through a 3 µm filter using a heated or unheated stainless steel or glass syringe, and then degassed by applying vacuum at ambient temperature for about 10 minutes. In a glove box with a nitrogen gas atmosphere and less than 0.1 percent oxygen gas, about 75-100 µL of the reactive mixture were dosed using an Eppendorf pipet at room temperature into the FC made of Zeonor. The BC made of a blend of 90:10 (w/w) Z:PP was then placed onto the FC. The molds were equilibrated for a minimum of twelve hours in the glove box prior to dosing. The plate was transferred into an adjacent glove box maintained at 62-65° C., and the lenses were cured from the top for 15 minutes using TLO3 lights having intensity of 4-5 mW/cm². The light source was about six inches above the trays.

The lenses were manually de-molded with most lenses adhering to the FC and released by heating about 64 lenses in about one liter of DI water at 75° C. for about 30-60 minutes, followed by washing two times with DI, and finally two times with borate buffered packaging solution. Each washing step lasted about 30 minutes. A person of ordinary skill recognizes that the exact lens release process can be varied depending on the lens formulation and mold materials, regarding the concentrations of the aqueous isopropanol solutions, the number of washings with each solvent, and the duration of each step. The purpose of the lens release process is to release all of the lenses without defects and transition from diluent swollen networks to the packaging solution swollen hydrogels. The lenses were transferred into vials and subsequently sterilized by autoclaving at 122° C. for 30 minutes. The physical and mechanical properties of the sterile lenses were measured and listed in Table 13.

TABLE 12

| Component | Ex 12 | Ex 13 | Ex 14 | Ex 15 |
| --- | --- | --- | --- | --- |
| OH-mPDMS (n = 15) | 30 | 30 | 30 | 30 |
| OH-mPDMS (n = 4) | 25 | 25 | 25 | 25 |
| Weight ratio of OH-mPDMS (n = 4) to OH-mPDMS (n = 15) | 0.83 | 0.83 | 0.83 | 0.83 |
| Molar ratio of OH-mPDMS (n = 4) to OH-mPDMS (n = 15) | 1.94 | 1.94 | 1.94 | 1.94 |
| NVP | 16.35 | 16.35 | 16.35 | 16.35 |
| HEMA | 10.5 | 10.5 | 10.5 | 10.5 |
| P3:Poly[DMA-NVP] | 12 | 0 | 0 | 0 |
| PVMA 380 kDa | 0 | 12 | 0 | 0 |
| PVMA 628 kDa | 0 | 0 | 12 | 0 |
| PVMA 1600 kDA | 0 | 0 | 0 | 12 |
| mPEG 950 | 3 | 3 | 3 | 3 |
| MAA | 0.75 | 0.75 | 0.75 | 0.75 |

TABLE 12-continued

| Component | Ex 12 | Ex 13 | Ex 14 | Ex 15 |
|---|---|---|---|---|
| TEGDMA | 0.2 | 0.2 | 0.2 | 0.2 |
| TAC | 0.2 | 0.2 | 0.2 | 0.2 |
| Norbloc | 1.75 | 1.75 | 1.75 | 1.75 |
| CGI 819 | 0.25 | 0.25 | 0.25 | 0.25 |
| Diluent | 20 | 20 | 20 | 20 |
| TAM | 100 | 100 | 100 | 100 |

TABLE 13

| Lens | Weight % Water | % Haze | DCA (°) (adv, rec) | Mechanicals M (psi) | % ETB | Dk | RI |
|---|---|---|---|---|---|---|---|
| Ex 12 | 51 (1) | 24 (2) | 64 (6), 27 (10) | 121 (9) | 186 (35) | 135 | 1.4002 |
| Ex 13 | 52 (0) | 28 (2) | 64 (16), 28 (7) | 95 (6) | 194 (41) | 147 | 1.3990 |
| Ex 14 | 53 (0) | 36 (4) | 44 (11), 36 (4) | 105 (4) | 195 (47) | 135 | 1.3954 |
| Ex 15 | 54 (0) | 24 (2) | 34 (11), 27 (4) | 103 (11) | 189 (56) | 122 | 1.39497 |

Examples 12-15 all displayed desirable haze and contact angles. As the molecular weight (Mw) of the PVMA increased, the contact angle decreased, with Examples 14 (Mw of 628 kD) and 15 (Mw of 1600 kD) displaying improved wettability and decreased hysteresis compared to Example 13.

Examples 16-20

Each reactive mixture was formed by mixing the reactive components listed in Table 14, filtering through a 3 μm filter using a heated or unheated stainless steel or glass syringe, and then degassed by applying vacuum at ambient temperature for about 10 minutes. In a glove box with a nitrogen gas atmosphere and less than 0.1 percent oxygen gas, about 75-100 μL of the reactive mixture were dosed using an Eppendorf pipet at room temperature into the FC made of Zeonor. The BC made of PP was then placed onto the FC. The molds were equilibrated for a minimum of twelve hours in the glove box prior to dosing. The plate was transferred into an adjacent glove box maintained at 62-65° C., and the lenses were cured from the top for 25 minutes using TLO3 lights having intensity of 4-5 mW/cm². The light source was about six inches above the trays.

The lenses were manually de-molded with most lenses adhering to the FC and released by suspending the 64 lenses in about one liter of 70% IPA for about one or two hours, followed by washing two times with 70% IPA, two times with 25% IPA, two times with DI, and finally two times with borate buffered packaging solution. Each washing step lasted about 30 minutes. A person of ordinary skill recognizes that the exact lens release process can be varied depending on the lens formulation and mold materials, regarding the concentrations of the aqueous isopropanol solutions, the number of washings with each solvent, and the duration of each step. The purpose of the lens release process is to release all of the lenses without defects and transition from diluent swollen networks to the packaging solution swollen hydrogels. The lenses were transferred into vials and subsequently sterilized by autoclaving at 122° C. for 30 minutes. The physical and mechanical properties of the sterile lenses were measured and listed in Table 15.

TABLE 14

| Component | Ex 16 | Ex 17 | Ex 18 | Ex 19 | Ex 20 |
|---|---|---|---|---|---|
| OH-mPDMS (n = 15) | 30 | 30 | 30 | 30 | 30 |
| OH-mPDMS (n = 4) | 25 | 25 | 25 | 25 | 25 |
| Weight ratio of OH-mPDMS (n = 4) to OH-mPDMS (n = 15) | 0.83 | 0.83 | 0.83 | 0.83 | 0.83 |
| Molar ratio of OH-mPDMS (n = 4) to OH-mPDMS (n = 15) | 1.94 | 1.94 | 1.94 | 1.94 | 1.94 |
| NVP | 16.23 | 16.10 | 16.35 | 16.23 | 16.10 |
| HEMA | 10.5 | 10.5 | 10.5 | 10.5 | 10.5 |
| PVMA 628 kDa | 6 | 6 | 12 | 12 | 12 |
| PVMA 1600 kDa | 6 | 6 | 0 | 0 | 0 |
| mPEG 950 | 3 | 3 | 3 | 3 | 3 |
| MAA | 0.75 | 0.75 | 0.75 | 0.75 | 0.75 |
| TEGDMA | 0.2 | 0.2 | 0.2 | 0.2 | 0.2 |
| TAC | 0.2 | 0.2 | 0.2 | 0.2 | 0.2 |
| Norbloc | 1.75 | 1.75 | 1.75 | 1.75 | 1.75 |
| CGI 819 | 0.37 | 0.5 | 0.25 | 0.37 | 0.5 |
| Diluent | 20 | 20 | 20 | 20 | 20 |
| TAM | 100 | 100 | 100 | 100 | 100 |

TABLE 15

| Lens | Weight % Water | % Haze | DCA (adv, rec) | Mechanicals M (psi) | % ETB | Dk | RI |
|---|---|---|---|---|---|---|---|
| Ex 16 | 55 (0) | 38 (5) | 50 (7), 27 (9) | 81 (8) | 202 (55) | 120 | 1.3946 |
| Ex 17 | 56 (1) | 38 (3) | 46 (5), 23 (5) | 81 (5) | 157 (60) | 130 | 1.3947 |
| Ex 18 | 51 (0) | 38 (4) | 48 (11), 6 (6) | 85 (8) | 218 (23) | 144 | 1.4015 |
| Ex 19 | 53 (0) | 32 (2) | 71 (12), 20 (15) | 84 (6) | 181 (50) | 129 | 1.3969 |
| Ex 20 | 55 (1) | 41 (4) | 76 (7), 7 (8) | 63 (5) | 150 (57) | 124 | 1.3996 |

Examples 16 and 17 contain a mixture of PVMA (6% 628 kD and 6% 1600 kD Mw). Examples 19 and 20 were made from similar formulations, but with 12% of PVMA having a Mw of 628 kD. Examples 16 and 17, with the mixture including higher molecular weight PVMA displayed lower contact angles.

Example 21-24

Each reactive mixture was formed by mixing the reactive components listed in Table 16, filtering through a 3 μm filter using a heated or unheated stainless steel or glass syringe, and then degassed by applying vacuum at ambient temperature for about 10 minutes. In a glove box with a nitrogen gas atmosphere and less than 0.1 percent oxygen gas, about 75-100 μL of the reactive mixture were dosed using an Eppendorf pipet at room temperature into the FC made of Zeonor. The BC made of PP was then placed onto the FC. The molds were equilibrated for a minimum of twelve hours in the glove box prior to dosing. The plate was transferred into an adjacent glove box maintained at 62-65° C., and the lenses were cured from the top for 15-25 minutes using TLO3 lights having intensity of 4-5 mW/cm². The light source was about six inches above the trays.

The lenses were manually de-molded with most lenses adhering to the FC and released by suspending the 64 lenses in about one liter of 70% IPA for about one or two hours, followed by washing two times with 70% IPA, two times with 25% IPA, two times with DI, and finally two times with borate buffered packaging solution. Each washing step lasted about 30 minutes. A person of ordinary skill recognizes that the exact lens release process can be varied depending on the lens formulation and mold materials, regarding the concentrations of the aqueous isopropanol solutions, the number of washings with each solvent, and the duration of each step. The purpose of the lens release process is to release all of the lenses without defects and transition from diluent swollen networks to the packaging solution swollen hydrogels. The lenses were transferred into vials and subsequently sterilized by autoclaving at 122° C. for 30 minutes. The physical and mechanical properties of the sterile lenses were measured and listed in Table 17.

TABLE 16

| Component | Ex 21 | Ex 22 | Ex 23 | Ex 24 |
|---|---|---|---|---|
| OH-mPDMS (n = 15) | 30 | 30 | 30 | 30 |
| OH-mPDMS (n = 4) | 25 | 25 | 25 | 25 |
| Weight ratio of OH-mPDMS (n = 4) to OH-mPDMS (n = 15) | 0.83 | 0.83 | 0.83 | 0.83 |
| Molar ratio of OH-mPDMS (n = 4) to OH-mPDMS (n = 15) | 1.94 | 1.94 | 1.94 | 1.94 |
| NVP | 16.1 | 15 | 15 | 12 |
| DMA | 0 | 1.1 | 1.1 | 4.1 |
| HEMA | 10.5 | 11 | 11 | 11 |
| PVMA 628 kDa | 12 | 12 | 6 | 6 |
| PVMA 1600 kDa | 3 | 0 | 6 | 6 |
| mPEG 950 | 3 | 3 | 3 | 3 |
| MAA | 0.75 | 0.75 | 0.75 | 0.75 |
| TEGDMA | 0.2 | 1 | 1 | 1 |
| TAC | 0.2 | 0 | 0 | 0 |
| Norbloc | 1.75 | 2 | 2 | 2 |
| CGI 819 | 0.5 | 0.25 | 0.25 | 0.25 |
| Cure Time (min) | 25 | 15 | 28 | 28 |
| Diluent | 20 | 20 | 28 | 28 |
| D3O | 100 | 100 | 100 | 100 |

TABLE 17

| Lens | Weight % Water | % Haze | DCA (adv, rec) | Mechanicals M (psi) | % ETB | Dk | RI | Lipids (μg/lens) |
|---|---|---|---|---|---|---|---|---|
| Ex 21 | 56 (0) | 32 (2) | 56 (17), 19 (12) | 69 (7) | 156 (60) | 126 | 1.3967 (006) | 6.23 (0.21) |
| Ex 22 | 55 (0) | 17 (1) | 34 (3), 22 (9) | 67 (7) | 166 (58) | 131 | 1.3979 (005) | 6.2 (0.27) |
| Ex 23 | 56 (0) | 16 (1) | 54 (27), 21 (3) | 52 (7) | 195 (53) | 121 | 1.3966 (009) | 6.97 (0.70) |
| Ex 24 | 54 (0) | 25 (1) | 31 (28), 11 (14) | 64 (5) | 178 (56) | 123 | 1.3963 (011) | 6.28 (0.39) |

The concentration of DMA in the reactive mixture was increased from 0 wt % (Example 21) to 4.1 wt % (Example 24), and the advancing contact angle remained below about 50°. This is in contrast to Comparative Examples 6-17, which showed that in NVP formulations without a combination of hydroxyl-substituted polydialkylsiloxanes, the inclusion of as little as about 2 wt % DMA increased contact angle above about 80°. Examples 21-24 also show lipid uptake of about 6 μg/lens, which is desirably low. Commercially available lenses containing PVP display lipid uptake values of about 10 μg/lens.

Example 25-29

Each reactive mixture was formed by mixing the reactive components listed in Table 18, filtering through a 3 μm filter using a heated or unheated stainless steel or glass syringe, and then degassed by applying vacuum at ambient temperature for about 10 minutes. In a glove box with a nitrogen gas atmosphere and less than 0.1 percent oxygen gas, about 75-100 μL of the reactive mixture were dosed using an Eppendorf pipet at room temperature into the FC made of Zeonor. The BC made of PP was then placed onto the FC. The molds were equilibrated for a minimum of twelve hours in the glove box prior to dosing. The plate was transferred into an adjacent glove box maintained at 62-65° C., and the lenses were cured from the top for 25 minutes using TLO3 lights having intensity of 4-5 mW/cm². The light source was about six inches above the trays.

The lenses were manually de-molded with most lenses adhering to the FC and released by suspending the 64 lenses in about one liter of 70% IPA for about one or two hours, followed by washing two times with 70% IPA, two times with 25% IPA, two times with DI, and finally two times with borate buffered packaging solution. Each washing step lasted about 30 minutes. A person of ordinary skill recognizes that the exact lens release process can be varied depending on the lens formulation and mold materials, regarding the concentrations of the aqueous isopropanol solutions, the number of washings with each solvent, and the duration of each step. The purpose of the lens release process is to release all of the lenses without defects and transition from diluent swollen networks to the packaging solution swollen hydrogels. The lenses were transferred into vials and subsequently sterilized by autoclaving at 122° C. for 30 minutes. The physical and mechanical properties of the sterile lenses were measured and listed in Table 19.

TABLE 18

| Component | Ex 25 | Ex 26 | Ex 27 | Ex 28 | Ex 29 |
|---|---|---|---|---|---|
| OH-mPDMS (n = 15) | 30 | 33 | 33 | 33 | 33 |
| OH-mPDMS (n = 4) | 25 | 25 | 25 | 25 | 25 |
| Weight ratio of OH-mPDMS (n = 4) to OH-mPDMS (n = 15) | 0.83 | 0.76 | 0.76 | 0.76 | 0.76 |
| Molar ratio of OH-mPDMS (n = 4) to OH-mPDMS (n = 15) | 1.94 | 1.77 | 1.77 | 1.77 | 1.77 |
| NVP | 7.84 | 6.33 | 6.11 | 5.36 | 4.61 |
| DMA | 7.84 | 6.35 | 6.12 | 5.37 | 4.62 |
| HEMA | 10.5 | 10.5 | 10.5 | 10.5 | 10.5 |
| PVMA 628 kDa | 9 | 9 | 12 | 13.5 | 15 |
| PVMA 1600 kDa | 3 | 3 | 0 | 0 | 0 |
| mPEG 950 | 3 | 3 | 3 | 3 | 3 |
| MAA | 0.75 | 0.75 | 0.75 | 0.75 | 0.75 |
| TEGDMA | 0.75 | 0.75 | 1.2 | 1.2 | 1.2 |
| TAC | 0.2 | 0.2 | 0.2 | 0.2 | 0.2 |
| Norbloc | 1.75 | 1.75 | 1.75 | 1.75 | 1.75 |
| CGI 819 | 0.37 | 0.37 | 0.37 | 0.37 | 0.37 |
| Diluent | 20 | 23 | 23 | 23 | 23 |
| D3O | 100 | 100 | 100 | 100 | 100 |

TABLE 19

| Lens | Weight % Water | % Haze | DCA (adv/rec) | Mechanicals M (psi) | Mechanicals % ETB | Mechanicals Dk | Lysozyme (μg/Lens) | PQ1 Uptake (%) | Lipid Uptake (μg/lens) |
|---|---|---|---|---|---|---|---|---|---|
| Ex 25 | 55 (0) | 19 (1) | 6 (12), 6 (12) | 79 (5) | 171 (44) | 129 | NT | NT | 6.33 (0.40) |
| Ex 26 | 53 (0) | 29 (1) | 56 (35), 16 (17) | 83 (7) | 194 (65) | 135 | NT | NT | 6.25 (0.47) |
| Ex 27 | 49 (0) | 20 (1) | 0 (0), 2 (4) | 86 (10) | 177 (70) | 132 | 81 (2) | 3.47 (1.42) | 5.46 (0.49) |
| Ex 28 | 50 (0) | 26 (1) | 9 (11), 7 (12) | 90 (6) | 179 (59) | 144 | 49 (3) | 1.77 (0.88) | 5.72 (0.2) |
| Ex 29 | 48 (0) | 33 (2) | 9 (15), 8 (12) | 96 (9) | 165 (46) | 162 | 19 (4) | 0.64 (0.55) | 5.360.15) |

Lenses made from PVMA 628 kDa and mixtures DMA and NVP exhibited very low lipid (less than 7 μg/lens) and PQ1 uptake (less than 5%) as well as an excellent balance of physical and mechanical properties. The concentration of DMA in the reactive mixture was varied from about 5 wt % (Example 29) to about 8% (Example 25), and the advancing contact angle remained below about 60°, and in Examples 25, 27-29, below about 10°.

Example 30-34

Each reactive mixture was formed by mixing the reactive components listed in Table 20, filtering through a 3 μm filter using a heated or unheated stainless steel or glass syringe, and then degassed by applying vacuum at ambient temperature for about 10 minutes. In a glove box with a nitrogen gas atmosphere and less than 0.1 percent oxygen gas, about 75-100 μL of the reactive mixture were dosed using an Eppendorf pipet at room temperature into the FC. The BC was then placed onto the FC. The molds were equilibrated for a minimum of twelve hours in the glove box prior to dosing. Examples 30-32 used FC made of a 90:10 (w/w) blend of Z:TT and BC made of PP; examples 33-38 used FC made of Z and BC made of a 55:45 (w/w) blend of Z:PP. The plate was transferred into an adjacent glove box maintained at 62-65° C., and the lenses were cured from the top for 25 minutes using TLO3 lights having intensity of 4-5 mW/cm$^2$ for Examples 30-32 and 3-4 mW/cm$^2$ for Examples 33-38. The light source was about six inches above the trays.

The lenses were manually de-molded with most lenses adhering to the FC and released by suspending the 64 lenses in about one liter of 70% IPA for about one or two hours, followed by washing two times with 70% IPA, two times with 25% IPA, two times with DI, and finally two times with borate buffered packaging solution. Each washing step lasted about 30 minutes. A person of ordinary skill recognizes that the exact lens release process can be varied depending on the lens formulation and mold materials, regarding the concentrations of the aqueous isopropanol solutions, the number of washings with each solvent, and the duration of each step. The purpose of the lens release process is to release all of the lenses without defects and transition from diluent swollen networks to the packaging solution swollen hydrogels. The lenses were transferred into vials and subsequently sterilized by autoclaving at 122° C. for 30 minutes. The physical and mechanical properties of the sterile lenses were measured and listed in Table 21.

TABLE 20

| Component | Ex 30 | Ex 31 | Ex 32 | Ex 33 | Ex 34 | Ex 35 | Ex 36 | Ex 37 | Ex 38 |
|---|---|---|---|---|---|---|---|---|---|
| OH-mPDMS (n = 15) | 33 | 33 | 33 | 32 | 32 | 32 | 32 | 31 | 30 |
| OH-mPDMS (n = 4) | 25 | 25 | 25 | 25 | 25 | 25 | 25 | 25 | 25 |
| Weight ratio of OH-mPDMS (n = 4) to OH-mPDMS (n = 15) | 0.76 | 0.76 | 0.76 | 0.78 | 0.78 | 0.78 | 0.78 | 0.81 | 0.83 |
| Molar ratio of OH-mPDMS (n = 4) to OH-mPDMS (n = 15) | 1.77 | 1.77 | 1.77 | 1.82 | 1.82 | 1.82 | 1.82 | 1.87 | 1.94 |
| NVP | 5.36 | 5.26 | 5.16 | 5.41 | 5.41 | 5.66 | 5.54 | 5.54 | 5.54 |
| DMA | 5.37 | 5.27 | 5.17 | 5.42 | 5.42 | 5.67 | 5.54 | 6.54 | 7.54 |
| HEMA | 10.5 | 10.5 | 10.5 | 10.73 | 11.33 | 11.33 | 11.33 | 11.33 | 11.33 |
| Blue HEMA | 0 | 0 | 0 | 0.02 | 0.02 | 0.02 | 0.02 | 0.02 | 0.02 |
| PVMA 628 kDa | 13.5 | 13.5 | 13.5 | 13.5 | 13.5 | 13.5 | 13.5 | 13.5 | 13.5 |
| mPEG 950 | 3 | 3 | 3 | 3 | 3 | 3 | 3 | 3 | 3 |
| MAA | 0.75 | 0.75 | 0.75 | 1 | 1 | 1 | 1 | 1 | 1 |

TABLE 20-continued

| Component | Ex 30 | Ex 31 | Ex 32 | Ex 33 | Ex 34 | Ex 35 | Ex 36 | Ex 37 | Ex 38 |
|---|---|---|---|---|---|---|---|---|---|
| TEGDMA | 1.2 | 1.40 | 1.60 | 1.60 | 0 | 0 | 0 | 0 | 0 |
| TAC | 0.2 | 0.2 | 0.2 | 0.2 | 0.2 | 0.2 | 0.2 | 0.2 | 0.2 |
| EGDMA | 0 | 0 | 0 | 0 | 1 | 0.5 | 0.75 | 0.75 | 0.75 |
| Norbloc | 1.75 | 1.75 | 1.75 | 1.75 | 1.75 | 1.75 | 1.75 | 1.75 | 1.75 |
| CGI 819 | 0.37 | 0.37 | 0.37 | 0.37 | 0.37 | 0.37 | 0.37 | 0.37 | 0.37 |
| Diluent | 23 | 23 | 23 | 23 | 23 | 23 | 23 | 23 | 23 |
| D3O | 100 | 100 | 100 | 100 | 100 | 100 | 100 | 100 | 100 |

TABLE 21

| Lens | Weight % Water | % Haze | DCA (adv, rec) | Mechanicals M (psi) | Mechanicals % ETB | Dk | Lysozyme (µg/Lens) | PQ1 Uptake (%) | Lipid Uptake (µg/lens) |
|---|---|---|---|---|---|---|---|---|---|
| Ex 30 | 50 (0) | 24 (2) | 16 (14), 16 (13) | 94 (7) | 168 (37) | 148 | 57 (8) | 3.02 (3.39) | 6.58 (0.29) |
| Ex 31 | 50 (0) | 20 (1) | 75 (42), 3 (5) | 100 (7) | 155 (43) | 147 | 52 (8) | 4.21 (1.02) | 7.10 (0.53) |
| Ex 32 | 49 (1) | 17 (1) | 24 (26), 3 (6) | 92 (8) | 128 (30) | 151 | 35 (7) | 1 (1.64) | 6.70 (0.53) |
| Ex 33 | 49 (0) | 18 (1) | 12 (13), 4 (7) | 107 (14) | 115 (32) | 145 | 134 (11) | 6.06 (0.29) | 6.73 (0.74) |
| Ex 34 | 44 (0) | 10 (1) | 24 (12), 0 (0) | 193 (15) | 92 (26) | 151 | 51 (6) | 5.74 (0.18) | 2.58 (6.36) |
| Ex 35 | 50 (0) | 18 (1) | 65 (11), 13 (16) | 103 (8) | 164 (46) | 142 | 186 (14) | 6.65 (0.27) | 10.64 (1.64) |
| Ex 36 | 48 (0) | 13 (1) | 30 (14), 21 (17) | 151 (11) | 110 (31) | 147 | 119 (8) | 6.02 (0.13) | 2.68 (0.33) |
| Ex 37 | 48 (0) | 13 (1) | 41 (9), 27 (16) | 135 (11) | 123 (32) | 140 | 217 (15) | 6.05 (0.12) | 2.52 (7.47) |
| Ex 38 | 49 (0) | 11 (1) | 42 (5), 37 (5) | 127 (11) | 129 (27) | 125 | 301 (14) | 6.46 (0.14) | 2.77 2.24) |

Lenses made from PVMA 628 kDa and mixtures DMA and NVP exhibited surprisingly excellent biometrics, including lipid uptake of about 10 µg/lens or less and PQ1 uptake less than about 10%, and moderate lysozyme uptake, as well as an excellent balance of physical and mechanical properties.

Examples 39-43

Each reactive mixture was formed by mixing the reactive components listed in Table 22, filtering through a 3 µm filter using a heated or unheated stainless steel or glass syringe, and then degassed by applying vacuum at ambient temperature for about 10 minutes. In a glove box with a nitrogen gas atmosphere and less than 0.1 percent oxygen gas, about 75-100 µL of the reactive mixture were dosed using an Eppendorf pipet at room temperature into the FC made of 90:10 (w/w) Z:TT. The BC made of PP was then placed onto the FC. The molds were equilibrated for a minimum of twelve hours in the glove box prior to dosing. The plate was transferred into an adjacent glove box maintained at 62-65° C., and the lenses were cured from the top for 12 minutes using TLO3 lights having intensity of 4-5 mW/cm². The light source was about six inches above the trays.

The lenses were manually de-molded with most lenses adhering to the FC and released by suspending the 64 lenses in about one liter of 70% IPA for about one or two hours, followed by washing two times with 70% IPA, two times with 25% IPA, two times with DI, and finally two times with borate buffered packaging solution. Each washing step lasted about 30 minutes. A person of ordinary skill recognizes that the exact lens release process can be varied depending on the lens formulation and mold materials, regarding the concentrations of the aqueous isopropanol solutions, the number of washings with each solvent, and the duration of each step. The purpose of the lens release process is to release all of the lenses without defects and transition from diluent swollen networks to the packaging solution swollen hydrogels. The lenses were transferred into vials and subsequently sterilized by autoclaving at 122° C. for 30 minutes. The physical and mechanical properties of the sterile lenses were measured and listed in Table 23.

TABLE 22

| Component | Ex 39 | Ex 40 | Ex 41 | Ex 42 | Ex 43 |
|---|---|---|---|---|---|
| OH-mPDMS (n = 15) | 33 | 33 | 33 | 33 | 33 |
| OH-mPDMS (n = 4) | 25 | 25 | 25 | 25 | 25 |
| Weight ratio of OH-mPDMS (n = 4) to OH-mPDMS (n = 15) | 0.76 | 0.76 | 0.76 | 0.76 | 0.76 |
| Molar ratio of OH-mPDMS (n = 4) to OH-mPDMS (n = 15) | 1.77 | 1.77 | 1.77 | 1.77 | 1.77 |
| NVP | 5.16 | 5.04 | 4.91 | 4.79 | 4.66 |
| DMA | 5.17 | 5.04 | 4.92 | 4.79 | 4.67 |
| HEMA | 10.5 | 10.5 | 10.5 | 10.5 | 10.5 |
| PVMA 628 kDa | 13.5 | 13.5 | 13.5 | 13.5 | 13.5 |
| mPEG 950 | 3 | 3 | 3 | 3 | 3 |
| MAA | 0.75 | 1 | 1.25 | 1.5 | 1.75 |
| TEGDMA | 1.60 | 1.60 | 1.60 | 1.60 | 1.60 |
| TAC | 0.2 | 0.2 | 0.2 | 0.2 | 0.2 |
| Norbloc | 1.75 | 1.75 | 1.75 | 1.75 | 1.75 |
| CGI 819 | 0.37 | 0.37 | 0.37 | 0.37 | 0.37 |
| Diluent | 23 | 23 | 23 | 23 | 23 |
| D3O | 100 | 100 | 100 | 100 | 100 |

TABLE 23

| Lens | Weight % Water | % Haze | DCA (adv, rec) | Mechanicals M (psi) | % ETB | Dk | Lysozyme (µg/Lens) | PQ1 Uptake (%) | Lipid Uptake (µg/lens) |
|---|---|---|---|---|---|---|---|---|---|
| Ex 39 | 49 (1) | 17 (1) | 24 (26), 3 (6) | 92 (8) | 128 (30) | 151 | 35 (7) | 1 (1.64) | 7.10 (0.53) |
| Ex 40 | 49 (0) | 22 (1) | 52 (34), 10 (14) | 100 (13) | 136 (31) | 146 | 113 (9) | 4.21 (0.59) | 6.98 (0.35) |
| Ex 41 | 49 (0) | 16 (1) | 61 (27), 16 (7) | 89 (12) | 108 (63) | 156 | 253 (7) | 14.99 (3.58) | 7.89 (0.41) |
| Ex 42 | 51 (0) | 18 (1) | 14 (19), 8 (10) | 93 (14) | 123 (47) | 142 | 506 (29) | 39.70 (2.45) | 7.34 (0.37) |
| Ex 43 | 52 (0) | 14 (1) | 48 (36), 7 (8) | 95 (10) | 131 (38) | 134 | 868 (28) | 59.49 (6.05) | 8.650.81) |

Lysozyme uptake and PQ1 uptake increased with MAA content.

Examples 44-45

Example 41 was repeated, except that the ratio of the hydroxyl-containing silicone components was varied, as shown in Table 24. Example 44 is the same lens as Example 41, with only the lysozyme uptake test repeated. Each reactive mixture was formed by mixing the reactive components listed in Table 24, filtering through a 3 µm filter using a heated or unheated stainless steel or glass syringe, and then degassed by applying vacuum at ambient temperature for about 10 minutes. In a glove box with a nitrogen gas atmosphere and less than 0.1 percent oxygen gas, about 75-100 µL of the reactive mixture were dosed using an Eppendorf pipet at room temperature into the FC made of Zeonor. The BC made of PP was then placed onto the FC. The molds were equilibrated for a minimum of twelve hours in the glove box prior to dosing. The plate was transferred into an adjacent glove box maintained at 62-65° C., and the lenses were cured from the top for 20 minutes using TLO3 lights having intensity of 3-4 mW/cm$^2$. The light source was about six inches above the trays.

The lenses were manually de-molded with most lenses adhering to the FC and released by suspending the 64 lenses in about one liter of 70% IPA for about one or two hours, followed by washing two times with 70% IPA, two times with 25% IPA, two times with DI, and finally two times with borate buffered packaging solution. Each washing step lasted about 30 minutes. A person of ordinary skill recognizes that the exact lens release process can be varied depending on the lens formulation and mold materials, regarding the concentrations of the aqueous isopropanol solutions, the number of washings with each solvent, and the duration of each step. The purpose of the lens release process is to release all of the lenses without defects and transition from diluent swollen networks to the packaging solution swollen hydrogels. The lenses were transferred into vials and subsequently sterilized by autoclaving at 122° C. for 30 minutes. The physical and mechanical properties of the sterile lenses were measured and listed in Table 25.

TABLE 24

| Component | Ex 44 | Ex 45 | Ex 46 | Ex 47 | Ex 48 | Ex 49 | Ex 50 |
|---|---|---|---|---|---|---|---|
| OH-mPDMS (n = 15) | 33 | 32.5 | 32 | 31.5 | 31 | 30.5 | 30 |
| OH-mPDMS (n = 4) | 25 | 25 | 25 | 25 | 25 | 25 | 25 |
| Weight ratio of OH-mPDMS (n = 4) to OH-mPDMS (n = 15) | 0.76 | 0.77 | 0.78 | 0.79 | 0.81 | 0.82 | 0.83 |
| Molar ratio of OH-mPDMS (n = 4) to OH-mPDMS (n = 15) | 1.77 | 1.79 | 1.82 | 1.84 | 1.87 | 1.91 | 1.94 |
| NVP | 4.91 | 5.16 | 5.41 | 5.66 | 5.91 | 6.16 | 6.41 |
| DMA | 4.92 | 5.17 | 5.42 | 5.67 | 5.92 | 6.17 | 6.42 |
| HEMA | 10.5 | 10.5 | 10.5 | 10.5 | 10.5 | 10.5 | 10.5 |
| PVMA 628 kDa | 13.5 | 13.5 | 13.5 | 13.5 | 13.5 | 13.5 | 13.5 |
| mPEG 950 | 3 | 3 | 3 | 3 | 3 | 3 | 3 |
| MAA | 1.25 | 1.25 | 1.25 | 1.25 | 1.25 | 1.25 | 1.25 |
| TEGDMA | 1.60 | 1.60 | 1.60 | 1.60 | 1.60 | 1.60 | 1.60 |
| TAC | 0.2 | 0.2 | 0.2 | 0.2 | 0.2 | 0.2 | 0.2 |
| Norbloc | 1.75 | 1.75 | 1.75 | 1.75 | 1.75 | 1.75 | 1.75 |
| CGI 819 | 0.37 | 0.37 | 0.37 | 0.37 | 0.37 | 0.37 | 0.37 |
| Diluent | 23 | 23 | 23 | 23 | 23 | 23 | 23 |
| D3O | 100 | 100 | 100 | 100 | 100 | 100 | 100 |

TABLE 25

| Lens | Weight % Water | % Haze | DCA | Mechanicals M (psi) | % ETB | Dk | Lysozyme (μg/Lens) | PQ1 Uptake (%) | Lipid Uptake (μg/lens) |
|---|---|---|---|---|---|---|---|---|---|
| Ex 44 | 49 (0) | 16 (1) | 61 (27), 16 (7) | 89 (12) | 108 (63) | 156 | 230 (16) | 14.99 (3.58) | 7.89 (0.41) |
| Ex 45 | 50 (1) | 16 (0) | 21 (16), 14 (13) | 100 (11) | 123 (36) | 145 | 250 (17) | 11.87 (3.26) | 6.90 (0.29) |
| Ex 46 | 50 (0) | 16 (0) | 20 (14), 3 (6) | 101 (7) | 129 (30) | 145 | 288 (36) | 12.23 (2.82) | 7.17 (0.26) |
| Ex 47 | 50 (0) | 14 (1) | 65 (21), 16 (11) | 97 (12) | 133 (26) | 158 | 290 (7) | 11.97 (3.07) | 7.49 (0.49) |
| Ex 48 | 52 (0) | 14 (1) | 23 (16), 21 (18) | 100 (7) | 107 (38) | 132 | 451 (39) | 14.73 (3.09) | 7.02 (0.12) |
| Ex 49 | 52 (0) | 14 (1) | 40 (32), 15 (10) | 96 (9) | 109 (44) | 131 | 471 (12) | 14.97 (2.86) | 7.74 (0.47) |
| Ex 50 | 52 (0) | 11 (1) | 25 (18), 17 (17) | 98 (8) | 144 (36) | 133 | 517 (23) | 15.2 (1.08) | 6.520.16) |

All lenses showed a desirable balance of mechanical and biometric properties.

Examples 51-52

Each reactive mixture was formed by mixing the reactive components listed in Table 26, filtering through a 3 μm filter using a heated or unheated stainless steel or glass syringe, and then degassed by applying vacuum at ambient temperature for about 10 minutes. In a glove box with a nitrogen gas atmosphere and less than 0.1 percent oxygen gas, about 75-100 μL of the reactive mixture were dosed using an Eppendorf pipet at room temperature into the FC made of Zeonor. The BC made of PP was then placed onto the FC. The molds were equilibrated for a minimum of twelve hours in the glove box prior to dosing. The plate was transferred into an adjacent glove box maintained at 62-65° C., and the lenses were cured from the top for 25 minutes using TLO3 lights having intensity of 4-5 mW/cm². The light source was about six inches above the trays.

The lenses were manually de-molded with most lenses adhering to the FC and released by suspending the 64 lenses in about one liter of 70% IPA for about one or two hours, followed by washing two times with 70% IPA, two times with 25% IPA, two times with DI, and finally two times with borate buffered packaging solution. Each washing step lasted about 30 minutes. A person of ordinary skill recognizes that the exact lens release process can be varied depending on the lens formulation and mold materials, regarding the concentrations of the aqueous isopropanol solutions, the number of washings with each solvent, and the duration of each step. The purpose of the lens release process is to release all of the lenses without defects and transition from diluent swollen networks to the packaging solution swollen hydrogels. The lenses were transferred into vials and subsequently sterilized by autoclaving at 122° C. for 30 minutes. The physical and mechanical properties of the sterile lenses were measured and listed in Table 27.

TABLE 26

| Component | Ex 51 | Ex 52 |
|---|---|---|
| OH-mPDMS (n = 15) | 30 | 30 |
| OH-mPDMS (n = 4) | 25 | 25 |
| Weight ratio of OH-mPDMS (n = 4) to OH-mPDMS (n = 15) | 0.83 | 0.83 |
| Molar ratio of OH-mPDMS (n = 4) to OH-mPDMS (n = 15) | 1.94 | 1.94 |
| NVP | 7.22 | 6.12 |
| DMA | 7.22 | 6.12 |
| HEMA | 10.5 | 10.5 |
| PVMA 628 kDa | 9 | 15 |
| PVMA 1600 kDa | 3 | 0 |
| mPEG 950 | 3 | 3 |
| MAA | 0.75 | 0.75 |
| Q-Salt | 1.25 | 0 |
| TEGDMA | 0.75 | 1.2 |
| TAC | 0.2 | 0.2 |
| Norbloc | 1.75 | 1.75 |
| CGI 819 | 0.36 | 0.36 |
| Diluent | 20 | 23 |
| D3O | 100 | 100 |

TABLE 27

| Ex # | % Water | % Haze | DCA (adv, rec) | Mechanicals M (psi) | % ETB | Dk | Lysozyme (μg/Lens) | PQ1 Uptake (%) | Lipid Uptake (μg/lens) |
|---|---|---|---|---|---|---|---|---|---|
| 51 | 52 (0) | 18 (1) | 19 (19), 21 (19) | 70 (6) | 204 (49) | 132 | 47 (5) | 5.93 (0.49) | 2.77 (1.39) |
| 52 | 56 (0) | 14 (1) | 28 (6), 9 (10) | 76 (13) | 146 (55) | 121 | 258 (19) | 5.80 (0.16) | 4.05 (3.09) |

Lenses containing an ammonium chloride salt (Q-Salt) displayed greatly reduced lysozyme uptake, but a good balance of mechanical properties and low PQ-1 and lipid uptake. This example shows that cationic components can be added, without negatively impacting compatibility (as shown by the 18% haze) and while maintaining a desirable balance of properties.

Examples 53-55

Each reactive mixture was formed by mixing the reactive components listed in Table 28, filtering through a 3 µm filter using a heated or unheated stainless steel or glass syringe, and then degassed by applying vacuum at ambient temperature for about 10 minutes. In a glove box with a nitrogen gas atmosphere and less than 0.1 percent oxygen gas, about 75-100 µL of the reactive mixture were dosed using an Eppendorf pipet at room temperature into the FC made of Zeonor. The BC made of PP was then placed onto the FC. The molds were equilibrated for a minimum of twelve hours in the glove box prior to dosing. The plate was transferred into an adjacent glove box maintained at 62-65° C., and the lenses were cured from the top for 25 minutes using TL03 lights having intensity of 4-5 mW/cm². The light source was about six inches above the trays.

The lenses were manually de-molded with most lenses adhering to the FC and released by suspending the 64 lenses in about one liter of 70% IPA for about one or two hours, followed by washing two times with 70% IPA, two times with 25% IPA, two times with DI, and finally two times with borate buffered packaging solution. Each washing step lasted about 30 minutes. A person of ordinary skill recognizes that the exact lens release process can be varied depending on the lens formulation and mold materials, regarding the concentrations of the aqueous isopropanol solutions, the number of washings with each solvent, and the duration of each step. The purpose of the lens release process is to release all of the lenses without defects and transition from diluent swollen networks to the packaging solution swollen hydrogels. The lenses were transferred into vials and subsequently sterilized by autoclaving at 122° C. for 30 minutes. The physical and mechanical properties of the sterile lenses were measured and listed in Table 29.

TABLE 28

| Component | Ex 53 | Ex 54 | Ex 55 |
|---|---|---|---|
| OH-mPDMS (n = 15) | 32 | 32 | 32 |
| OH-mPDMS (n = 4) | 25 | 25 | 25 |
| Weight ratio of OH-mPDMS (n = 4) to OH-mPDMS (n = 15) | 0.78 | 0.78 | 0.78 |
| Molar ratio of OH-mPDMS (n = 4) to OH-mPDMS (n = 15) | 1.82 | 1.82 | 1.82 |
| NVP | 5.41 | 6.91 | 5.45 |
| DMA | 5.42 | 6.92 | 5.46 |
| HEMA | 11.33 | 11.33 | 12.75 |
| Blue HEMA | 0.02 | 0.02 | 0.02 |
| PVMA 628 kDa | 13.5 | 13.5 | 10 |
| Poly[DMA-co-CBT] | 0 | 0 | 5 |
| mPEG 950 | 3 | 0 | 0 |
| MAA | 1 | 1 | 1 |
| EGDMA | 1 | 1 | 1 |
| TAC | 0.2 | 0.2 | 0.2 |
| Norbloc | 1.75 | 1.75 | 1.75 |
| CGI 819 | 0.37 | 0.37 | 0.37 |
| Diluent | 23 | 23 | 23 |
| D3O | 100 | 100 | 100 |

The Poly[DMA-co-CBT], is a random copolymer of DMA and 20 wt % (10 mol %) zwitterionic monomer carboxybetaine. Carboxybetaine is highly hydrophilic internal salt which is generally poorly compatible with silicone hydrogel reactive mixtures. It was surprising that 5 wt % of this copolymer could be incorporated into silicone hydrogels formulations displaying only 30% haze. Lenses containing zwitterionic internal wetting agent showed increased lysozyme and PQ1 uptake.

Examples 56-63

A series of lenses were made from reactive mixtures with varying formulation components, including hydrophilic monomer, hydroxyl-containing silicone component, types and amount of crosslinker and amounts of ionic monomer. Each reactive mixture was formed by mixing the reactive components listed in Table 30, filtering through a 3 µm filter using a heated or unheated stainless steel or glass syringe, and then degassed by applying vacuum at ambient temperature for about 10 minutes. In a glove box with a nitrogen gas atmosphere and less than 0.1 percent oxygen gas, about 75-100 µL of the reactive mixture were dosed using an Eppendorf pipet at room temperature into the FC made of Zeonor. The BC made of PP was then placed onto the FC. The molds were equilibrated for a minimum of twelve hours in the glove box prior to dosing. The plate was transferred into an adjacent glove box maintained at 62-65° C., and the lenses were cured from the top for 12 minutes using TL03 lights having intensity of 4-5 mW/cm². The light source was about six inches above the trays.

The lenses were manually de-molded with most lenses adhering to the FC and released by suspending the 64 lenses in about one liter of 70% IPA for about one or two hours, followed by washing two times with 70% IPA, two times with 25% IPA, two times with DI, and finally two times with borate buffered packaging solution. Each washing step lasted about 30 minutes. A person of ordinary skill recognizes that the exact lens release process can be varied depending on the lens formulation and mold materials, regarding the concentrations of the aqueous isopropanol solutions, the number of washings with each solvent, and the duration of each step. The purpose of the lens release process is to release all of the lenses without defects and transition from diluent swollen networks to the packaging solution swollen hydrogels. The lenses were transferred into vials and subsequently sterilized by autoclaving at 122° C. for 30 minutes. The physical and mechanical properties of the sterile lenses were measured and listed in Table 31.

TABLE 29

| Ex. | % Water | % Haze | DCA (adv, rec) | M (psi) | Mechanicals % ETB | Dk | Lysozyme (µg/Lens) | PQ1 Uptake (%) | Lipid Uptake (µg/lens) |
|---|---|---|---|---|---|---|---|---|---|
| 53 | 44 (0) | 10 (1) | 24 (12), 0 (0) | 193 (15) | 92 (26) | 151 | 51 (6) | 2.58 (6.36) | 5.74 (0.18) |
| 54 | 44 (0) | 14 (1) | 29 (10), 6 (11) | 182 (20) | 93 (34) | 151 | 57 (5) | 8.46 (2.44) | 5.71 (0.36) |
| 55 | 44 (0) | 30 (2) | 18 (13), 3 (7) | 164 (14) | 121 (31) | 132 | 106 (8) | 21.80 (1.03) | 6.02 (0.2) |

TABLE 30

| Component | Ex 56 | Ex 57 | Ex 58 | Ex 59 | Ex 60 | Ex 61 | Ex 62 | Ex 63 |
|---|---|---|---|---|---|---|---|---|
| OH-mPDMS (n = 15) | 31 | 31 | 31 | 31 | 30 | 31 | 32 | 33 |
| OH-mPDMS (n = 4) | 25 | 25 | 25 | 25 | 25 | 25 | 25 | 25 |
| Weight ratio of OH-mPDMS (n = 4) to OH-mPDMS (n = 15) | 0.81 | 0.81 | 0.81 | 0.81 | 0.83 | 0.81 | 0.78 | 0.76 |
| Molar ratio of OH-mPDMS (n = 4) to OH-mPDMS (n = 15) | 1.87 | 1.87 | 1.87 | 1.87 | 1.94 | 1.87 | 1.82 | 1.77 |
| NVP | 5.54 | 5.54 | 5.54 | 4.54 | 0 | 0 | 0 | 0 |
| DMA | 6.54 | 6.54 | 6.54 | 6.04 | 16.03 | 15.03 | 14.03 | 13.03 |
| HEMA | 11.33 | 11.33 | 11.33 | 11.33 | 10.5 | 10.5 | 10.5 | 10.5 |
| Blue HEMA | 0.02 | 0.02 | 0.02 | 0.02 | 0.02 | 0.02 | 0.02 | 0.02 |
| PVMA 628 kDa | 13.5 | 13.5 | 13.5 | 15 | 13.5 | 13.5 | 13.5 | 13.5 |
| mPEG 950 | 3 | 3 | 3 | 3 | 0 | 0 | 0 | 0 |
| MAA | 1 | 1 | 1 | 1 | 1.25 | 1.25 | 1.25 | 1.25 |
| TEGDMA | 0 | 0 | 0 | 0 | 1.6 | 1.6 | 1.6 | 1.6 |
| EGDMA | 0.75 | 0.75 | 0.75 | 0.75 | 0 | 0 | 0 | 0 |
| TAC | 0.2 | 0.2 | 0.2 | 0.2 | 0 | 0 | 0 | 0 |
| Norbloc | 1.75 | 1.75 | 1.75 | 1.75 | 1.75 | 1.75 | 1.75 | 1.75 |
| CGI 819 | 0.37 | 0.37 | 0.37 | 0.37 | 0.35 | 0.35 | 0.35 | 0.35 |
| Diluent | 25 | 27.5 | 30 | 30 | 23 | 23 | 23 | 23 |
| D3O | 100 | 100 | 100 | 100 | 100 | 100 | 100 | 100 |

TABLE 31

| Ex | % Water | % Haze | DCA (adv, rec) | Mechanicals M (psi) | Mechanicals % ETB | Mechanicals Dk | Lysozyme (μg/Lens) | PQ1 Uptake (%) | Lipid Uptake (μg/lens) |
|---|---|---|---|---|---|---|---|---|---|
| 56 | 49 (0) | 15 (1) | 36 (22), 27 (17) | 111 (11) | 160 (49) | 125 | 294 ± 25 | 3.81 (0.44) | NT |
| 57 | 49 (0) | 14 (1) | 46 (15), 27 (9) | 99 (11) | 168 (36) | 130 | 317 ± 27 | 5.61 (0.27) | NT |
| 58 | 50 (0) | 13 (1) | 29 (9), 17 (9) | 96 (6) | 158 (37) | 138 | 341 ± 12 | 1.98 (0.90) | NT |
| 59 | 51 (0) | 13 (1) | 26 (5), 10 (9) | 115 (11) | 136 (53) | 135 | 191 ± 25 | 1.10 (1.36) | NT |
| 60 | 53 (0) | 12 (2) | 67 (30), 6 (8) | 84 (8) | 149 (59) | 125 | 819 (66) | 49.47 (5.05) | 6.95 (1.26) |
| 61 | 51 (0) | 12 (1) | 79 (18), 17 (14) | 87 (13) | 125 (52) | 128 | 596 (47) | 48.5 (2.44) | 9.2 (0.78) |
| 62 | 50 (0) | 11 (1) | 39 (2), 11 (7) | 97 (13) | 128 (40) | 139 | 428 (7) | 48.83 (2.54) | 6.66 (0.09) |
| 63 | 51 (0) | 15 (1) | 40 (14), 0 (0) | 98 (8) | 140 (44) | 140 | 355 (17) | 52.57 (1.18) | 7.360.37) |

All lenses showed a desirable combination of properties. Also, comparing Examples 61-63 to the lenses made in US822016, using a combination of hydroxyl-containing silicone components instead of one non-hydroxyl silicone component (mPDMS) and a hydroxyl-functional silicone-containing monomer (SiMAA), allowed for the incorporation of an anionic component (MAA), without adding thermal instability, water contents above about 50%, advancing contact angles less than 80 and Dk values of about 130 barrers or more.

Examples 64-68

Each reactive mixture was formed by mixing the reactive components listed in Table 32, filtering through a 3 μm filter using a heated or unheated stainless steel or glass syringe, and then degassed by applying vacuum at ambient temperature for about 10 minutes. In a glove box with a nitrogen gas atmosphere and less than 0.1 percent oxygen gas, about 75-100 μL of the reactive mixture were dosed using an Eppendorf pipet at room temperature into the FC made of Zeonor. The BC made of a 55:45 (w/w) blend of Z and PP was then placed onto the FC. The molds were equilibrated for a minimum of twelve hours in the glove box prior to dosing. The plate was transferred into an adjacent glove box maintained at 62-65° C. The lenses of Examples 64 and 66-68 were cured from the top for 20 minutes using 420 nm and 435 nm LED lights, respectively, having intensity of 4 mW/cm². Example 65 was cured using TLO3 bulbs at 5 mW/cm², for 15 minutes. The light source was about six inches above the trays.

The lenses were manually de-molded with most lenses adhering to the FC and released by suspending the 64 lenses in about one liter of 70% IPA for about one or two hours, followed by washing two times with 70% IPA, two times with 25% IPA, two times with DI, and finally two times with borate buffered packaging solution. Each washing step lasted about 30 minutes. The lenses were transferred into vials and subsequently sterilized by autoclaving at 122° C. for 30 minutes. The physical and mechanical properties of the sterile lenses were measured and listed in Table 33.

TABLE 32

| Component | Ex 64 | Ex 65 | Ex 66 | Ex 67 | Ex 68 |
|---|---|---|---|---|---|
| OH-mPDMS (n = 15) | 31 | 31 | 31 | 31 | 31 |
| OH-mPDMS (n = 4) | 25 | 25 | 25 | 25 | 25 |
| Weight ratio of OH-mPDMS (n = 4) to OH-mPDMS (n = 15) | 0.81 | 0.81 | 0.81 | 0.81 | 0.81 |
| Molar ratio of OH-mPDMS (n = 4) to OH-mPDMS (n = 15) | 1.87 | 1.87 | 1.87 | 1.87 | 1.87 |
| NVP | 5.66 | 5.35 | 6.1 | 6.1 | 6.1 |
| DMA | 6.54 | 5.35 | 6.1 | 6.1 | 6.1 |
| HEMA | 11.33 | 11.33 | 11.33 | 11.33 | 11.33 |
| Blue HEMA | 0.02 | 0.02 | 0.02 | 0.02 | 0.02 |
| PVMA 628 kDa | 13.5 | 15 | 12 | 10.5 | 8.5 |

TABLE 32-continued

| Component | Ex 64 | Ex 65 | Ex 66 | Ex 67 | Ex 68 |
|---|---|---|---|---|---|
| PVP K90 | 0 | 0 | 1.5 | 3 | 5 |
| mPEG 950 | 3 | 3 | 3 | 3 | 3 |
| MAA | 1 | 1 | 1 | 1 | 1 |
| TEGDMA | 0.75 | 0.75 | 0.75 | 0.75 | 0.75 |
| TAC | 0.2 | 0.2 | 0.2 | 0.2 | 0.2 |
| Norbloc | 1.75 | 1.75 | 1.75 | 1.75 | 1.75 |
| CGI 819 | 0.25 | 0.25 | 0.25 | 0.25 | 0.25 |
| Diluent | 30 | 30 | 30 | 30 | 30 |
| D3O | 100 | 100 | 100 | 100 | 100 |

TABLE 33

| Ex | % Water | % Haze | DCA (adv, rec) | Mechanicals M (psi) | % ETB | Dk | Lysozyme (µg/Lens) | PQ1 Uptake (%) | Lipid Uptake (µg/lens) |
|---|---|---|---|---|---|---|---|---|---|
| 64 | 49 (0) | 17 (0) | 33 (6), 11 (11) | 99 (12) | 187 (53) | 133 | 245 ± 12 | −3.04 (1.30) | NT |
| 65 | 49 (0) | 14 (0) | 33 (12,), 12 (16) | 111 (7) | 167 (46) | 142 | 167 ± 8 | −0.44 (2.40) | NT |
| 66 | 49 (0) | 12 (1) | 24 (9), 16 (5) | 88 (13) | 206 (52) | 117 | 224 ± 14 | 6.13 (0.54) | 2.61 (1.80) |
| 67 | 49 (0) | 13 (1) | 52 (7), 22 (8) | 109 (8) | 179 (29) | 125 | 291 ± 4 | 6.96 (0.28) | −0.09 (3.39) |
| 68 | 47 (0) | 15 (1) | 13 (19), 10 (11) | 115 (10) | 165 (60) | 135 | 200 ± 12 | 6.92 (0.23) | 1.94 0.46) |

Lenses prepared using mixtures of NVP and DMA together with mixtures of OH-mPDMS and mixtures of PVMA and PVP as the internal wetting agents showed an excellent balance of biometric properties including moderate lysozyme, PQ1, and lipid uptake.

Examples 69-72

Each reactive mixture was formed by mixing the reactive components listed in Table 34, filtering through a 3 µm filter using a heated or unheated stainless steel or glass syringe, and then degassed by applying vacuum at ambient temperature for about 10 minutes. In a glove box with a nitrogen gas atmosphere and less than 0.1 percent oxygen gas, about 75-100 µL of the reactive mixture were dosed using an Eppendorf pipet at room temperature into the FC made of Zeonor. The BC made of a 55:45 (w/w) blend of Z and PP was then placed onto the FC. The molds were equilibrated for a minimum of twelve hours in the glove box prior to dosing. The plate was transferred into an adjacent glove box maintained at 62-65° C., and the lenses were cured from the top for 20 minutes using 435 nm LED lights having intensity of 4 mW/cm². The light source was about six inches above the trays.

The lenses were manually de-molded with most lenses adhering to the FC and released by suspending the 64 lenses in about one liter of 70% IPA for about one or two hours, followed by washing two times with 70% IPA, two times with 25% IPA, two times with DI, and finally two times with borate buffered packaging solution. Each washing step lasted about 30 minutes. A person of ordinary skill recognizes that the exact lens release process can be varied depending on the lens formulation and mold materials, regarding the concentrations of the aqueous isopropanol solutions, the number of washings with each solvent, and the duration of each step. The purpose of the lens release process is to release all of the lenses without defects and transition from diluent swollen networks to the packaging solution swollen hydrogels. The lenses were transferred into vials and subsequently sterilized by autoclaving at 122° C. for 30 minutes. The physical and mechanical properties of the sterile lenses were measured and listed in Table 35.

TABLE 34

| Component | Ex 69 | Ex 70 | Ex 71 | Ex 72 | Ex 73 |
|---|---|---|---|---|---|
| OH-mPDMS (n = 15) | 31 | 31 | 31 | 31 | 31 |
| OH-mPDMS (n = 4) | 25 | 25 | 25 | 25 | 25 |
| Weight ratio of OH-mPDMS (n = 4) to OH-mPDMS (n = 15) | 0.80 | 0.80 | 0.80 | 0.80 | 0.80 |
| Molar ratio of OH-mPDMS (n = 4) to OH-mPDMS (n = 15) | 1.87 | 1.87 | 1.87 | 1.87 | 1.87 |
| NVP | 5.35 | 5.32 | 5.35 | 5.35 | 5.35 |
| DMA | 5.35 | 5.32 | 5.35 | 5.35 | 5.35 |
| HEMA | 11.33 | 11.30 | 11.33 | 11.33 | 11.33 |
| Blue HEMA | 0.02 | 0.02 | 0.02 | 0.02 | 0.02 |
| PVMA 628 kDa | 10 | 10 | 7.5 | 5 | 2.5 |
| PVP K90 | 5 | 5 | 7.5 | 10 | 12.5 |
| mPEG 950 | 3 | 3 | 3 | 3 | 3 |
| MAA | 1 | 1 | 1 | 1 | 1 |
| EGDMA | 0.75 | 0.75 | 0.75 | 0.75 | 0.75 |
| TAC | 0.2 | 0.2 | 0.2 | 0.2 | 0.2 |
| Norbloc | 1.75 | 1.75 | 1.75 | 1.75 | 1.75 |
| CGI 819 | 0.25 | 0 | 0.25 | 0.25 | 0.25 |
| CGI 1870 | 0 | 0.34 | 0 | 0 | 0 |
| Diluent | 30 | 30 | 30 | 30 | 30 |
| D3O | 100 | 100 | 100 | 100 | 100 |

TABLE 35

| Ex | % Water | % Haze | DCA (adv, rec) | Mechanicals M (psi) | % ETB | Dk | Lysozyme (µg/Lens) | PQ1 Uptake (%) | Lipid Uptake (µg/lens) |
|---|---|---|---|---|---|---|---|---|---|
| 69 | 49 (0) | 15 (1) | 37 (9), 23 (12) | 115 (8) | 180 (40) | 124 | 166 ± 9 | 6.96 (0.14) | 2.58 (1.84) |

TABLE 35-continued

| Ex | % Water | % Haze | DCA (adv, rec) | Mechanicals M (psi) | % ETB | Dk | Lysozyme (μg/Lens) | PQ1 Uptake (%) | Lipid Uptake (μg/lens) |
|---|---|---|---|---|---|---|---|---|---|
| 70 | 47 (0) | 16 (2) | 43 (7), 18 (15) | 118 (11) | 198 (40) | 134 | 133 ± 5 | 7.02 (0.42) | 2.89 (2.45) |
| 71 | 49 (0) | 13 (1) | 16 (21), 16 (18) | 102 (11) | 192 (33) | 130 | 185 ± 15 | 8.22 (0.5) | 6.08 (1.37) |
| 72 | 47 (0) | 16 (2) | 18 (11), 4 (6) | 127 (14) | 213 (38) | 139 | 134 ± 19 | 8.29 (0.68) | 2.53 (1.69) |
| 73 | 46.4 (0.3) | 15 (2) | 15 (18), 10 (15) | 134 (18) | 44 (20) | 136 | 97 ± 9 | NT | 2.49 (1.91) |

This series of Examples shows that lenses having very low lipid uptake values (less than about 5 μg/lens, and less than 3 μg/lens) may be prepared using a combination of acyclic polyamide and PVP. All lenses had a desirable balance of both biometric, physical and mechanical properties.

Examples 74-77

Each reactive mixture was formed by mixing the reactive components listed in Table 36, filtering through a 3 μm filter using a heated or unheated stainless steel or glass syringe, and then degassed by applying vacuum at ambient temperature for about 10 minutes. In a glove box with a nitrogen gas atmosphere and less than 0.1 percent oxygen gas, about 75-100 μL of the reactive mixture were dosed using an Eppendorf pipet at room temperature into the FC made of Zeonor. The BC made of a 55:45 (w/w) blend of Z and PP was then placed onto the FC. The molds were equilibrated for a minimum of twelve hours in the glove box prior to dosing. The plate was transferred into an adjacent glove box maintained at 62-65° C., and the lenses were cured from the top for 20 minutes using 435 nm LED lights having intensity of 4 mW/cm². The light source was about six inches above the trays.

The lenses were manually de-molded with most lenses adhering to the FC and released by suspending the 64 lenses in about one liter of 70% IPA for about one or two hours, followed by washing two times with 70% IPA, two times with 25% IPA, two times with DI, and finally two times with borate buffered packaging solution. Each washing step lasted about 30 minutes. A person of ordinary skill recognizes that the exact lens release process can be varied depending on the lens formulation and mold materials, regarding the concentrations of the aqueous isopropanol solutions, the number of washings with each solvent, and the duration of each step. The purpose of the lens release process is to release all of the lenses without defects and transition from diluent swollen networks to the packaging solution swollen hydrogels. The lenses were transferred into vials and subsequently sterilized by autoclaving at 122° C. for 30 minutes. The physical and mechanical properties of the sterile lenses were measured and listed in Table 37.

TABLE 36

| Component | Ex 74 | Ex 75 | Ex 76 | Ex 77 |
|---|---|---|---|---|
| OH-mPDMS (n = 15) | 31 | 31 | 26 | 21 |
| mPDMS 1000 (n = 10) | 0 | 0 | 10 | 10 |
| OH-mPDMS (n = 4) | 25 | 25 | 20 | 25 |
| Weight ratio OH-mPDMS (n = 4) to OH-mPDMS (n = 15) | 0.81 | 0.81 | 0.77 | 1.19 |
| Molar ratio of OH-mPDMS (n = 4) to OH-mPDMS (n = 15) | 2.37 | 3.33 | | |
| NVP | 5.35 | 5.32 | 5.35 | 5.35 |
| DMA | 5.35 | 5.32 | 5.35 | 5.35 |
| HEMA | 11.33 | 11.30 | 11.33 | 11.33 |
| Blue HEMA | 0.02 | 0.02 | 0.02 | 0.02 |
| PVMA 628 kDa | 5 | 5 | 5 | 5 |
| PVP K90 | 10 | 10 | 10 | 10 |
| mPEG 950 | 3 | 3 | 3 | 3 |
| MAA | 1 | 1 | 1 | 1 |
| EGDMA | 0.75 | 0.75 | 0.75 | 0.75 |
| TAC | 0.2 | 0.2 | 0.2 | 0.2 |
| Norbloc | 1.75 | 1.75 | 1.75 | 1.75 |
| CGI 819 | 0.25 | 0 | 0.25 | 0.25 |
| CGI 1870 | 0 | 0.34 | 0 | 0 |
| Diluent | 30 | 30 | 30 | 30 |
| D3O | 100 | 100 | 100 | 100 |

TABLE 37

| Ex | % Water | % Haze | DCA (adv, rec) | Mechanicals M (psi) | % ETB | Dk | Lysozyme (μg/Lens) |
|---|---|---|---|---|---|---|---|
| 74 | 45.7 (0.5) | 17 (1) | 13 (16), 4 (9) | 126 (10) | 82 (18) | 129 | 115 ± 12 |
| 75 | 44.8 (0.4) | 19 (1) | 24 (10), 8 (9) | 126 (15) | 73 (12) | 136 | 101 ± 21 |
| 76 | 45.6 (0.5) | 18 (1) | 96 (6), 17 (10) | 133 (12) | 65 (16) | 138 | 174 ± 54 |
| 77 | 46.8 (0.4) | 17 (1) | 91 (16), 18 (16) | 136 (8) | 62 (20) | 135 | 56 ± 2 |

Lenses prepared using mixtures of NVP and DMA together with mixtures of OH-mPDMS and mixtures of PVMA and PVP as the internal wetting agents showed an excellent balance of biometric properties including moderate lysozyme, PQ1, and lipid uptake, except when mPDMS was also included in the reactive mixture.

Examples 78-82

Lenses were made from the formulation listed in Example 82 of Table 38, below, using the procedures described in Examples 74-77. The lenses were transferred into vials and subsequently sterilized by autoclaving at 122° C. for 30 minutes. The physical and mechanical properties of the sterile lenses of Example 82 were measured and listed in Table 39.

TABLE 38

| Component | Ex 78 | Ex 79 | Ex 80 | Ex 81 | Ex 82 |
|---|---|---|---|---|---|
| OH-mPDMS (n = 4) | 42 | 42 | 42 | 42 | 42 |
| SiMAA | 21 | 21 | 21 | 21 | 21 |
| Weight ratio SiMMA to OH-mPDMS (n = 4) | 0.5 | 0.5 | 0.5 | 0.5 | 0.5 |
| DMA | 26.14 | 25.14 | 24.14 | 23.14 | 23.39 |
| PVP K90 | 7 | 8 | 9 | 10 | 10 |
| TEGDMA | 1.5 | 1.5 | 1.5 | 1.5 | 1.5 |
| Blue HEMA | 0.02 | 0.02 | 0.02 | 0.02 | 0.02 |
| Norbloc | 2 | 2 | 2 | 2 | 1.75 |
| CGI 1870 | 0.34 | 0.34 | 0.34 | 0.34 | 0.34 |
| Diluent | 23 | 23 | 23 | 23 | 23 |
| D3O | 100 | 100 | 100 | 100 | 100 |

TABLE 39

| Ex | Wt % Water | % Haze | DCA (adv, rec) | Mechanicals M (psi) | Mechanicals % ETB | Dk | Lipid (µg/Lens) |
|---|---|---|---|---|---|---|---|
| 82 | 39 (0) | 9 (1) | 21 (11), 21 (12) | 119 (9) | 277 (49) | 98 | 20.49 (3) |

Examples 83-93

Each reactive mixture was formed by mixing the reactive components listed in Table 40, filtering through a 3 µm filter using a heated or unheated stainless steel or glass syringe, and then degassed by applying vacuum at ambient temperature for about 10 minutes. In a glove box with a nitrogen gas atmosphere and less than 0.1 percent oxygen gas, about 75-100 µL of the reactive mixture were dosed using an Eppendorf pipet at room temperature into the FC made of Zeonor. The BC made of a 55:45 (w/w) blend of Z and PP was then placed onto the FC. The molds were equilibrated for a minimum of twelve hours in the glove box prior to dosing. The plate was transferred into an adjacent glove box maintained at 60-65° C., and the lenses were cured from the top. Examples 83 and 84 were cured for 20 minutes using 435 nm LED lights having intensity of 4 mW/cm$^2$. Examples 85-90 were cured for 15 minutes using TLO3 lights having intensity of 5 mW/cm$^2$. The light source was about six inches above the trays.

On the other hand, examples 91-93 were cured using 435 nm LED lights from the top and bottom first using an intensity of 1 mW/cm$^2$ for 2 minutes and second using an intensity of 2.5 mW/cm$^2$ for 6 minutes. Examples 91-93 also used a 90:10 (w/w) Z:TT blend FC and a 90:10 (w/w) Z:PP blend BC. The reaction temperature was 65° C., and the oxygen gas concentration was 0.1 percent in the glove box.

For Examples 83-90, the lenses were manually de-molded with most lenses adhering to the FC and released by suspending the 64 lenses in about one liter of 40% IPA for about one or two hours, followed by washing two times with 40% IPA, two times with DI, and finally two times with borate buffered packaging solution. Each washing step lasted at least 30 minutes. For Examples 91-93, the lenses were manually de-molded with most lenses adhering to the FC and released by suspending the 64 lenses in about one liter of 70% IPA for about one or two hours, followed by washing two times with 70% IPA, two times with DI, and finally two times with borate buffered packaging solution. Each washing step lasted at least 30 minutes. A person of ordinary skill recognizes that the exact lens release process can be varied depending on the lens formulation and mold materials, regarding the concentrations of the aqueous isopropanol solutions, the number of washings with each solvent, and the duration of each step. The purpose of the lens release process is to release all of the lenses without defects and transition from diluent swollen networks to the packaging solution swollen hydrogels. The lenses were transferred into vials and subsequently sterilized by autoclaving at 122° C. for 30 minutes. The physical and mechanical properties of the sterile lenses were measured and listed in Table 41.

TABLE 40

| Component | Ex 83 | Ex 84 | Ex 85 | Ex 86 | Ex 87 | Ex 88 | Ex 89 | Ex 90 | Ex 91 | Ex 92 | Ex 93 |
|---|---|---|---|---|---|---|---|---|---|---|---|
| OH-mPDMS n = 4 | 30 | 30 | 25 | 20 | 15 | 10 | 10 | 10 | 25 | 25 | 25 |
| OH-mPDMS n = 15 | 30 | 30 | 35 | 40 | 45 | 50 | 50 | 50 | 28 | 28 | 28 |
| Tegomer 2250 | 10 | 10 | 10 | 10 | 10 | 10 | 5 | 7.5 | 5 | 5 | 5 |
| EGDMA | 0 | 0 | 0 | 0 | 0 | 0 | 0 | 0 | 0.25 | 0.25 | 0.25 |
| DMA | 7 | 10 | 10 | 10 | 10 | 10 | 12.5 | 11.25 | 24 | 20 | 20 |
| HEMA | 11 | 11 | 10.98 | 10.98 | 10.98 | 10.98 | 13.48 | 12.23 | 7.89 | 7.89 | 7.89 |
| pVMA (M$_w$ = 507 KDa) | 10 | 7 | 7 | 7 | 7 | 7 | 7 | 7 | 0 | 0 | 0 |
| PVP K90 | 0 | 0 | 0 | 0 | 0 | 0 | 0 | 0 | 0 | 9 | 7 |
| pVMA (M$_w$ = 570 KDa) | 0 | 0 | 0 | 0 | 0 | 0 | 0 | 0 | 0 | 0 | 2 |
| PDMA (M$_w$ = 740 KDa) | 0 | 0 | 0 | 0 | 0 | 0 | 0 | 0 | 5 | 0 | 0 |
| UV Absorbers | 1.75 | 1.75 | 1.75 | 1.75 | 1.75 | 1.75 | 1.75 | 1.75 | 4.5 | 4.5 | 4.5 |
| CGI 819 | 0.25 | 0.25 | 0.25 | 0.25 | 0.25 | 0.25 | 0.25 | 0.25 | 0 | 0 | 0 |
| Ingacure 1870 | 0 | 0 | 0 | 0 | 0 | 0 | 0 | 0 | 0.34 | 0.34 | 0.34 |
| Blue HEMA | 0 | 0 | 0.02 | 0.02 | 0.02 | 0.02 | 0.02 | 0.02 | 0.02 | 0.02 | 0.02 |

TABLE 40-continued

| Component | Ex 83 | Ex 84 | Ex 85 | Ex 86 | Ex 87 | Ex 88 | Ex 89 | Ex 90 | Ex 91 | Ex 92 | Ex 93 |
|---|---|---|---|---|---|---|---|---|---|---|---|
| Diluent | 23 | 23 | 23 | 23 | 23 | 23 | 23 | 23 | 23 | 23 | 23 |
| D3O | 100 | 100 | 100 | 100 | 100 | 100 | 100 | 100 | 100 | 100 | 100 |

TABLE 41

| Ex # | % Water | % Haze | Sessile Drop (°) | DCA Kruss (Adv °) | $D_k$ | Lipids (μg/lens) | Modulus (psi) | Elong. (%) |
|---|---|---|---|---|---|---|---|---|
| Ex 83 | 25.5 | 10 (1) | NT | 55 (17) | 110 | NT | 220 (24) | 158 (39) |
| Ex 84 | 25.2 | 6 (0) | NT | 94 (10) | 78 | NT | 180 (10) | 166 (43) |
| Ex 85 | 24.5 | 5 | NT | 69 | 96 | NT | 218 | 124 |
| Ex 86 | 23.8 | 4 | NT | 92 | 145 | NT | 182 | 150 |
| Ex 87 | 23.1 | 3 | NT | 61 | 125 | NT | 219 | 135 |
| Ex 88 | 24.2 | 5 | NT | 70 | 135 | NT | 178 | 158 |
| Ex 89 | 32 | 18 | NT | 46 | 225 | NT | 118 | 247 |
| Ex 90 | 27.7 | 12 | NT | 53 | 170 | NT | 145 | 126 |
| Ex 91 | 38 | 6 (1) | 39 (3) | 38 (5) | 128 | 1.74 (0.30) | 109 (4) | 163 (83) |
| Ex 92 | 37 | 4 (0) | 44 (2) | 40 (10) | 134 | 2.62 (0.41) | 118 (8) | 252 (48) |
| Ex 93 | 37 | 5 (0) | 43 (3) | 19 (21) | 124 | 2.17 (0.25) | 143 (10) | 216 (75) |

NT = Not tested.

What is claimed is:

1. A silicone hydrogel formed from a reactive monomer mixture comprising:
   a) between about 1 and about 15 wt % at least one polyamide;
   b) at least one first mono-functional, hydroxyl substituted poly(disubstituted siloxane) having 4 to 8 siloxane repeating units;
   c) at least one second hydroxyl substituted poly(disubstituted siloxane) that is a mono-functional hydroxyl substituted poly(disubstituted siloxane)s having 10 to 200 siloxane repeating units;
   d) about 5 to about 35 wt % of at least one hydrophilic monomer;
   wherein the first hydroxyl substituted poly(disubstituted siloxane) and the second mono-functional hydroxyl substituted poly(disubstituted siloxane) are present in concentrations to provide a ratio of wt % of all first hydroxyl substituted poly(disubstituted siloxane) to wt % of all second hydroxyl substituted poly(disubstituted siloxane)s of 0.4-1.3.

2. The silicone hydrogel of claim 1, wherein the first monofunctional hydroxyl substituted, poly(disubstituted siloxane) comprises compounds of Formula VII-1

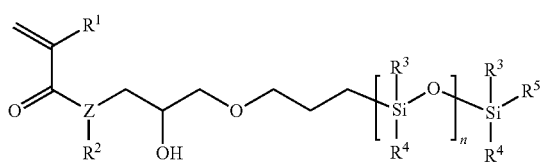

Formula VII-1 wherein
Z is selected from O, N, S or $NCH_2CH_2O$, wherein when Z is O or S then $R^2$ is not present;
$R^1$ is independently H or methyl;
$R^2$ is H or is a linear, branched, or cyclic alkyl group containing one to eight carbon atoms, any of which may be further substituted with at least one hydroxy group, amide, ether, and combinations thereof;
$R^3$ and $R^4$ are independently a linear, branched, or cyclic alkyl group containing one to eight carbon atoms, any of which may be further substituted with at least one hydroxy group, amide, ether, and combinations thereof;
n is 4-8; and
$R^5$ is selected from straight or branched $C_1$ to $C_8$ alkyl groups, which may be optionally substituted with one or more hydroxyl, amide, ether, and combinations thereof.

3. The silicone hydrogel of claim 1, wherein the second hydroxyl substituted, poly(disubstituted siloxane) comprises a compound of Formula VII-2:

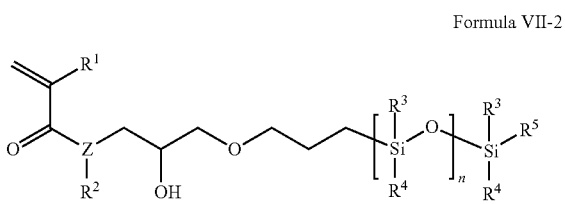

Formula VII-2 wherein Z is selected from O, N, S or $NCH_2CH_2O$, when Z is O or S $R^2$ is not present;
$R^1$ is independently H or methyl;
$R^2$ is H or is a linear, branched, or cyclic alkyl group containing one to eight carbon atoms, any of which may be further substituted with at least one hydroxy group, amide, ether, and combinations thereof;
$R^3$ and $R^4$ are independently a linear, branched, or cyclic alkyl group containing one to eight carbon atoms, any of which may be further substituted with at least one hydroxy group, and which may be optionally substituted with amide, ether, and combinations thereof;
n is the number of siloxane units and is from 10 to 200; and R⁵ is selected from straight or branched $C_1$ to $C_8$ alkyl groups, which may be optionally substituted with one or more hydroxyl, amide, ether, and combinations thereof.

4. The silicone hydrogel of claim 1, further comprising a di-functional hydroxyl-substituted poly(disubstituted siloxane) of Formula XI 5. The silicone hydrogel of claim 1, wherein the first mono-functional hydroxyl-substituted poly(disubstituted siloxane) and the second hydroxyl-substituted poly(disubstituted siloxane) are present in the reactive monomer mixture in a total concentration between about 40 and about 70 wt %.

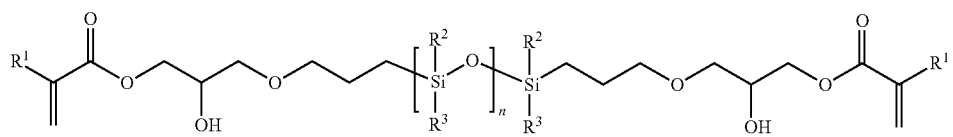

Formula XI wherein
  wherein $R^1$ is independently a hydrogen atom or methyl group;
  $R^2$ and $R^3$ are independently a linear, branched, or cyclic alkyl group containing one to eight carbon atoms, any of which may be further substituted with at least one hydroxy group, amido, ether, amino, carboxyl, carbonyl groups and combinations thereof; or are selected from —$(CH_2CH_2O)_xOCH_3$ where x is from 1 to 20; and
  n is from 1 to 200.

6. The silicone hydrogel of claim 1, wherein the polyamide comprises a cyclic polyamide, an acyclic polyamide, or a mixture of a cyclic polyamide and an acyclic polyamide.

7. The silicone hydrogel of claim 1, wherein the polyamide is an acyclic polyamide.

8. The silicone hydrogel of claim 1, wherein the first or second monofunctional hydroxyl substituted, poly(disubstituted siloxane) comprises a monofunctional hydroxyl substituted, poly(dimethylsiloxane) of any of Formulae VIIa-IXb:

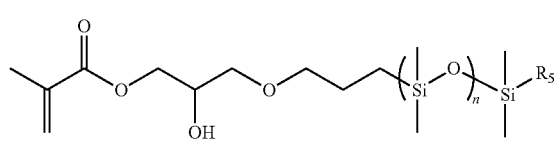

Formula VIIa

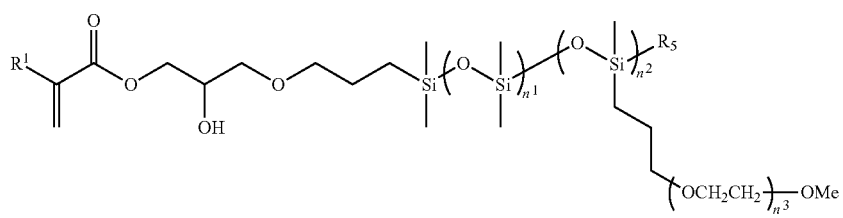

Formula VIIb

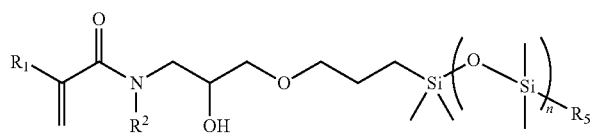

Formula VIIIa

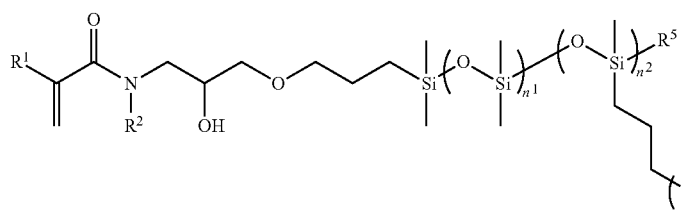

Formula VIIIb

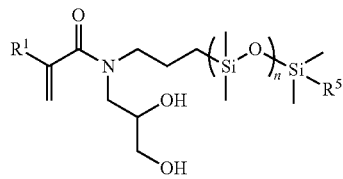

Formula VIIIc

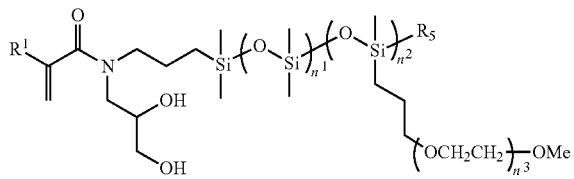

Formula VIIId

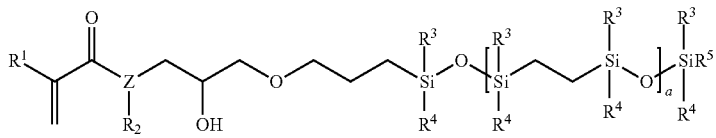

Formula IXa

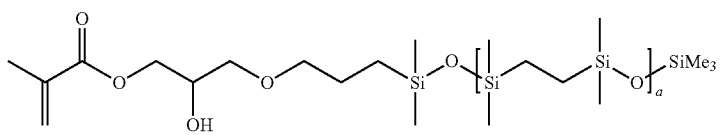

Formula IXb wherein R$^1$ is methyl or H; n is between 4 and 30; wherein Z is selected from O, N, S or NCH$_2$CH$_2$O, when Z is O or S R$^2$ is not present;

R$^2$ is independently selected from the group consisting of a linear, branched, or cyclic alkyl group containing one to eight carbon atoms, any of which may be further substituted with at least one hydroxy group, and which may be optionally substituted with amide, ether, and combinations thereof;

n$^1$ and n$^2$ are independently between 4 to 100;

n$^3$ is 1-50;

R$^5$ is selected from straight or branched C$_1$ to C$_8$ alkyl groups, which may be optionally substituted with one or more hydroxyl, amide, ether, polyhydroxyl groups selected from straight or branched C$_1$ to C$_8$ groups having a formula of C$_f$H$_g$(OH)$_h$ wherein f=1-8 and g+h=2f+1 and cyclic C$_1$ to C$_8$ groups having a formula of C$_f$H$_g$(OH)$_h$ wherein f=1-8 and g+h=2f−1, and combinations thereof;

a is 4-8 for the first hydroxyl-containing silicone component and between 4-100 for the second hydroxyl-containing silicone component.

9. The silicone hydrogel of claim 1 wherein the second hydroxyl substituted, poly(disubstituted siloxane)s comprises mono-(2-hydroxy-3-methacryloxypropyl)-propyl ether terminated mono-n-butyl terminated polydimethylsiloxane (OH-mPDMS) having fifteen siloxane repeating units.

10. The silicone hydrogel of claim 1, wherein the hydrophilic monomer comprises a reactive group selected from the group consisting of (meth)acrylates, (meth)acrylamides, styrenes, N-vinyllactams, N-vinylamides, O-vinylcarbamates, O-vinylcarbonates, vinyl ethers, vinyl esters, vinyls, allyls and combinations thereof.

11. The silicone hydrogel of claim 1 further comprising at least one charged monomer.

12. The silicone hydrogel of claim 1, wherein the hydrophilic monomer is present in the reactive monomer mixture in an amount between about 15 to about 35 wt %.

13. The silicone hydrogel of claim 1, wherein the hydrophilic monomer is selected from hydrophilic amide monomers.

14. The silicone hydrogel of claim 13, wherein the reactive monomer mixture comprises less than about 30 wt % hydrophilic amide monomers.

15. The silicone hydrogel of claim 1, wherein the hydrophilic monomer is selected from the group consisting of N,N-dimethylacrylamide, acrylamide, ethylene glycol vinyl ether (EGVE), di(ethylene glycol) vinyl ether (DEGVE), N-vinyl pyrrolidone (NVP), 1-methyl-3-methylene-2-pyrrolidone, 1-methyl-5-methylene-2-pyrrolidone, 5-methyl-3-methylene-2-pyrrolidone; 1-ethyl-5-methylene-2-pyrrolidone, N-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, N-vinyl-N-methyl acetamide (VMA), N-vinyl-N-ethyl acetamide, N-vinyl-N-ethyl formamide, N-vinyl formamide, N-vinyl acetamide, N-vinyl isopropylamide, allyl alcohol, N-vinyl caprolactam, N-2-hydroxyethyl vinyl carbamate, N-carboxy-ß-alanine N-vinyl ester; N-carboxyvinyl-β-alanine (VINAL), N-carboxyvinyl-α-alanine and mixtures thereof.

16. The silicone hydrogel of claim 1, wherein the hydrophilic monomer is selected from N,N-dimethylacrylamide, N-vinylpyrrolidone, N-vinyl-N-methyl acetamide, N-vinyl acetamide, and 1-methyl-5-methylene-2-pyrrolidone.

17. The silicone hydrogel of claim 1, wherein the hydrophilic monomer comprises N-vinylpyrrolidone, N,N-dimethylacrylamide, or mixtures thereof.

18. The silicone hydrogel of claim 1, wherein the silicone hydrogel has an oxygen permeability (Dk) of at least about 80 barrers.

19. The silicone hydrogel of claim 11, wherein the charged monomer comprises at least one ionic moiety selected from the group consisting of anions, cations, zwitterions, betaines, and mixtures thereof.

20. The silicone hydrogel of claim 19, wherein the charged monomer comprises at least one polymerizable group.

21. The silicone hydrogel of claim 19, wherein the charged monomer comprises at least one carboxylic acid group.

22. The silicone hydrogel of claim 21, wherein the charged monomer comprises at least one carboxylic acid monomer selected from the group consisting of (meth)acrylic acid, furmaric acid, maelic acid, itaconic acid, crotonic acid, cinnamic acid, vinylbenzoic acid, monoesters of furmaric acid, maelic acid, and itaconic acid, and mixtures thereof.

23. The silicone hydrogel of claim 21, wherein the charged monomer comprises mixture of anionic and cationic monomer.

24. The silicone hydrogel of claim 21, wherein the charged monomer is selected from the group consisting of (meth)acrylic acid, N-[(ethenyloxy)carbonyl]-β-alanine (VINAL), 3-acrylamidopropanoic acid (ACA1), 5-acrylamidopropanoic acid (ACA2), 3-acrylamido-3-methylbutanoic acid (AMBA), 2-(methacryloyloxy)ethyl trimethylammonium chloride (Q Salt), 2-acrylamido-2-methylpropane sulfonic acid (AMPS), 1-propanaminium, N-(2-carboxyethyl)-N, N-dimethyl-3-[(1-oxo-2-propen-1-yl)amino]-, inner salt (CBT, carboxybetaine), 1-propanaminium, N,N-dimethyl-N-[3-[(1-oxo-2-propen-1-yl)

amino]propyl]-3-sulfo-, inner salt (SBT, sulfobetaine), 3,5-Dioxa-8-aza-4-phosphaundec-10-en-1-aminium, 4-hydroxy-N,N,N-trimethyl-9-oxo-, inner salt, 4-oxide (9CI) phosphobetaine(PBT), 2-methacryloyloxyethyl phosphorylcholine, 3-(dimethyl(4-vinylbenzyl)ammonio)propane-1-sulfonate (DMVBAPS), 3-((3-acrylam idopropyl)dimethylammonio)propane-1-sulfonate (AMPDAPS), 3-((3-methacrylam idopropyl)dimethylammonio)propane-1-sulfonate (MAMPDAPS), 3-((3-(acryloyloxy)propyl)dimethylammonio)propane-1-sulfonate (APDAPS), methacryloyloxy)propyl)dimethylammonio)propane-1-sulfonate (MAPDAPS), and mixtures thereof.

25. The silicone hydrogel of claim 21, wherein the charged monomer is selected from the group consisting of (meth)acrylic acid, N-[(ethenyloxy)carbonyl]-β-alanine (VINAL), 3-acrylamidopropanoic acid (ACA1), 5-acrylamidopropanoic acid (ACA2), and mixtures thereof.

26. The silicone hydrogel of claim 11, wherein the at least one charged monomer comprises up to about 5 wt %, based on the total weight of the reactive monomer mixture.

27. The silicone hydrogel of claim 11, wherein the charged monomer is selected from acrylic acid, methacrylic acid, and mixtures thereof.

28. The silicone hydrogel of claim 1 wherein the polyamide comprises an acyclic polyamide selected from the group consisting of PVMA, PNVA, and poly[N-vinyl N-alkyl acetamide]s wherein the N-alkyl group is selected from the group consisting of linear and branched alkyl groups containing between one and five carbon atoms, and copolymers and mixtures thereof.

29. The silicone hydrogel of claim 1, wherein the polyamide comprises poly(N-vinyl-N-methyl acetamide), poly(N-vinyl acetamide), polydimethylacrylamide, or a mixture of two or more thereof.

30. The silicone hydrogel of claim 1, wherein the polyamide comprises a copolymer.

31. The silicone hydrogel of claim 30, wherein the copolymer comprises repeating units selected from the group consisting of N-vinyl amides, acrylamides, hydroxyalkyl (meth)acrylates, alkyl(meth)acrylates, N-vinylpyrrolidone, N,N-dimethylacrylamide, 2-hydroxyethylmethacrylate, vinyl acetate, acrylonitrile, hydroxypropyl methacrylate, 2-hydroxyethyl acrylate, methyl methacrylate, butyl methacrylate, methacryloxypropoyl tristrimethylsiloxysilane, siloxane substituted acrylates or methacrylates, and mixtures thereof.

32. The silicone hydrogel of claim 1, wherein the polyamide comprises repeating units of Formula I or Formula II

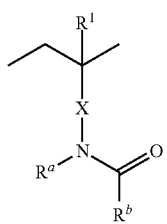

Formula I

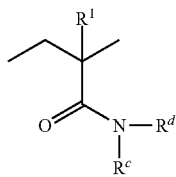

Formula II wherein X is a direct bond, —(CO)—, or —(CO)—NHR$^e$—, wherein R$^e$ is a C$_1$ to C$_3$ alkyl group;

R$^a$ is selected from H, straight or branched, substituted or unsubstituted C$_1$ to C$_4$ alkyl groups;

R$^b$ is selected from H, straight or branched, substituted or unsubstituted C$_1$ to C$_4$ alkyl groups, amino groups having up to two carbon atoms, amide groups having up to four carbon atoms, and alkoxy groups having up to two carbon atoms;

R$^c$ is selected from H, straight or branched, substituted or unsubstituted C$_1$ to C$_4$ alkyl groups, ethoxy, hydroxyethyl, and hydroxymethyl;

R$^d$ is selected from H, straight or branched, substituted or unsubstituted C$_1$ to C$_4$ alkyl groups ethoxy, hydroxyethyl, and hydroxymethyl;

wherein the number of carbon atoms in R$^a$ and R$^b$ taken together is 8 or less, and wherein the number of carbon atoms in R$^c$ and R$^d$ taken together is 8 or less.

33. The silicone hydrogel of claim 32, wherein the polyamide is a copolymer comprising at least about 80 mole % of the repeating units from Formula I or Formula II.

34. The silicone hydrogel of claim 32, wherein R$^b$ is selected from straight or branch unsubstituted C$_1$ to C$_4$ alkyl groups.

35. The silicone hydrogel of claim 1, wherein the polyamide comprises between about 3 and 15 wt % of the reactive monomer mixture, based upon all reactive components.

36. The silicone hydrogel of claim 1, wherein the polyamide comprises between about 3 and 12 wt % of the reactive mixture based upon all reactive components.

37. The silicone hydrogel of claim 1, wherein the polyamide comprises a cyclic polyamide.

38. The silicone hydrogel of claim 37, wherein the cyclic polyamide comprises polyvinylypyrrolidone (PVP) in an amount up to about 15 wt. %.

39. The silicone hydrogel of claim 1, wherein the reactive monomer mixture further comprises at least one additional constituent selected from the group consisting of a diluent, a UV absorbing compound, a medicinal agent, an antimicrobial compound, a pharmaceutical compound, a nutraceutical compound, a photochromic compound, a reactive tint, a pigment, a copolymerizable dye, a nonpolymerizable dye, a release agent, a copolymer, and combinations thereof.

40. The silicone hydrogel of claim 1 further comprising at least one hydroxylalkyl (meth)acrylate monomer.

41. The silicone hydrogel of claim 40 wherein said hydroxyalkyl (meth)acrylate monomer is selected from the group consisting of 2-hydroxyethyl (meth)acrylate, 3-hydroxypropyl (meth)acrylate, 2-hydroxypropyl (meth)acrylate, 2,3-dihydroxypropyl (meth)acrylate, 2-hydroxybutyl (meth)acrylate, 3-hydroxybutyl (meth)acrylate, 1-hydroxypropyl-2-(meth)acrylate, 2-hydroxy-2-methyl-propyl (meth)acrylate, 3-hydroxy-2,2-dimethyl-propyl (meth)acrylate, 4-hydroxybutyl (meth)acrylate, glycerol (meth)acrylate, polyethylene glycol monomethacrylate, and mixtures thereof.

42. The silicone hydrogel of claim 40 wherein said hydroxyalkyl (meth)acrylate monomer is selected from the group consisting of 2-hydroxyethyl methacrylate, glycerol methacrylate, 2-hydroxypropyl methacrylate, hydroxybutyl methacrylate, 3-hydroxy-2,2-dimethyl-propyl methacrylate, and mixtures thereof.

43. The silicone hydrogel of claim 40 wherein said hydroxyalkyl (meth)acrylate monomer is selected from the group consisting of 2-hydroxyethyl methacrylate, 3-hydroxy-2,2-dimethyl-propyl methacrylate, hydroxybutyl methacrylate or glycerol methacrylate.

44. A contact lens comprising the silicone hydrogel of claim 1.

45. The contact lens of claim 44, wherein the lysozyme uptake is at least about 50 μg/lens.

46. The contact lens of claim 44, wherein the lipid uptake is less than about 15 μg/lens.

47. The contact lens of claim 44, wherein the lipid uptake is less than 10 μg/lens.

48. The contact lens of claim 45, wherein the PQ1 uptake is less than about 20%.

49. The contact lens of claim 47, wherein the PQ1 uptake is less than 10%.

50. The contact lens of claim 44, wherein the lysozyme uptake is at least about 100 μg/lens, the lipid uptake is less than 10 μg/lens, and the PQ1 uptake is less than 10%.

51. The contact lens of claim 44, wherein the dynamic contact angle is less than about 60°.

52. The contact lens of claim 44, wherein the Dk is greater than about 80 barrers, wherein the lysozyme uptake is greater than about 50 μg/lens, wherein the lipid uptake is less than about 10 μg/lens; wherein the PQ1 uptake is less than about 15%;

and wherein the contact angle is less than about 50°.

53. The contact lens of claim 44 comprising lipid uptake of less than about 10μg/lens and an advancing contact angle of less than about 70°.

54. The silicone hydrogel of claim 1, wherein the reactive monomer mixture further comprises at least one additional silicone-containing compounds without hydroxyl functionality.

55. A silicone hydrogel formed from a reactive monomer mixture comprising:

a) between about 1 and about 15 wt % at least one polyamide;

b) at least one hydroxyl silicone-containing monomer;

c) at least one hydroxyl substituted poly(disubstituted siloxane) selected from the group consisting of monofunctional poly(disubstituted siloxane) having 4 to 8 siloxane repeating units, and monofunctional hydroxyl substituted poly(disubstituted siloxane)s having 10 to 200 siloxane repeating units, and mixtures thereof;

d) about 5 to about 25 wt % at least one hydrophilic monomer;

wherein the first hydroxyl substituted poly(disubstituted siloxane) and the second monofunctional hydroxyl substituted poly(disubstituted siloxane) are present in concentrations to provide a ratio of wt % of all first hydroxyl substituted, linear poly(disubstituted siloxane) to wt % of all one second hydroxyl substituted poly(disubstituted siloxane)s of 0.4-1.3.

* * * * *